(12) United States Patent
Furuichi

(10) Patent No.: US 12,167,434 B2
(45) Date of Patent: Dec. 10, 2024

(54) INFORMATION PROCESSOR, INFORMATION PROCESSING METHOD, AND COMMUNICATION APPARATUS

(71) Applicant: SONY GROUP CORPORATION, Tokyo (JP)

(72) Inventor: Sho Furuichi, Tokyo (JP)

(73) Assignee: SONY GROUP CORPORATION, Tokyo (JP)

(*) Notice: Subject to any disclaimer, the term of this patent is extended or adjusted under 35 U.S.C. 154(b) by 304 days.

(21) Appl. No.: 17/755,050

(22) PCT Filed: Oct. 14, 2020

(86) PCT No.: PCT/JP2020/038742
§ 371 (c)(1),
(2) Date: Apr. 20, 2022

(87) PCT Pub. No.: WO2021/085132
PCT Pub. Date: May 6, 2021

(65) Prior Publication Data
US 2022/0386311 A1    Dec. 1, 2022

(30) Foreign Application Priority Data

Oct. 29, 2019 (JP) .................................. 2019-196688

(51) Int. Cl.
*H04W 72/541* (2023.01)
*H04W 72/0453* (2023.01)

(52) U.S. Cl.
CPC ..... *H04W 72/541* (2023.01); *H04W 72/0453* (2013.01)

(58) Field of Classification Search
CPC ........... H04W 72/541; H04W 72/0453; H04W 24/04; H04W 24/02; H04W 16/14; H04W 16/18
(Continued)

(56) References Cited

U.S. PATENT DOCUMENTS

2008/0254818 A1* 10/2008 Nitsche ................. H04W 16/14
455/501
2014/0092771 A1* 4/2014 Siomina ................ H04W 24/08
370/252
(Continued)

FOREIGN PATENT DOCUMENTS

JP    2017-069780 A    4/2017
JP    2018-056790 A    4/2018
(Continued)

OTHER PUBLICATIONS

Maruyama, et al., "Radio zone design system for the wireless IP access system", NTT R&D, vol. 51, No. 11, Nov. 10, 2002, pp. 952-958.
(Continued)

*Primary Examiner* — Don N Vo
(74) *Attorney, Agent, or Firm* — CHIP LAW GROUP

(57) ABSTRACT

An information processor according to one aspect of the present disclosure includes a first acquisition unit configured to acquire desire information regarding an area setting of a predetermined service, including at least desired area information, provided using a second radio system that shares all or a part of a frequency band used by a first radio system, a second acquisition unit that acquires area information regarding another service that uses or is allocated to a predetermined frequency band used by the predetermined service, a calculation unit configured to perform calculation regarding inter-area interference from an area specified by the desired area information to an area of the another service; and a generation unit configured to generate permitted area information regarding an area in which the predetermined service is permitted based on a calculation result of the inter-area interference.

16 Claims, 33 Drawing Sheets

(58) Field of Classification Search
USPC .................................................... 455/452.1
See application file for complete search history.

(56) References Cited

U.S. PATENT DOCUMENTS

| | | | |
|---|---|---|---|
| 2015/0208261 A1* | 7/2015 | Son | H04W 24/02 455/67.13 |
| 2015/0257118 A1* | 9/2015 | Siomina | G01S 5/021 455/456.1 |
| 2018/0139614 A1* | 5/2018 | Satoh | H04J 11/005 |

FOREIGN PATENT DOCUMENTS

| | | |
|---|---|---|
| JP | 2019-198051 A | 11/2019 |
| WO | 2019/130922 A1 | 7/2019 |

OTHER PUBLICATIONS

"White Space Database Provider (WSDB) Contract", URL: https://www.ofcom.org.uk/_data/assets/pdf_file/0026/84077/white_space_database_contract_for_operational_use_of_wsds.pdf, 2015, 125 pages.
"CBRS Certified Professional Installer Accreditation Technical Specification", Wireless Innovation Forum, WINNF-TS-0247, Version V 1.5.0, Oct. 27, 2020, 19 pages.
"Signaling Protocols and Procedures for Citizens Broadband Radio Service (CBRS): Spectrum Access System (SAS)—Citizens Broadband Radio Service Device (CBSD) Interface Technical Specification", Wireless Innovation Forum, Document WINNF-TS-0016, Version V1.2.6, Nov. 25, 2020, 60 pages.
"Technical and operational requirements for the operation of white space devices under geo-location approach", CEPT Electronic Communications Committee Report 186, Jan. 2013, 181 pages.
"Signaling Protocols and Procedures for Citizens Broadband Radio Service (CBRS): Spectrum Access System (SAS)—SAS Interface Technical Specification", Wireless Innovation Forum, WINNF-TS-0096, Version V 1.3.2, Mar. 11, 2020, 44 pages.
"Requirements for Commercial Operation in the U.S. 3550-3700 MHz Citizens Broadband Radio Service Band", Wireless Innovation Forum, WINNF-TS-0112, Version V1.9.1, Mar. 11, 2020, 81 pages.
"IEEE Standard for Information technology—Telecommunications and information exchange between systems—Local and metropolitan area networks—Specific requirements—Part 19: TV White Space Coexistence Methods—Amendment 1: Coexistence Methods for Geo-location Capable Devices Operating under General Authorization", IEEE 802.19.1a-2017, IEEE, Dec. 11, 2017.
"Part 96—Citizens Broadband Radio Service", 47 CFR, Code of Federal Regulations, Jun. 23, 2015, 17 pages.
"Operations for Citizens Broadband Radio Service (CBRS): Priority Access License (PAL) Database Technical Specification", Wireless Innovation Forum, WINNF-TS-0245, Version V1.2.0, Mar. 3, 2021, 11 pages.
"Test and Certification for Citizens Broadband Radio Service (CBRS); Conformance and Performance Test Technical Specification; SAS as Unit Under Test (UUT)", Wireless Innovation Forum, WINNF-TS-0061, Version V1.5.1, Oct. 7, 2019, 196 pages.
"Spectrum Sharing Committee Policy and Procedure Coordinated Periodic Activities Policy", Wireless Innovation Forum, WINNF-SSC-0008 V1.3.0, 2018, 3 pages.
"Prediction procedure for the evaluation of microwave interference between stations on the surface of the Earth at frequencies above about 0.7 GHz", ITU-R P.452-11, International Telecommunication Union, Oct. 20, 1995, 37 pages.
"Operations for Citizens Broadband Radio Service (CBRS); GAA Spectrum Coordination—Approach 2", Wireless Innovation Forum, Document WINNF-TR-2004, Version V1.0.0, May 16, 2019, 20 pages.
International Search Report and Written Opinion of PCT Application No. PCT/JP2020/038742, issued on Jan. 12, 2021, 11 pages of ISRWO.

* cited by examiner

Definition of Channel Bandwidth and Transmission Bandwidth Configuration for one E-UTRA Transmission bandwidth configuration $N_{RB}$ in E-UTRA channel bandwidths

| Channel bandwidth $BW_{Channel}$ [MHz] | 1.4 | 3 | 5 | 10 | 15 | 20 |
|---|---|---|---|---|---|---|
| Transmission bandwidth configuration $N_{RB}$ | 6 | 15 | 25 | 50 | 75 | 100 |

Definition of channel bandwidth and transmission bandwidth configuration for one NR channel Minimum guardband (kHz) (FR1)

| SCS (kHz) | 5 MHz | 10 MHz | 15 MHz | 20 MHz | 25 MHz | 30 MHz | 40 MHz | 50 MHz | 60 MHz | 70 MHz | 80 MHz | 90 MHz | 100 MHz |
|---|---|---|---|---|---|---|---|---|---|---|---|---|---|
| 15 | 242.5 | 312.5 | 382.5 | 452.5 | 522.5 | 592.5 | 552.5 | 692.5 | N.A | N.A | N.A | N.A | N.A |
| 30 | 505 | 665 | 645 | 805 | 785 | 945 | 905 | 1045 | 825 | 965 | 925 | 885 | 845 |
| 30 | N.A | 1010 | 990 | 1330 | 1310 | 1290 | 1610 | 1570 | 1530 | 1490 | 1450 | 1410 | 1370 |

FIG.24

Minimum guardband (kHz) (FR2)

| SCS (kHz) | 50MHz | 100MHz | 200MHz | 400MHz |
|---|---|---|---|---|
| 60 | 1210 | 2450 | 4930 | N.A |
| 120 | 1900 | 2420 | 4900 | 9860 |

FIG.25

Minimum guardband (kHz) of SCS 240 kHz SS/PBCH block (FR2)

| SCS (kHz) | 100MHz | 200MHz | 400MHz |
|---|---|---|---|
| 240 | 3800 | 7720 | 15560 |

DESIRED LAYING AREA
(PROVIDED BY OPERATOR B)

SERVICE AREA
(OPERATOR A)

INFORMATION PROCESSOR, INFORMATION PROCESSING METHOD, AND COMMUNICATION APPARATUS

CROSS REFERENCE TO RELATED APPLICATIONS

This application is a U.S. National Phase of International Patent Application No. PCT/JP2020/038742 filed on Oct. 14, 2020, which claims priority benefit of Japanese Patent Application No. JP 2019-196688 filed in the Japan Patent Office on Oct. 29, 2019. Each of the above-referenced applications is hereby incorporated herein by reference in its entirety.

FIELD

The present disclosure relates to an information processor, an information processing method, and a communication apparatus.

BACKGROUND

A problem of exhaustion of radio resources (wireless resources) that can be allocated to radio systems (wireless apparatuses) has emerged. Therefore, in recent years, "dynamic spectrum access (DSA)" that utilizes spatio-temporally underutilized spectrum (white space) among frequency bands already allocated to a specific radio system is rapidly attracting attention.

CITATION LIST

Non Patent Literature

Non Patent Literature 1: WINNF-TS-0247-V1.2.0 CBRS Certified Professional Installer Accreditation Technical Specification
Non Patent Literature 2: WINNF-TS-0016-V1.2.3 Signaling Protocols and Procedures for Citizens Broadband Radio Service (CBRS): Spectrum Access System (SAS)—Citizens Broadband Radio Service Device (CBSD) Interface Technical Specification
Non Patent Literature 3: ECC Report 186, Technical and operational requirements for the operation of white space devices under geo-location approach, CEPT ECC, 2013 January
Non Patent Literature 4: White Space Database Provider (WSDB) Contract, available at https://www.ofcom.org.uk/_data/assets/pdf_file/0026/84077/white_space_database_contract_for_operational_use_of_wsds.pdf
Non Patent Literature 5: WINNF-TS-0096-V1.3.1 Signaling Protocols and Procedures for Citizens Broadband Radio Service (CBRS): Spectrum Access System (SAS)—SAS Interface Technical Specification
Non Patent Literature 6: WINNF-TS-0112-V1.7.0 Requirements for Commercial Operation in the U.S. 3550-3700 MHz Citizens Broadband Radio Service Band
Non Patent Literature 7: IEEE Std 802.19.1aTM-2017 "Coexistence Methods for Geo-location Capable Devices Operating under General Authorization"
Non Patent Literature 8: 47 C.F.R Part 96 Citizens Broadband Radio Service, https://www.ecfr.gov/cgi-bin/text-idx?node=pt47.5.96#se47.5.96
Non Patent Literature 9: WINNF-TS-0245-V1.0.0 Operations for citizens broadband radio service (CBRS): Priority Access License (PAL) Database Technical Specification
Non Patent Literature 10: WINNF-TS-0061-V1.5.0 Test and Certification for Citizens Broadband Radio Service (CBRS); Conformance and Performance Test Technical Specification; SAS as Unit Under Test (UUT)
Non Patent Literature 11: WINNF-SSC-0008 Spectrum Sharing Committee Policy and Procedure Coordinated Periodic Activities Policy
Non Patent Literature 12: ITU-R P.452-11, "Prediction procedure for the evaluation of microwave interference between stations on the surface of the Earth at frequencies above about 0.7 GHz", https://www.itu.int/dms_pubrec/itu-r/rec/p/R-REC-P.452-11-200304-S!!PDF-E.pdf
Non Patent Literature 13: WINNF-TR-2004-V1.0.0 Operations for Citizens Broadband Radio Service (CBRS); GAA Spectrum Coordination—Approach 2

SUMMARY

Technical Problem

In the future, the number of operators who use radio waves is expected to increase. In this case, it is conceivable that it is difficult to arbitrate the use of radio waves between the operators. As a result, effective use of the radio resources may not be realized.

Therefore, the present disclosure proposes an information processor, an information processing method, and a communication apparatus capable of realizing effective use of radio resources.

Solution to Problem

In order to solve the above problem, an information processor according to one aspect of the present disclosure includes a first acquisition unit configured to acquire desire information regarding an area setting of a predetermined service, including at least desired area information, provided using a second radio system that shares all or a part of a frequency band used by a first radio system, a second acquisition unit that acquires area information regarding another service that uses or is allocated to a predetermined frequency band used by the predetermined service, a calculation unit configured to perform calculation regarding inter-area interference from an area specified by the desired area information to an area of the another service; and a generation unit configured to generate permitted area information regarding an area in which the predetermined service is permitted based on a calculation result of the inter-area interference.

BRIEF DESCRIPTION OF DRAWINGS

FIG. 24 is a diagram illustrating specifications of the transmission bandwidth.

FIG. 25 is a diagram illustrating specifications of the transmission bandwidth.

DESCRIPTION OF EMBODIMENTS

Figure 1:
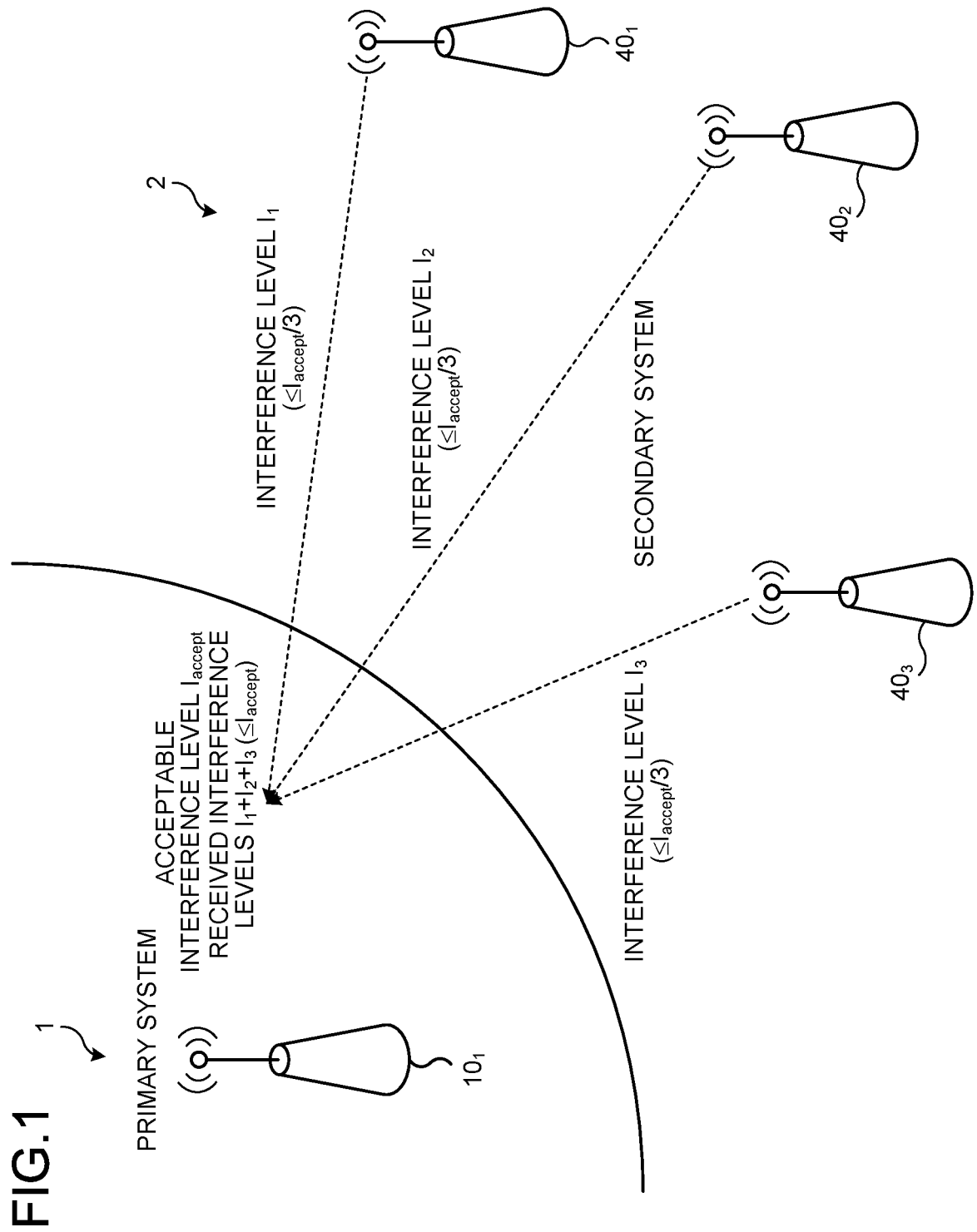
FIG. 1 is an explanatory diagram illustrating an example of allocation of an interference margin to each communication apparatus configuring a secondary system.

Hereinafter, embodiments of the present disclosure will be described with reference to the drawings. In each of the following embodiments, same parts are given the same reference signs to omit redundant description.

In addition, in the present specification and the drawings, a plurality of components having substantially the same functional configurations may be distinguished by attaching a different number or alphabet after the same reference sign. For example, a plurality of configurations having substantially the same functional configuration are distinguished as communication control devices $60_1$ and $60_2$ as necessary. Further, a plurality of configurations having substantially the same functional configuration are distinguished as communication systems 2A and 2B as necessary. However, in a case where it is not particularly necessary to distinguish each of the plurality of components having substantially the same functional configuration, only the same reference sign is attached. For example, in a case where it is not necessary to particularly distinguish the communication control devices $60_1$ and $60_2$, the communication control devices $60_1$ and $60_2$ are simply referred to as a communication control device 60. Further, in a case where it is not necessary to particularly distinguish the communication systems 2A and 2B, the communication systems 2A and 2B are simply referred to as a communication system 2.

The present disclosure will be described according to the following item order.

1. Introduction
1-1. Controlling radio system for spectrum sharing
1-2. Outline of Present Embodiment
1-3. Terms related to spectrum and sharing
2. Configuration of communication system
2-1. Overall configuration of communication system
2-2. Configuration of radio apparatus
2-3. Configuration of management apparatus
2-4. Configuration of terminal device 2-5. Configuration of base station device
2-6. Configuration of intermediate device
2-7. Configuration of communication control device
3. Interference model
4. Primary system protection method
4-1. Interference margin simultaneous allocation type
4-2. Interference margin interactive allocation type
5. Description of procedures
5-1. Registration procedure
5-2. Available spectrum query procedure
5-3. Spectrum grant procedure
5-4. Spectrum use notification
5-5. Supplement to procedures
5-6. Procedures for terminal device
5-7. Procedure required between communication control devices
5-8. Information transmission means
5-9. Representative operation flow
6. Operation related to construction of service area
6-1. Scenario
6-2. Parameter
6-3. Search process
6-4. Estimation of maximum interference level
6-5. Construction of service area
6-5-1. Operation Example 1
6-5-2. Operation Example 2
6-5-3. Operation Example 3
6-5-4. Operation Example 4
6-5-5. Operation Example 5
6-5-6. Operation Example 6
6-6. Management of communication apparatus
7. Modification
8. Conclusion

1. INTRODUCTION

In recent years, due to a radio environment in which various radio systems are mixed and due to an increase and diversification of content via radio transmission, a problem has emerged that radio resources (e.g., frequency) that can be allocated to radio systems are depleted. However, since all frequency bands are already used by existing radio systems, it is difficult to allocate new radio resources. Therefore, in recent years, further effective use of radio resources by utilization of cognitive radio technology has started to attract attention.

The cognitive radio technology secures radio resources by allowing the use of spatio-temporally underutilized spectrum (white space) in existing radio systems (e.g., dynamic spectrum access (DSA)). For example, in the United States, with the aim of opening to the general public the federal use band (3.55 to 3.70 GHz) that overlaps with global 3GPP bands 42 and 43, legalization and standardization of the Citizens Broadband Radio Service (CBRS) utilizing a spectrum access technology are accelerating.

Note that the cognitive radio technology contributes not only to the dynamic spectrum access but also to improvement in efficient spectrum use by radio systems. For example, ETSI EN 303 387 and IEEE 802.19.1-2014 specify a technology of coexistence between radio systems using underutilized radio waves.

<1-1. Controlling Radio System for Spectrum Sharing>

In general spectrum sharing, a national regulatory authority (NRA) in each country/region is required to protect a radio system (primary system) of a primary user who is licensed or authorized for the use of a frequency band. Typically, the NRA provides an acceptable interference reference value of the primary system, and a radio system (secondary system) of a secondary user is required to keep interference generated by shared access below the acceptable interference reference value.

In the following description, a "system" refers to a set of a plurality of components (device, modules (parts), etc.). It does not matter whether or not all the components are in the same housing. For example, a plurality of devices housed in separate housings and connected via a network, and one device in which a plurality of modules is housed in one housing are both "systems". In other words, each of the radio systems such as the primary system and the secondary system may be configured by a plurality of devices or may be configured by a single device.

For example, in order to realize spectrum sharing, a communication control device (e.g., spectrum management database) controls communication of the secondary system so as not to give fatal interference to the primary system. The communication control device is a device that manages communication and the like of a communication apparatus. For example, the communication control device is a system for managing radio resources (e.g., frequencies), such as a geo-location database (GLDB) and a spectrum access system (SAS). In the present embodiment, the communication control device corresponds to a communication control device 60 described later. The communication control device 60 will be described in detail later.

The primary system is, for example, a system (e.g., existing system) that preferentially uses a predetermined spectrum over other systems. The secondary system is, for example, a system that secondarily uses (e.g., dynamic spectrum access) the spectrum used by the primary system. Each of the primary system and the secondary system may include a plurality of communication apparatuses or may include a single communication apparatus. The communication control device allocates an acceptable interference to one or a plurality of communication apparatuses so that an interference aggregation, with respect to the primary system, of one or a plurality of communication apparatuses configuring the secondary system does not exceed the acceptable interference (also referred to as an interference margin) of the primary system. The acceptable interference may be determined in advance by an operator of the primary system, a public organization that manages radio waves, or the like. In the following description, the interference margin refers to the acceptable interference. In addition, the interference aggregation may also be referred to as aggregate interference power.

FIG. 1 is an explanatory diagram illustrating an example of allocation of the interference margin to each communication apparatus configuring the secondary system. In the example in FIG. 1, a communication system 1 is the primary system, and a communication system 2 is the secondary system. The communication system 1 includes a radio apparatus $10_1$ and so on. Furthermore, the communication system 2 includes base station devices $40_1$, $40_2$, $40_3$, and so on. In the example in FIG. 1, the communication system 1 includes only one radio apparatus 10, but the communication system 1 may include a plurality of radio apparatuses 10. Further, in the example in FIG. 1, the communication system 2 includes three base station devices 40, but the number of base station devices 40 included in the communication system 2 may be less than or more than three. In addition, a radio communication apparatus included in the communication system 2 is not necessarily a base station device. Although only one primary system (the communication system 1 in the example in FIG. 1) and one secondary system (the communication system 2 in the example in FIG. 1) are illustrated in the example in FIG. 1, a plurality of primary systems and a plurality of secondary systems may be provided.

Each of the radio apparatus $10_1$ and the base station devices $40_1$, $40_2$, and $40_3$ can transmit and receive radio waves. The acceptable interference of the radio apparatus $10_1$ is $I_{accept}$. In addition, interference levels that the base station devices $40_1$, $40_2$, and $40_3$ give to a predetermined protection point of the communication system 1 (primary system) are interference levels $I_1$, $I_2$, and $I_3$, respectively. Here, the protection point is a reference interference calculation point for protecting the communication system 1.

The communication control device allocates the interference margin $I_{accept}$ to the plurality of base station devices 40 such that interference aggregation applied to the predetermined protection point of the communication system 1 (received interference levels $I_1+I_2+I_3$ illustrated in FIG. 1) does not exceed the interference margin $I_{accept}$. For example, the communication control device allocates the interference margin $I_{accept}$ to each base station device 40 such that each of the interference levels $I_1$, $I_2$, and $I_3$ is $I_{accept}/3$. Alternatively, the communication control device allocates the interference margin $I_{accept}$ to each base station device 40 such that each of the interference levels $I_1$, $I_2$, and $I_3$ is $I_{accept}/3$ or less. It is apparent that the method of allocating the interference margin is not limited to the example.

The communication control device calculates the maximum transmission power that each base station device 40 is allowed (hereinafter referred to as maximum allowable transmission power) based on the allocated interference (hereinafter referred to as interference assignment). For example, the communication control device calculates the maximum allowable transmission power of each base station device 40 by calculating back from the interference assignment based on a propagation loss, an antenna gain, and the like. Then, the communication control device notifies each base station device 40 of information on calculated maximum allowable transmission power.

<1-2. Overview of Present Embodiment>

The Citizens Broadband Radio Service (CBRS) legislated by the Federal Communications Commission (FCC) in the United States of America, accepts leasing a spectrum access authority in accordance with a priority access license (PAL). In addition, according to the Public consultation (https://www.ofcom.org.uk/consultations-and-statements/category-1/enabling-opportunities-for-innovation) published by Office of Communications (Ofcom) in the UK, it has become clear that local licensing of frequency spectrum is being examined in the UK.

Normally, in the use of spectrum on a co-primary basis or the like, interference coordination between operator networks is left to arbitration between operators. Here, an example of the operators is a mobile network operator. However, since local network operators are expected to increase in the future, it is not realistic to perform inter-operator arbitration each time. Furthermore, in the case of the CBRS, there are incumbent operators with higher priority, and the spectrum has to be changed according to the spectrum use by radio systems of these operators. Therefore, inter-operator arbitration becomes further unrealistic.

Under the circumstances, it is desirable that an information processor can dynamically and automatically perform inter-operator arbitration. Here, the information processor that performs inter-operator arbitration may be a spectrum management server such as the SAS. The frequency management server is the communication control device in the present embodiment.

Figure 2:
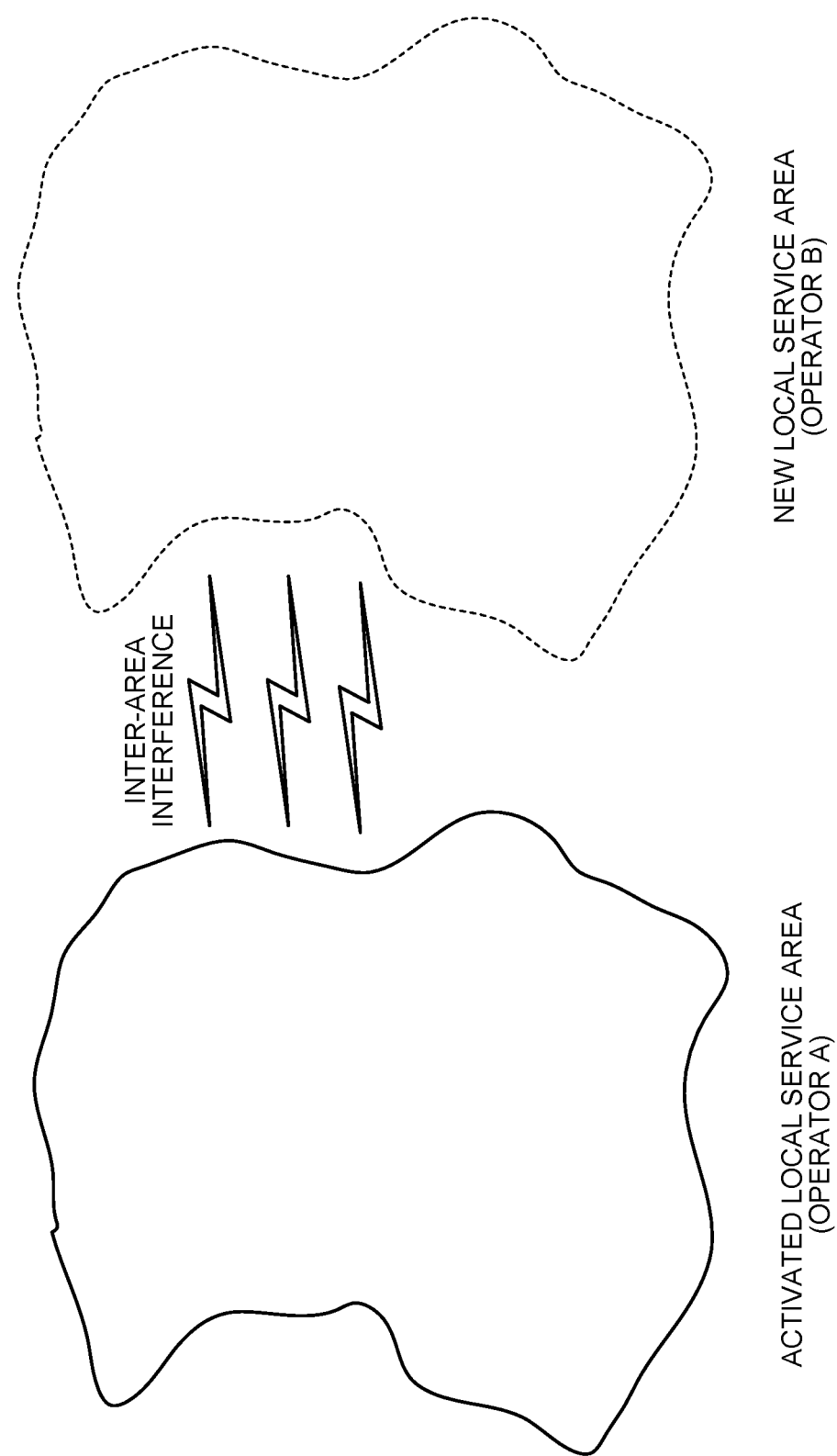
FIG. 2 is a diagram illustrating an outline of a present embodiment.

FIG. 2 is a diagram illustrating an outline of the present embodiment. It is assumed that one local service area (local license area) has already been activated for use by an operator A. Then, it is assumed that, for example, an operator B requests construction of a new local service area (local license area) in the vicinity thereof in order to start a new service. In this case, it is assumed that the operator B does not want to install a base station in advance in an area applicable to requirement for pre-adjustment of inter-area interference. This is because when a large inter-area interference occurs by activating this area as it is, reinstallation of the base station may occur, resulting in a large amount of cost including labor cost.

In order to solve this problem, it is desirable to have a mechanism that enables a user who wishes to construct a local service area to determine in advance whether a desired area is available as the local service area. In this case, it is preferable that the base station can be installed anywhere within the area determined to be available.

The present embodiment provides an information processor that generates information on an area in which a service using a radio system is permitted (permitted area information). The information processor is, for example, the communication control device, and executes the following process.

For example, the information processor acquires desire information from a user who requests construction of a local service area such as the operator B. The desire information is, for example, information regarding an area setting of a predetermined service provided by using the secondary system, and is information including at least information regarding an area desired by the user (hereinafter referred to as desired area information). In addition, the information processor acquires area information of another service that uses or is allocated to a predetermined spectrum used by a predetermined service. Then, the information processor performs calculation regarding inter-area interference from an area specified by the desired area information to an area of the another service. Then, the information processor generates the permitted area information based on a calculation result of the inter-area interference.

As a result, the user such as the operator B does not need to actually install a base station for pre-adjustment of inter-area interference. The user can design arrangement of the base stations based on the permitted area information without actually installing the base station.

<1-3. Terms Related to Frequency and Sharing>

The outline of the present embodiment has been described above, and the present embodiment will be described in detail below. Before describing the present embodiment in detail, terms related to frequency and sharing used in the present embodiment will be summarized.

In the present embodiment, it is assumed that the primary system (e.g., communication system 1) and the secondary system (e.g., communication system 2) are in an environment of dynamic spectrum access (DSA). Hereinafter, terms related to frequency and sharing will be described, taking the CBRS legislated by the FCC in the United States as an example. Note that the communication system 1 and the communication system 2 of the present embodiment are not limited to systems in the CBRS.

Figure 3:
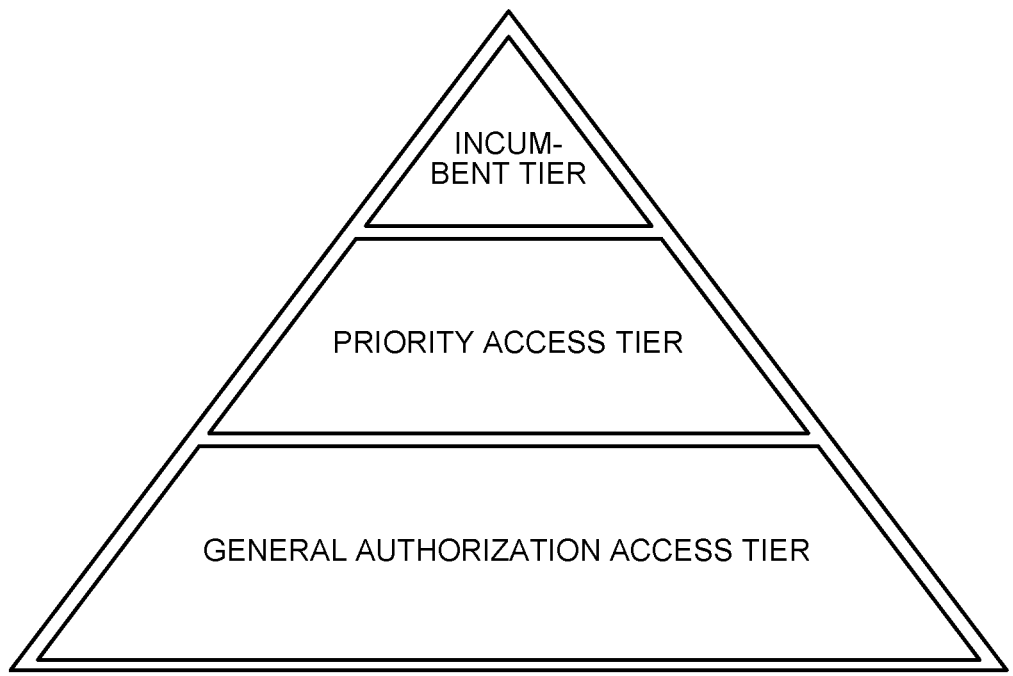
FIG. 3 is an explanatory diagram illustrating a hierarchical structure in the Citizens Broadband Radio Service (CBRS).

FIG. 3 is an explanatory diagram illustrating a hierarchical structure in the CBRS. As shown in FIG. 3, each of users in shared spectrum is classified into one of three groups. This group is called "tier". The three groups are called the Incumbent tier, Priority Access tier, and General Authorized Access tier. In the example in FIG. 3, the Priority Access tier is located above the General Authorized Access tier, and the Incumbent tier is located above the Priority Access tier. Using the CBRS as an example, a system in the Incumbent tier (existing system) is the primary system, and systems in the General Authorized Access tier and the Priority Access tier are the secondary systems.

The Incumbent tier is a group of existing users currently operating in a spectrum defined as a shared spectrum. The existing user may also be referred to as a primary user. In the CBRS, the Department of Defense (DOD), a fixed satellite operator, and a grandfathered wireless broadband licensee (Grandfathered Wireless Broadband License: GWBL) are defined as the existing users. The Incumbent tier is not required to avoid or suppress interference with the Priority Access tier and the General Authorized Access (GAA) tier that have lower priority than the Incumbent tier. In addition, the Incumbent tier is protected from interference by the Priority Access tier and the GAA tier. In other words, the users in the Incumbent tier can use the spectrum without considering the existence of other tiers.

The Priority Access tier is a group of users who use the above-described shared spectrum based on a license called the PAL. The user who uses the above-described shared spectrum may also be referred to as a secondary user. In spectrum sharing, the Priority Access tier is required to avoid or suppress interference with the Incumbent tier having a higher priority than the Priority Access tier. However, the Priority Access tier is not required to avoid or suppress interference with the GAA tier having a lower priority. In addition, the Priority Access tier is not protected from interference by the Incumbent tier having a higher priority, but is protected from interference by the GAA tier having a lower priority.

The GAA tier is a group including other users that do not belong to the foregoing Incumbent tier and Priority Access tier. Users in this tier may also be referred to as the secondary users. However, since the GAA tier has the lower priority than the Priority Access tier, the GAA tier may also be referred to as a low-priority secondary user. In spectrum sharing, the GAA tier is required to avoid or suppress interference with the Incumbent tier and the Priority Access tier having higher priority. In addition, the GAA tier is not protected from interference by the Incumbent tier and the Priority Access tier having higher priority. In other words, the GAA tier is a "tier" that is subject to an opportunistic shared access in a legal sense.

Note that the hierarchical structure is not limited to these definitions. The CBRS is generally called a three-tier structure, but a two-tier structure is also acceptable. A typical example of the two-tier structure is a licensed shared access (LSA) and a TV band white space (TVWS). The LSA adopts a structure equivalent to a combination of the Incumbent tier and the Priority Access tier. The TVWS adopts a structure equivalent to a combination of the Incumbent tier and the GAA tier. Still more, there may be four or more tiers. Specifically, for example, intermediate tiers corresponding to the Priority Access tier may be further prioritized. Further, for example, the GAA tier may also be similarly prioritized.

Figure 4:
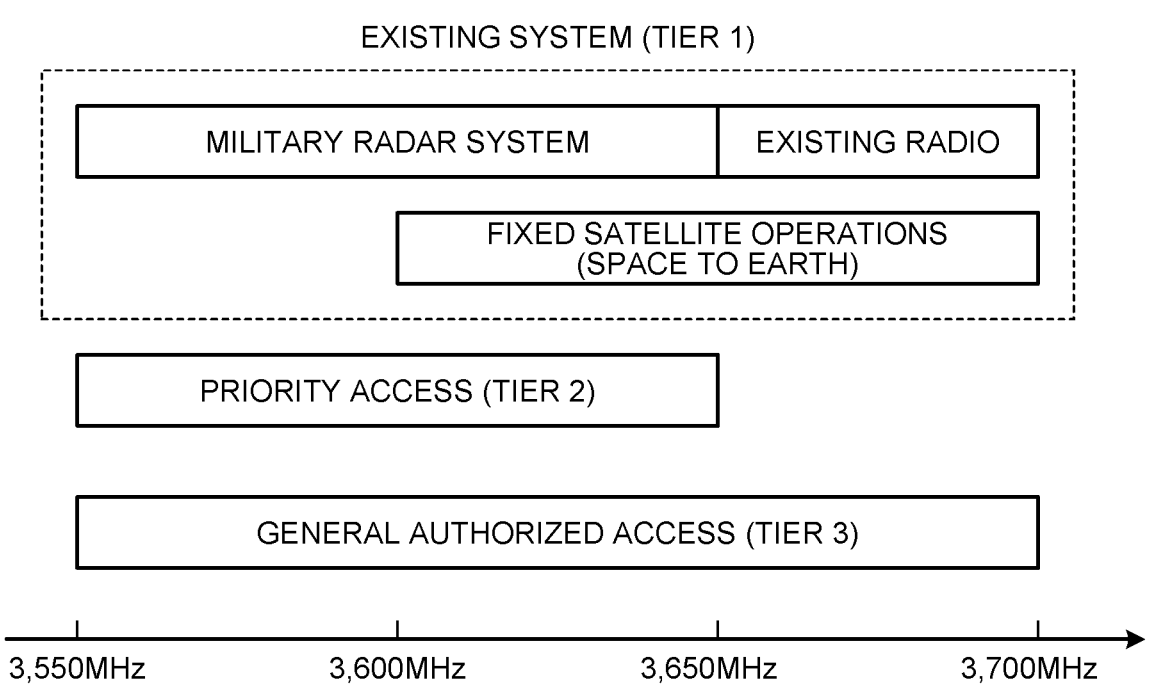
FIG. 4 is an explanatory diagram illustrating a CBRS spectrum.

FIG. 4 is an explanatory diagram illustrating a CBRS spectrum. Taking the CBRS described above as an example, the primary system is a military radar system, grandfathered wireless system, or a fixed satellite service (space-to-earth). The military radar system is typically a carrier-mounted radar. The secondary system is a radio network system including a base station and a terminal called a citizens broadband radio service device (CBSD) and an end user device (EUD). A priority further exists in the secondary system. The PAL in which a shared spectrum is licensed and a general authorized access (GAA) equivalent to no license are specified. Tier 1 illustrated in FIG. 4 corresponds to the Incumbent tier illustrated in FIG. 3. Further, tier 2 illustrated in FIG. 4 corresponds to the Priority Access tier illustrated in FIG. 3. Further, tier 3 illustrated in FIG. 4 corresponds to the GAA tier illustrated in FIG. 3.

Note that the primary system and the secondary system are not limited to the above examples. For example, a radio system included in the Priority Access tier may be regarded as the primary system, and a system included in the GAA tier may be regarded as the secondary system.

In addition, the primary system (communication system 1) of the present embodiment is not limited to the example illustrated in FIG. 4. Other types of radio system may be used as the primary system (communication system 1). For example, the primary system may include radio systems such as a TV broadcast, a fixed microwave line system (fixed system (FS)), a meteorological radar, a radio altimeter, a communications-based train control, and a radio astronomy. In addition, the primary system may be a television broadcasting system such as a digital video broadcasting-terrestrial (DVB-T) system or a cellular communication system such as long term evolution (LTE) and new radio (NR). The primary system may also be an aeronautical radio system such as an aeronautical radio navigation service (ARNS). It is apparent that the primary system is not limited to the above radio systems, and may be other types of radio system. Other radio systems may be included in the primary system according to an applicable country, region, and frequency band.

Further, unused radio waves (white space) that the communication system 2 accesses are not limited to radio waves in the Federal use band (3.55-3.70 GHz). The communication system 2 may access unused radio waves in a spectrum different from the Federal use band (3.55-3.70 GHz). For example, when the primary system (communication system 1) is the television broadcasting system, the communication system 2 may be a system that uses a TV white space as unused radio waves. Here, the TV white space refers to a spectrum that is not used by the television broadcasting system in frequency channels allocated to the television broadcasting system (primary system). In this case, the TV white space may be an unused channel according to a region.

A relationship between the communication system 1 and the communication system 2 is not limited to a spectrum sharing relationship in which the communication system 1 is the primary system and the communication system 2 is the secondary system. The relationship between the communication system 1 and the communication system 2 may be a network coexistence relationship between the same or different radio systems using the same spectrum.

In addition, application of the present embodiment is not limited to the spectrum sharing environment. In general spectrum sharing or secondary access, the incumbent system using a target spectrum is referred to as the primary system, and a system of the secondary user is referred to as the secondary system. However, in a case where the present embodiment is applied to an environment other than the spectrum sharing environment, the primary system and secondary system may be replaced with a system given another term. For example, a macrocell base station may be the primary system, and a small cell or a relay station may be the secondary system in a heterogeneous network (Het- Net). In addition, the base station may be the primary system, and a relay user equipment (UE) or a vehicle UE that implements device to device (D2D) or vehicle to everything (V2X) in a coverage of the primary system may be defined as the secondary system. The base station is not limited to a fixed type, and may be a portable/mobile type. In this case, for example, the communication control device provided by the present invention may be included in a core network, the base station, a relay station, the relay UE, or the like.

The term "spectrum" appearing in the following description may be replaced with other terms. For example, the term "spectrum" may be replaced with terms such as "resource", "resource block", "resource element", "resource pool", "channel", "component carrier", "bandwidth part (BWP)", "carrier", "subcarrier", "bandwidth part (BWP)", and "beam" or terms having equivalent or similar meanings.

2. CONFIGURATION OF COMMUNICATION SYSTEM

A communication system 1000 according to an embodiment of the present disclosure will be described below. The communication system 1000 includes the communication system 1 and the communication system 2. The communication system 1 (first radio system) is a radio communication system that performs radio communication using a predetermined spectrum (primary use). In addition, the communication system 2 (second radio system) is a radio communication system that performs radio communication by secondarily using the spectrum used by the communication system 1. For example, the communication system 2 is the radio communication system that makes a dynamic spectrum access to unused radio waves of the communication system 1. The communication system 2 provides a radio service to a user or a device owned by the user by using a predetermined radio access technology.

Here, the communication systems 1 and 2 may be cellular communication systems such as wideband code division multiple access (W-CDMA), code division multiple access 2000 (cdma2000), LTE, and NR. In the following description, LTE includes LTE-Advanced (LTE-A), LTE-Advanced Pro (LTE-A Pro), and evolved universal terrestrial radio access (EUTRA). In addition, NR includes new radio access technology (NRAT) and further EUTRA (FEUTRA).

The NR is the next generation (fifth generation) radio access technology (RAT) of LTE. The NR is a radio access technology that can support various use cases including enhanced mobile broadband (eMBB), massive machine type communications (mMTC), and ultra-reliable and low latency communications (URLLC).

Note that the communication systems 1 and 2 are not limited to the cellular communication system. For example, the communication system 2 may be another radio communication system such as a wireless local area network (LAN) system, a television broadcasting system, an aviation radio system, or a space radio communication system.

In the present embodiment, the communication system 1 is the primary system, and the communication system 2 is the secondary system. As described above, a plurality of communication systems 1 and a plurality of communication systems 2 may be provided. In the example in FIG. 1, the communication system 1 includes one radio apparatus 10 (radio apparatus $10_1$ illustrated in FIG. 1). However, as described above, the communication system 1 may include a plurality of radio apparatuses 10. The configuration of the radio apparatus 10 may be the same as or different from a configuration of the base station device 40 or a terminal device 30 described later.

<2-1. Overall Configuration of Communication System>

The communication system 1000 typically includes the following entities.
Communication apparatus (e.g., radio apparatus, base station device, or intermediate device)
Terminal device
Management apparatus (e.g., communication control device)

Note that, in the following description, the entities serving as the communication apparatuses are assumed to be the radio apparatus 10, the base station device 40, and the intermediate device 50. However, the entities serving as the communication apparatuses are not limited to these devices, and may be other communication apparatuses (e.g., management apparatus 20, terminal device 30, and communication control device 60). For example, an external apparatus described later may be regarded as a part of the communication system 1000. Obviously, the external apparatus does not need to a part of the communication system 1000. Furthermore, the terminal device 30 may be regarded as the external apparatus.

In the present embodiment, unless otherwise noted, the terminal device 30 and the base station device 40 are entities configuring the secondary system that shares a part or all of the spectrum allocated to the primary system. In the present embodiment, it is assumed that two different types of communication apparatuses exist in these communication apparatuses configuring the secondary system.

First, a communication apparatus that can access the communication control device 60 without using a radio path with permission of the communication control device 60 is referred to as a "communication apparatus (Type A)". Specifically, for example, a communication apparatus capable of wired Internet connection can be regarded as the "communication apparatus (Type A)". In addition, for example, a wireless relay device that has no function of wired Internet connection may be regarded as the "communication apparatus (Type A)" as long as a wireless backhaul link using a spectrum that does not require permission of the communication control device 60 is constructed with another communication apparatus (Type A).

A communication apparatus that cannot access the communication control device 60 without a wireless path accompanied by permission of the communication control device 60 is referred to as a "communication apparatus (Type B)". For example, the wireless relay device that needs to construct the backhaul link using a frequency that requires permission of the communication control device 60 can be regarded as the "communication apparatus (Type B)". Furthermore, for example, a terminal device such as a smartphone having a wireless networking function typically by tethering and using a frequency that requires permission of the communication control device 60 for both the backhaul link and the access link may be regarded as the "communication apparatus (Type B)".

The communication apparatus is not necessarily fixed and installed, and may be installed in a moving object such as a vehicle. Furthermore, a function of the communication apparatus is not necessarily provided on the ground, and may be provided in an object present in the air or space such as an aircraft, a drone, a helicopter, or a satellite; or an object present above the sea or under the sea such as a ship or a submarine. Typically, these mobile communication apparatuses correspond to the communication apparatus (Type B), and an access route to the communication control device is secured by performing radio communication with another communication apparatus (Type A). It is apparent that when the frequency used in the radio communication with the communication apparatus (Type A) is not managed by the communication control device, a mobile communication apparatus can be regarded as the communication apparatus (Type A).

Figure 5:
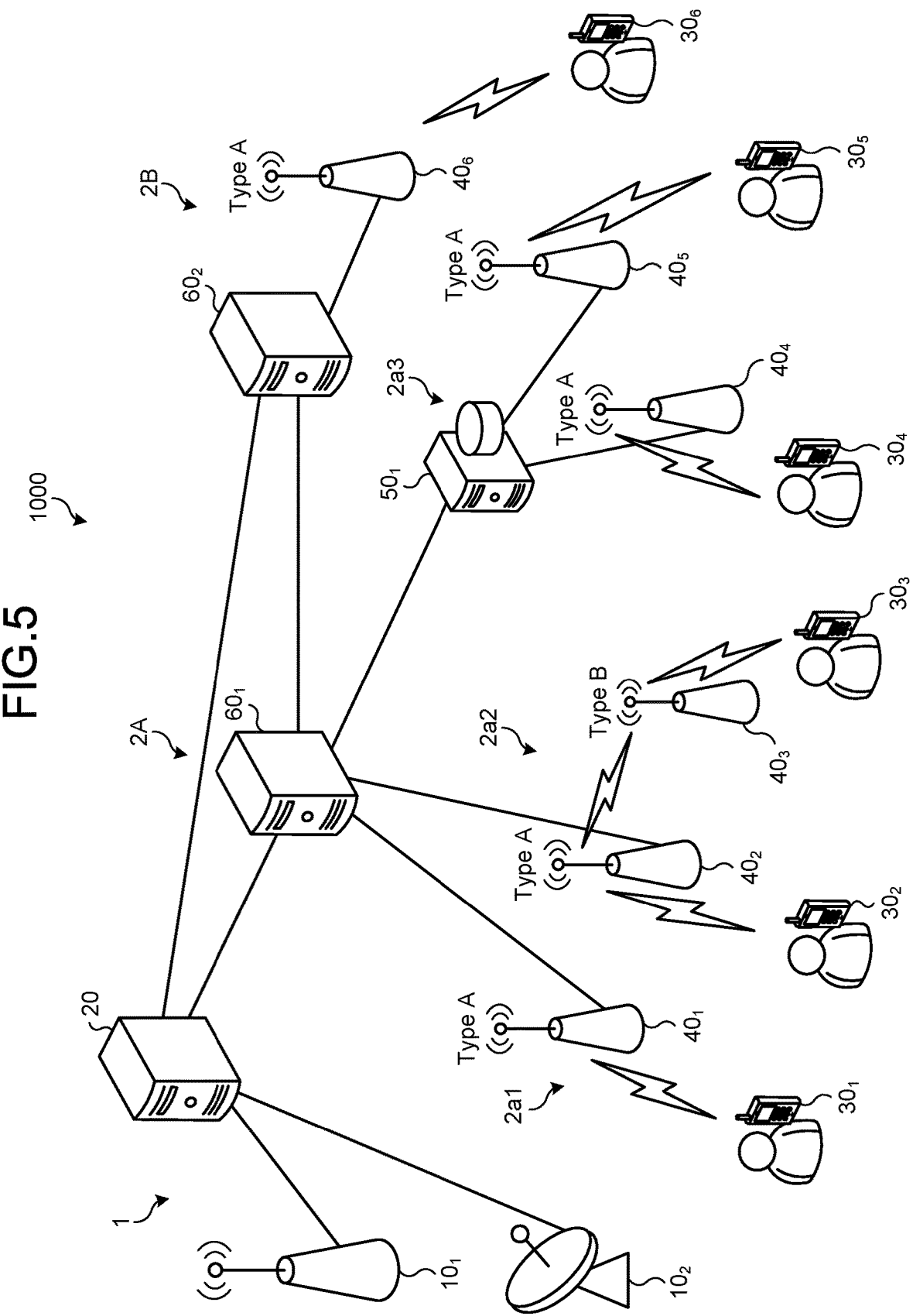
FIG. 5 is a diagram illustrating a configuration example of a communication system according to an embodiment of the present disclosure.

FIG. 5 is a diagram illustrating a configuration example of the communication system 1000 according to the embodiment of the present disclosure. As described above, the communication system 1000 includes the communication system 1 and the communication system 2. Note that devices in the figure can also be considered as devices in a logical sense. In other words, a part of the devices in the drawing may be realized by a virtual machine (VM), a container, a docker, or the like, and they may be implemented on physically the same hardware.

The communication system 1 includes the radio apparatus 10 and the management apparatus 20. In the example in FIG. 5, the communication system 1 includes radio apparatuses $10_1$ and $10_2$ and the management apparatus 20 that manages the radio apparatuses $10_1$ and $10_2$. Note that the communication system 1 may not necessarily include the management apparatus 20. Furthermore, the communication system 1 may include a plurality of radio apparatuses 10 or may include only a single radio apparatus. In the example in FIG. 5, each of the radio apparatuses $10_1$ and $10_2$ can be regarded as one communication system 1.

The communication system 2 includes the terminal device 30, the base station device 40, the intermediate device 50, and the communication control device 60. In the example in FIG. 5, a communication system 2A and a communication system 2B are described as the communication system 2. The communication system 2A includes a communication system 2a1, a communication system 2a2, and a communication system 2a3.

The communication system 2a1 includes a terminal device $30_1$ and a base station device $40_1$. The communication system 2a2 includes terminal devices $30_2$ and $30_3$ and base station devices $40_2$ and $40_3$. The communication system 2a3 includes terminal devices $30_4$ and $30_5$, base station devices $40_4$ and $40_5$, and an intermediate device $50_1$. Furthermore, the communication system 2B includes a terminal device $30_6$ and a base station device $40_6$. In the example in FIG. 5, the base station devices $40_1$, $40_2$ and $40_4$ to $40_6$ are the communication apparatuses (Type A), and the base station device $40_3$ is the communication apparatus (Type B).

Note that the communication system 2 may not necessarily include the communication control device 60. Using the example in FIG. 5, each of the communication system 2a2 and the communication system 2a3 having the communication control device 60 outside may be regarded as one communication system 2. Furthermore, the communication system 2 may not necessarily include the intermediate device 50. In the example in FIG. 5, the communication system 2a1 not including the intermediate device 50 may be regarded as one communication system 2.

The communication systems 1 and 2 provide radio services to a user or a device possessed by the user by linked operation of the devices (e.g., communication apparatus such as radio communication apparatus) configuring the communication systems 1 and 2. The radio communication apparatus is an apparatus having a function of radio communication. In the example in FIG. 5, the radio apparatus 10, the base station device 40, and the terminal device 30 correspond to the radio communication apparatuses.

Note that the intermediate device 50 and the communication control device 60 may have a radio communication function. In this case, the intermediate device 50 and the communication control device 60 can also be regarded as the radio communication apparatuses. In the following description, the radio communication apparatus may be simply referred to as a communication apparatus. Note that the communication apparatus is not limited to the radio communication apparatus, and for example, an apparatus that does not have the radio communication function and can only perform wired communication can also be regarded as the communication apparatus.

In the present embodiment, the concept of the "communication apparatus" includes not only a portable mobile device (e.g., terminal device), such as a mobile terminal, but also a device installed in a structure or a mobile body. The structure or the mobile body itself may be regarded as the communication apparatus. Further, the concept of the communication apparatus includes not only the terminal device but also the base station device and the relay device. The communication apparatus is one type of processor and information processor. The description of the "communication apparatus" in the following description can be rephrased as a "transmitter" or a "receiver" as appropriate. Note that, in the present embodiment, the concept of "communication" includes "broadcasting". In this case, the "communication apparatus" can be rephrased as a "broadcasting apparatus" as appropriate. Obviously, the "communication apparatus" may also be appropriately rephrased as the "transmitter" or the "receiver" as appropriate.

The communication system 2 may include a plurality of terminal devices 30, a plurality of base station devices 40, a plurality of communication control devices 60, and a plurality of intermediate devices 50. In the example in FIG. 5, the communication system 2 includes terminal devices $30_1$, $30_2$, $30_3$, $30_4$, $30_5$, and so on as the terminal device 30. Still more, the communication system 2 includes base station devices $40_1$, $40_2$, $40_3$, $40_4$, $40_5$, $40_6$, and so on as the base station device 40. Further, the communication system 2 includes communication control devices $60_1$ and $60_2$ as the communication control device 60.

In the following description, the radio communication apparatus may be referred to as the radio system. For example, each of the terminal devices $30_1$ to $30_5$ is one radio system. In addition, each of the radio apparatus 10 and the base station devices $40_1$ to $40_6$ is one radio system. In the following description, the communication system 1 is referred to as the first radio system, but each of one or more radio apparatuses 10 included in the communication system 1 may be regarded as the first radio system. In addition, in the following description, each of one or more base station devices 40 included in the communication system 2 is referred to as the second radio system, but the communication system 2 itself may be regarded as the second radio system, or each of one or more terminal devices 30 included in the communication system 2 may be regarded as the second radio system. When the intermediate device 50 and the communication control device 60 have a radio communication function, each of the intermediate devices 50 or each of the communication control devices 60 may be regarded as the second radio system.

Note that the radio system may be one system configured with a plurality of communication apparatuses including at least one radio communication apparatus. For example, a system configured with one or more base station devices 40 and one or more terminal devices 30 under the base station devices 40 may be regarded as one radio system. Furthermore, each of the communication system 1 and the communication system 2 may also be regarded as one radio system. In the following description, a communication system configured with a plurality of communication apparatuses including at least one radio communication apparatus may be referred to as the radio communication system or simply as a communication system. Note that one system configured with a plurality of communication apparatuses including one radio communication apparatus may be regarded as the first radio system or the second radio system.

In the present embodiment, the system means a set of a plurality of components (devices, modules (parts), and the like). In this case, all the components configuring the system may or may not be in the same housing. For example, a plurality of devices housed in separate housings and connected by wire and/or wirelessly is one system. Still more, one device in which a plurality of modules are housed in one housing is also one system.

(Radio Apparatus)

The radio apparatus 10 is the radio communication apparatus configuring the communication system 1 (primary system). The radio apparatus 10 may be a radio emission device such as a radar or a reflected wave receiver. As described above, the primary system is, for example, the military radar system, the existing system (e.g., television broadcasting system or incumbent cellular communication system), or a system for fixed satellite service.

In a case where the communication system 1 is the military radar system, the radio apparatus 10 is, for example, a carrier-mounted radar. In a case where the communication system 1 is the television broadcasting system, the radio apparatus 10 is, for example, a broadcasting station (broadcasting station as equipment) such as a broadcasting relay station. In a case where the communication system 1 is the system for fixed satellite service, the radio apparatus 10 is, for example, a parabolic antenna that receives radio waves from an artificial satellite. It is apparent that the radio apparatus 10 is not limited thereto. For example, when the communication system 1 is the incumbent cellular communication system, the radio apparatus 10 may be a base station device.

Similarly to the base station device 40 to be described later, the radio apparatus 10 may be capable of communicating with other communication apparatuses using the radio access technology. The radio access technology used by the radio apparatus 10 may be a cellular communication technology or a wireless LAN technology. Obviously, the radio access technology used by the base station device 40 is not limited thereto, and may be other radio access technologies. For example, the radio access technology used by the radio apparatus 10 may be a low power wide area (LPWA) communication technology. The LPWA communication is communication conforming to LPWA standards. For example, the LPWA standards include ELTRES, ZETA, SIGFOX, LoRaWAN, and NB-IoT. It is apparent that the LPWA standards are not limited thereto, and may be other LPWA standards. In addition, the radio communication used by the radio apparatus 10 may be radio communication using millimeter waves. The radio communication used by the radio apparatus 10 may be radio communication using radio waves or radio communication (optical) using infrared rays or visible light.

In addition, the configuration of the radio apparatus 10 may be similar to that of the terminal device 30 or the base station device 40 described later.

(Management Apparatus)

The management apparatus 20 manages the radio apparatus 10. For example, the management apparatus 20 is a server or a database owned by an operator or an administrator of the communication system 1.

Note that the management apparatus 20 may be the server or the database owned by a public institution. For example, the management apparatus 20 may be the database (e.g., regulatory database) managed and operated by a national or regional radio administration agency. An example of the regulatory database is the universal licensing system (ULS) operated by the FCC.

In addition, in a case where the communication system 1 is the incumbent cellular communication system, the management apparatus 20 may be an apparatus that manages a wireless network. For example, the management apparatus 20 may be an apparatus that functions as a mobility management entity (MME), an access and mobility management function (AMF), or a session management function (SMF).

When the communication system 2 configures a network including the radio apparatus 10 as one of nodes, the management apparatus 20 may be, for example, a network manager that integrally controls the radio apparatus 10 in the network.

Obviously, the management apparatus 20 is not limited to these examples. Note that the radio apparatus 10 may have the function of the management apparatus 20. In this case, the radio apparatus 10 can be regarded as the management apparatus 20.

In addition, the management apparatus 20 may have a function of the communication control device. In this case, the management apparatus 20 can be regarded as the communication control device 60.

(Terminal Device)

The terminal device 30 is the communication device having the communication function. The terminal device 30 is typically the communication device such as a smartphone. The terminal device 30 may be a user terminal such as a mobile phone, a smart device (smartphone or tablet), a wearable terminal, an Internet of Things (IoT) device, a personal digital assistant (PDA), or a personal computer. Furthermore, the terminal device 30 may be a business camera provided with the communication function, or may be the communication device such as a field pickup unit (FPU) for television broadcasting. Furthermore, the terminal device 30 may be a motorcycle, a mobile relay car, or the like on which the communication device such as the FPU is mounted. In addition, a device called customer premises equipment (CPE) provided to ensure Internet connection may function as the terminal. Furthermore, the terminal device 30 may be a machine-to-machine (M2M) device or the IoT device. The terminal device may be referred to as user equipment, a user terminal, a user station, a mobile terminal, a mobile station, or the like. Still more, the terminal device 30 may also be referred to as, for example, MTC UE, NB-IoT UE, or Cat.M UE.

Further, the terminal device 30 may be capable of performing sidelink communication with another terminal device 30. When performing the sidelink communication, the terminal device 30 may be able to use an automatic retransmission technology such as hybrid automatic repeat request (HARQ). Note that the radio communication (including sidelink communication) used by the terminal device 30 may be radio communication using radio waves or radio communication (optical) using infrared rays or visible light.

Furthermore, the terminal device 30 may be a mobile device. Here, the mobile device is a movable radio communication apparatus. In this case, the terminal device 30 may be the radio communication apparatus installed in the mobile body or may be the mobile body itself. For example, the terminal device 30 may be a vehicle that travels on a road such as an automobile, a bus, a truck, and a motorcycle, or the radio communication apparatus mounted on the vehicle. Note that the mobile body may be a mobile terminal, or may be the mobile body that travels on land (on the ground in a narrow sense), underground, on water, or under water. Furthermore, the mobile body may be a mobile body that travels in the atmosphere, such as a drone and a helicopter, or may be the mobile body that travels outside the atmosphere, such as an artificial satellite.

The terminal device 30 may be simultaneously connected to a plurality of base station devices or a plurality of cells to perform communication. For example, in a case where one base station device supports a communication area via the plurality of cells (e.g., pCell and sCell), it is possible to bundle the plurality of cells and establish communication between the base station device 40 and the terminal device 30 by the carrier aggregation (CA) technology, the dual connectivity (DC) technology, or the multi-connectivity (MC) technology. Alternatively, the terminal device 30 and the plurality of base station devices 40 can communicate with each other by the coordinated transmission and reception (Coordinated Multi-Point Transmission and Reception; CoMP) technology via the cells of different base station devices 40.

Note that the terminal device 30 is not necessarily used by a person. The terminal device 30 may be a sensor installed in a machine or a building in a factory, such as so-called machine type communication (MTC). Furthermore, the terminal device 30 may be a machine-to-machine (M2M) device or the IoT device. Furthermore, the terminal device 30 may be a device having a relay communication function as represented by D2D or V2X devices. Furthermore, the terminal device 30 may be a device called CPE used for wireless backhaul or the like. Furthermore, the terminal device 30 may be the radio communication apparatus installed in the mobile body or may be the mobile body itself.

In the present embodiment, unless otherwise noted, the terminal device 30 corresponds to an entity that terminates a radio link using spectrum that requires permission of the communication control device 60. However, the terminal device 30 can perform an operation equivalent to that of the communication apparatus depending on a function included in the terminal device 30 or a network topology applied. In other words, when the technology disclosed in the present embodiment is implemented, the communication apparatus may be referred to as the terminal device and the terminal device may be referred to as the communication apparatus according to the network topology.

(Base Station Device)

The base station device 40 (second radio system) is a radio communication apparatus that wirelessly communicates with the terminal device 30 or another communication apparatus (another base station device 40 and another intermediate device 50). For example, the base station device 40 is a wireless apparatus that provides a communication service to terminals. The base station device 40 is one type of communication apparatus. The base station device 40 is, for example, a device corresponding to a radio base station (e.g., base station, Node B, eNB, and gNB) or a radio access point. When the base station device 40 is the radio access point, the base station device 40 may be referred to as non-3GPP access. The base station device 40 may be a relay node. Still more, the base station device 40 may be an on-road base station device such as a road side unit (RSU). Further, the base station device 40 may be an optical extension device called a remote radio head (RRH). Furthermore, the base station device 40 may be a receiving station device such as the FPU. Furthermore, the base station device 40 may be an integrated access and backhaul (IAB) donor node or an IAB relay node that provides a radio access line and a radio backhaul line by time division multiplexing, frequency division multiplexing, or space division multiplexing.

Note that the radio access technology used by the base station device 40 may be the cellular communication technology or the wireless LAN technology. Obviously, the radio access technology used by the base station device 40 is not limited thereto, and may be other radio access technologies. For example, the radio access technology used by the base station device 40 may be the LPWA communication technology. The LPWA communication is communication conforming to LPWA standards. For example, the LPWA standards include ELTRES, ZETA, SIGFOX, LoRaWAN, and NB-IoT. It is apparent that the LPWA standards are not limited thereto, and may be other LPWA standards. In addition, the radio communication used by the base station device 40 may be radio communication using millimeter waves. Furthermore, the radio communication used by the base station device 40 may be radio communication using radio waves or radio communication (optical) using infrared rays or visible light.

In the present embodiment, the base station in the radio communication system may be referred to as the base station device. Note that the radio access technology used by the base station device 40 may be the cellular communication technology or the wireless LAN technology. Obviously, the radio access technology used by the base station device 40 is not limited thereto, and may be other radio access technologies. Furthermore, the radio communication used by the base station device 40 may be radio communication using radio waves or radio communication (optical) using infrared rays or visible light.

The base station device 40 is not necessarily fixed, and may be installed in a moving object such as an automobile. Furthermore, the base station device 40 does not necessarily need to exist on the ground. The function of the communication apparatus may be provided in an object existing in the air or space such as an aircraft, a drone, a helicopter, or a satellite; or an object present above the sea or under the sea such as a ship or a submarine. In such a case, the base station device 40 can perform radio communication with another fixed communication apparatus.

Note that the concept of the base station device (also referred to as the base station) includes not only a donor base station but also a relay base station (also referred to as a relay station or a relay station device). The concept of the base station also includes the access point. In addition, the concept of the base station includes not only a structure having a function of the base station but also an apparatus installed in the structure.

The structure is, for example, a building such as an office building, a house, a steel tower, a station, an airport, a harbor, or a stadium. Note that the concept of the structure includes not only a building but also a construction (non-building structure) such as a tunnel, a bridge, a dam, a wall, or an iron pillar, and equipment such as a crane, a gate, or a windmill. In addition, the concept of the structure includes not only a structure on land (on the ground in a narrow sense) or underground, but also a structure on water such as a platform or a megafloat, and a structure under water such as a marine observation facility.

The base station device 40 may be a donor station or a relay station. In a case where the base station device 40 is the relay station, the apparatus is not limited to the apparatus on which the base station device 40 is mounted as long as a relay function is satisfied. For example, the base station device 40 may be mounted on a terminal device such as a smartphone, may be mounted on an automobile or a human-powered vehicle, may be mounted on a balloon, an airplane, or a drone, or may be mounted on a home appliance such as a television, a game machine, an air conditioner, a refrigerator, or a lighting fixture. Obviously, these apparatuses themselves may be regarded as the base station device 40.

Furthermore, the base station device 40 may be a fixed station or a mobile station. The mobile station is a radio communication apparatus (e.g., base station device) configured to be movable. In this case, the base station device 40 may be a device installed in the mobile body or may be the mobile body itself. For example, the relay station device having mobility can be regarded as the base station device 40 as the mobile station. In addition, a device that is originally capable of moving, such as a vehicle, a drone, or a smartphone, and has a function of the base station device (at least a part of the function of the base station device) is also the base station device 40 as the mobile station.

Here, the mobile body may be the mobile terminal such as a smartphone or a mobile phone. In addition, the mobile body may be a mobile body that travels on land (ground in a narrow sense) (e.g., vehicle including an automobile, a bicycle, a bus, a truck, a motorcycle, a train, and a linear motor car) or a mobile body that travels underground (e.g., inside tunnel) (e.g., subway).

In addition, the mobile body may be a mobile body that travels on water (e.g., ship such as a passenger ship, a cargo ship, or a hovercraft) or a mobile body that moves under water (e.g., submersibles such as a submersible vessel, a submarine, and an unmanned submarine).

Furthermore, the mobile body may be a mobile body that travels in the atmosphere (e.g., aerial vehicle such as an airplane, an airship, and a drone) or a mobile body that travels outside the atmosphere (e.g., artificial bodies such as artificial satellites, spacecraft, a space station, and a probe vehicle). A mobile body moving outside the atmosphere can be rephrased as a space mobile body.

Furthermore, the base station device 40 may be a ground base station device (ground station device) installed on the ground. For example, the base station device 40 may be a base station device installed in a structure on the ground, or may be a base station device installed in a mobile body moving on the ground. More specifically, the base station device 40 may be an antenna installed in a structure such as a building and a signal processing device connected to the antenna. Obviously, the base station device 40 may be the structure or the mobile body itself. The "ground" in a broad sense includes not only land (ground in a narrow sense) but also underground, on water, and under water.

Note that the base station device 40 is not limited to the ground base station device. The base station device 40 may be a non-ground base station device (non-ground station device) capable of floating in the air or space. For example, the base station device 40 may be an aircraft station device or a satellite station device.

The aircraft station device is the radio communication apparatus capable of floating in the atmosphere (including the stratosphere), such as an aircraft. The aircraft station device may be a device mounted on the aircraft or the like, or may be the aircraft itself. Note that the concept of the aircraft includes not only a heavy aircraft such as an airplane and a glider but also a light aircraft such as a balloon and an airship. In addition, the concept of the aircraft includes not only heavy and light aircrafts but also a rotorcraft such as a helicopter and an autogyroscope. Note that the aircraft station device (or the aircraft on which an aircraft station device is mounted) may be an unmanned aerial vehicle such as a drone.

Note that the concept of the unmanned aerial vehicle also includes an unmanned aircraft system (UAS) and a tethered UAS. The concept of the unmanned aerial vehicle also includes lighter than air (LTA) UAS and heavier than air (HTA) UAS. Furthermore, the concept of unmanned aerial vehicles also includes high altitude UAS platforms (HAPs).

The satellite station device is the radio communication apparatus capable of floating outside the atmosphere. The satellite station device may be a device mounted on a space mobile body such as an artificial satellite, or may be the space mobile body itself. The satellite serving as the satellite station device may be any of a low earth orbiting (LEO) satellite, a medium earth orbiting (MEO) satellite, a geosynchronous earth orbiting (GEO) satellite, and a highly elliptical orbiting (HEO) satellite. Obviously, the satellite station device may be a device mounted on the LEO satellite, the MEO satellite, the GEO satellite, or the HEO satellite.

As described above, the base station device 40 may be the relay station device. The relay station device is, for example, an aircraft station or an earth station. The relay station device can be regarded as one type of the above-described relay devices. The aircraft station is a radio station installed on the ground or the mobile body traveling on the ground in order to communicate with the aircraft station device. Furthermore, the earth station is a radio station located on the earth (including air.) in order to communicate with the satellite station device. The earth station may be a large earth station or a small earth station such as a very small aperture terminal (VSAT).

Note that the earth station may be a VSAT controlled earth station (also referred to as a master station or a HUB station) or a VSAT earth station (also referred to as a slave station). Furthermore, the earth station may be a wireless station installed in the mobile body moving on the ground. For example, as the earth station mounted on ship, there is an earth station on board vessels (ESV). Furthermore, the earth station may include an aircraft earth station that is installed in an aircraft (including a helicopter) and communicates with the satellite station. Furthermore, the earth station may include an aeronautical earth station that is installed on the mobile body moving on the ground and communicates with the aircraft earth station via a satellite station. Note that the relay station device may be a portable movable radio station that communicates with the satellite station or the aircraft station.

The coverage of the base station device 40 may be large such as a macro cell to small such as a pico cell. It is apparent that the magnitude of the coverage of the base station device 40 may be extremely small such as a femto cell. Various coverage sizes of the base station device 40 can be allowed. Note that one cell may be formed by a plurality of base station devices 40, such as a distributed antenna system (DAS). Further, the base station device 40 may have a beamforming capability. In this case, the base station device 40 may form a cell or a service area for each beam.

The base station device 40 may be utilized, operated, and/or managed by various entities. For example, it is conceivable that the base station device 40 is a mobile network operator (MNO), a mobile virtual network operator (MVNO), a mobile network enabler (MNE), a mobile virtual network enabler (MVNE), a shared access facility operator, a neutral host network (NHN) operator, a broadcaster, an enterprise, an educational organization (educational institution, board of education in local government, etc.), a real estate (building, apartment, etc.) manager, or an individual. Obviously, the subject of use, operation, and/or management of the base station device 40 is not limited thereto.

The base station device 40 may be installed and/or operated by one business operator, or may be installed and/or operated by one individual. Obviously, the subject of installation/operation of the base station device 40 is not limited thereto. For example, the base station device 40 may be installed and operated in cooperation by a plurality of business operators or a plurality of individuals. Furthermore, the base station device 40 may be a shared access facility used by the plurality of business operators or the plurality of individuals. In this case, installation and/or operation of the equipment may be performed by a third party different from the user.

The base station device 40 operated by the business operator is typically connected to the Internet via a core network. Furthermore, the base station device 40 performs operation management and maintenance by a function called operation, administration & maintenance (OA&M). Note that, in the communication system 2, for example, there may be a network manager that integrally controls the base station devices 40 in the network.

In a case where the radio access technology used by the base station device 40 is the cellular communication technology, each of the plurality of base station devices 40 may form a cell. The cell provided by the base station devices 40 is referred to as, for example, a serving cell. The serving cell may include a primary cell (pCell) and a secondary cell (sCell). When dual connectivity is provided to UE (e.g., terminal device 30), the pCell and the sCell(s) provided by the master node (MN) are referred to as a master cell group. Examples of the dual connectivity include EUTRA-EUTRA dual connectivity, EUTRA-NR dual connectivity (ENDC), EUTRA-NR dual connectivity with 5GC, NR-EUTRA dual connectivity (NEDC), and NR-NR dual connectivity.

Further, the serving cell may include a primary secondary cell (PSCell) or primary SCG cell. In other words, when the dual connectivity is provided to the UE, the PSCell and the sCell(s) provided by the secondary node (SN) are referred to as a secondary cell group (SCG).

Still more, one downlink component carrier and one uplink component carrier may be associated with one cell. Further, a system bandwidth corresponding to one cell may be divided into a plurality of bandwidth parts (BWP). In this case, one or more BWP may be set to the UE, and the UE may use one BWP as an active BWP. In addition, radio resources that can be used by the terminal device 30 (e.g., spectrum, a numerology (subcarrier spacing), and a slot configuration) may be different for each cell, each component carrier, or each BWP. Further, one base station device 40 may provide a plurality of cells.

(Intermediate Device)

The intermediate device 50 communicates with the communication control device 60 as a proxy (representative) of one or the plurality of communication apparatuses (e.g., base station devices 40). For example, the intermediate device 50 is a proxy device (proxy system). The intermediate device 50 is also one type of communication apparatus.

The intermediate device 50 may be a domain proxy (DP) defined in Non Patent Literature 2 or the like. Here, the DP refers to an entity that communicates with the communication control device such as SAS instead of each of a plurality of CBSD, or an entity that communicates with the communication control device such as SAS instead of a network configured with the plurality of CBSD. Note that the intermediate device 50 is not limited to the DP defined in Non Patent Literature 2 as long as it has a function of communicating with the communication control device 60 as a proxy (representative) of one or more communication apparatuses. A network manager that integrally controls the base station devices 40 in the network may be regarded as the intermediate device 50.

Note that the proxy system may be configured with one device or a plurality of devices. Communication between the intermediate device 50 and the base station device 40 may be wired communication or wireless communication. Similarly, communication between the intermediate device 50 and the communication control device 60 may be wired communication or wireless communication.

Note that the communication apparatus that the intermediate device 50 substitutes (represents) is not limited to the base station device 40, and may be, for example, the terminal device 30. In the following description, one or more communication apparatuses (e.g., one or more base station devices 40) that the intermediate device 50 substitutes (represents) may be referred to as a subordinate communication apparatus (e.g., subordinate base station device 40).

(Communication Control Device)

The communication control device 60 manages a communication apparatus (e.g., base station device 40). For example, the communication control device 60 controls radio communication of the base station device 40. For example, the communication control device 60 determines a communication parameter (also referred to as an operation parameter) to be used by the base station device 40 and gives permission or an instruction to the base station device 40.

The communication control device 60 is, for example, a database server called TV white space database (TVWSDB), GLDB, SAS, or automated frequency coordination (AFC). Furthermore, the communication control device 60 may be a network manager that integrally controls wireless apparatuses in a network. In addition, taking the ETSI EN 303 387 or IEEE 802.19.1-2018 as an example, the communication control device 60 may be a control device such as a spectrum manager/coexistence manager that controls radio wave interference between wireless devices. Furthermore, for example, a registered location secure server (RLSS) defined in IEEE 802.11-2016 may also serve as the communication control device 60. In addition, under the spectrum sharing environment, a database (database server, apparatus, and system) such as the GLDB or the SAS can also serve as the communication control device 60. Obviously, the communication control device 60 is not limited to these examples. An entity that determines and/or permits, instructs, and manages the communication parameter of the communication apparatus related to spectrum sharing may be referred to as the communication control device. Basically, a control target of the communication control device 60 is the base station device 40, but the terminal device 30 under the control of the base station device 40 may also be controlled.

Note that when the communication system 2 is the cellular communication system, the communication control device 60 may be an apparatus configuring a core network. A core network CN is, for example, an evolved packet core (EPC) or a 5G core network (5GC). When the core network is the EPC, the communication control device 60 may be, for example, a device having a function as the MME. Furthermore, in a case where the core network is 5GC, the communication control device 60 may be, for example, an apparatus having a function as an access and mobility management function (AMF) or a session management function (SMF). Note that even when the communication system 2 is the cellular communication system, the communication control device 60 is not necessarily an apparatus configuring the core network. For example, the communication control device 60 may be an apparatus having a function as a radio network controller (RNC).

Note that the communication control device 60 may also have a function of a gateway. For example, when the core network is the EPC, the communication control device 60 may be a device having a function as a serving gateway (S-GW) or a packet data network gateway (P-GW). Further, when the core network is 5GC, the communication control device 60 may be a device having as a user plane function (UPF). Furthermore, the communication control device 60 may be the SMF, a PCF, a UDM, or the like. The core network CN may include the SMF, the PCF, the UDM, and the like.

Note that the communication control device 60 is not necessarily a device configuring the core network. For example, it is assumed that the core network is a W-CDMA or cdma2000 core network. In this case, the communication control device 60 may be a device that functions as the RNC.

The communication control device 60 may be connected to each of the plurality of base station devices 40. For example, in the case of 5GC, an N2 reference point exists between the AMF and the NG-RAN, and the AMF and the NG-RAN are logically connected to each other via an NG interface.

The communication control device 60 manages communication of the base station device 40. For example, the communication control device 60 may manage each of the terminal devices 30 according to the position of the terminal device 30 in units of areas (e.g., tracking area or RAN notification area) including a plurality of cells. Note that the communication control device 60 may identify and manage each terminal device 30, such as the terminal device 30 is connected to which base station device 40 (or which cell) or the terminal device 30 exists in which communication area (or which cell) of the base station device 40.

Basically, the control target of the communication control device 60 is the base station device 40, but the communication control device 60 may control the terminal device 30 under the control of the base station device 40. Furthermore, the communication control device 60 may control a plurality of secondary systems. In this case, the communication system 2 can be regarded as a system including the plurality of secondary systems.

Furthermore, a plurality of communication control devices 60 may be present in one communication system 2. In a case where there is the plurality of communication control devices, at least one of the following three types of decision-making topologies can be applied to the communication control device 60.

Figure 6:
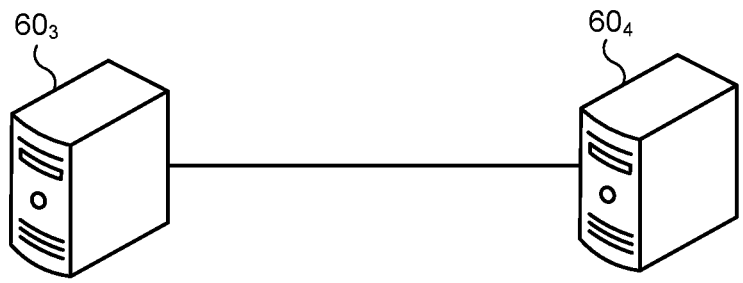
FIG. 6 is a diagram illustrating a model in which communication control devices are arranged in a distributed manner.

Autonomous decision-making
Centralized decision-making
Distributed decision-making The autonomous decision-making is a decision-making topology in which an entity that makes a decision (decision making entity, the communication control device in this case) makes a decision independently from another decision-making entity. The communication control device independently calculates necessary spectrum assignment and interference control. FIG. 6 is a diagram illustrating a model in which the communication control device 60 is arranged in a distributed manner. The autonomous decision-making can be applied, for example, in a case where the plurality of communication control devices 60 is arranged in the distributed manner as illustrated in FIG. 6. In this case, the plurality of communication control devices 60 (communication control device 60₃ and the communication control device 60₄ in the example in FIG. 6) exchange information on the base station devices 40 that are managed to perform necessary spectrum assignment and interference control calculation.

Figure 7:
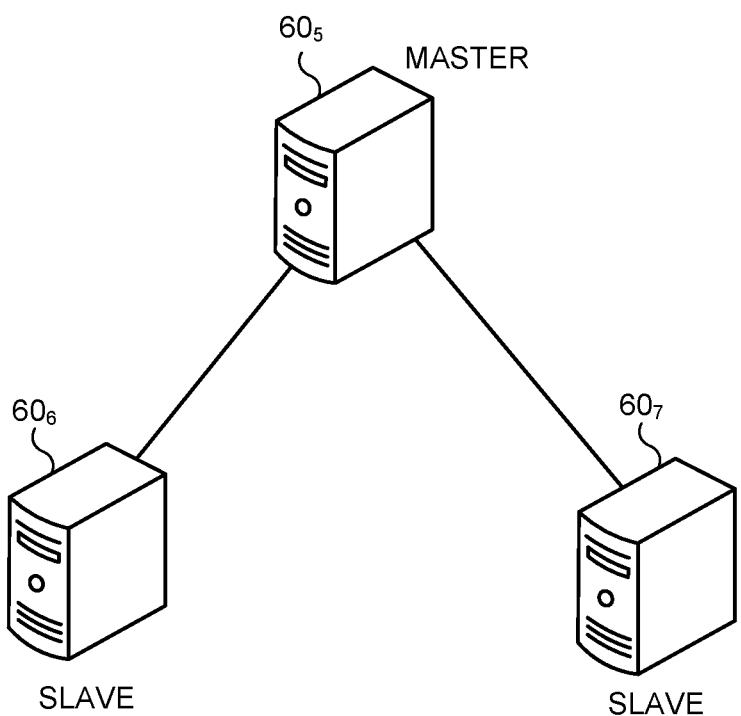
FIG. 7 is a diagram illustrating a model in which one communication control device centrally controls a plurality of communication control devices.

The centralized decision-making is a decision making topology in which the decision making entity entrust decision-making to another decision making entity. FIG. 7 is a diagram illustrating a model in which one communication control device centrally controls a plurality of communication control devices (so-called master-slave model). For example, when middle-sized decision making is performed, a model illustrated in FIG. 7 is assumed. In the example in FIG. 7, the communication control device 60₅ is a master communication control device, and the communication control devices 60₆ and 60₇ are slave communication control devices. In this system, the master communication control device can control the plurality of slave communication control devices to intensively make a decision. In addition, the master communication control device can also perform delegation, discarding, and the like of the decision-making authority to each slave communication control device for the purpose of load balancing or the like.

The distributed decision making is a decision making topology in which a decision making entity makes a decision in cooperation with another decision making entity. For example, when the plurality of communication control devices is arranged as illustrated in FIG. 6, the model corresponds to the distributed decision-making in which mutual adjustment, negotiation, and the like related to decision making results are performed after each communication control device makes a decision. Furthermore, for example, in the model as illustrated in FIG. 7, it can also be considered as the distributed decision-making with respect to that the master communication control device dynamically delegates, discards, and the like of the decision-making authority to each slave communication control device for the purpose of load balancing or the like.

Figure 8:
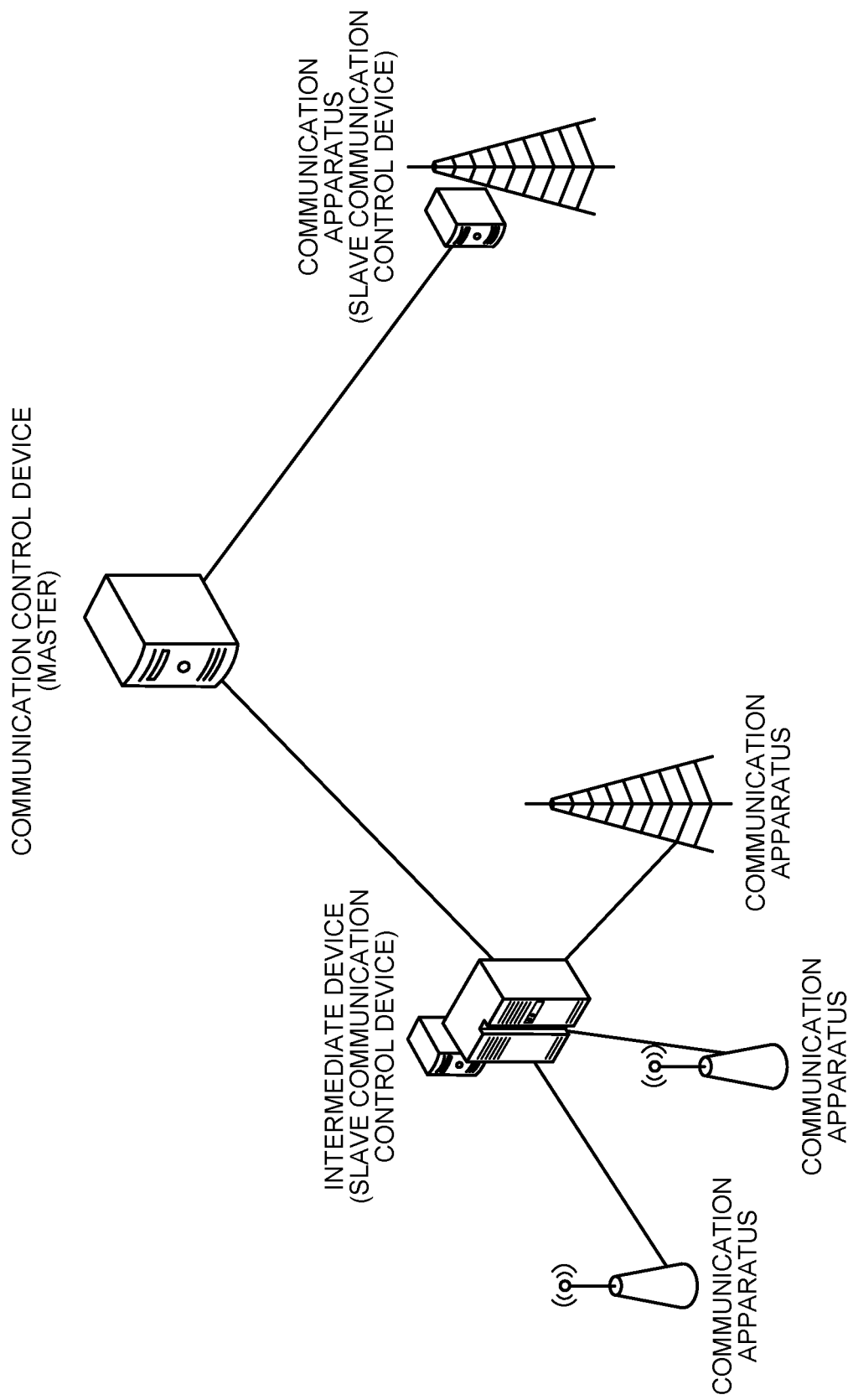
FIG. 8 is a diagram illustrating another example of an arrangement model of the communication control device.

In a scenario in which the centralized decision making and the distributed decision making are applied, implementation as illustrated in FIG. 8 is also possible as modification. The master communication control device may exist outside, and a communication apparatus (e.g., base station device 40) or an intermediate device (e.g., intermediate device 50) that bundles the plurality of communication apparatuses may be implemented to function as a slave communication control device.

Note that the communication control device 60 can also acquire necessary information from entities other than the base station device 40, the terminal device 30, and the intermediate device 50 for accomplishing its role. Specifically, for example, the communication control device 60 can acquire information necessary for protection, such as position information of the primary system, from a database (regular database) managed and operated by the NRA in a country or a region. Examples of the regulatory database include the ULS operated by the FCC. Examples of information necessary for protection may include, for example, position information on the primary system, a primary system communication parameter, out-of-band emission (OOBE) limit, adjacent channel leakage ratio (ACLR), adjacent channel selectivity, fading margin, and/or protection ratio (PR). In these examples, when a fixed numerical value or an acquisition/derivation method is legally defined, it is desirable to use them.

Furthermore, as another example, it is also conceivable that the communication control device 60 acquires radio wave sensing information from a radio wave sensing system installed and operated for the purpose of radio wave detection of the primary system. As a specific example, the communication control device 60 acquires the radio wave detection information of a marine radar as the primary system from the radio wave sensing system called an environmental sensing capability (ESC) in the CBRS in the United States. Furthermore, in a case where the communication apparatus or the terminal has a sensing function, the communication control device 60 may acquire the radio wave detection information of the primary system from the communication apparatus or the terminal.

Hereinafter, a configuration of each device included in the communication system 1000 and an external device will be specifically described.

<2-2. Configuration of Radio Apparatus>

Figure 9:
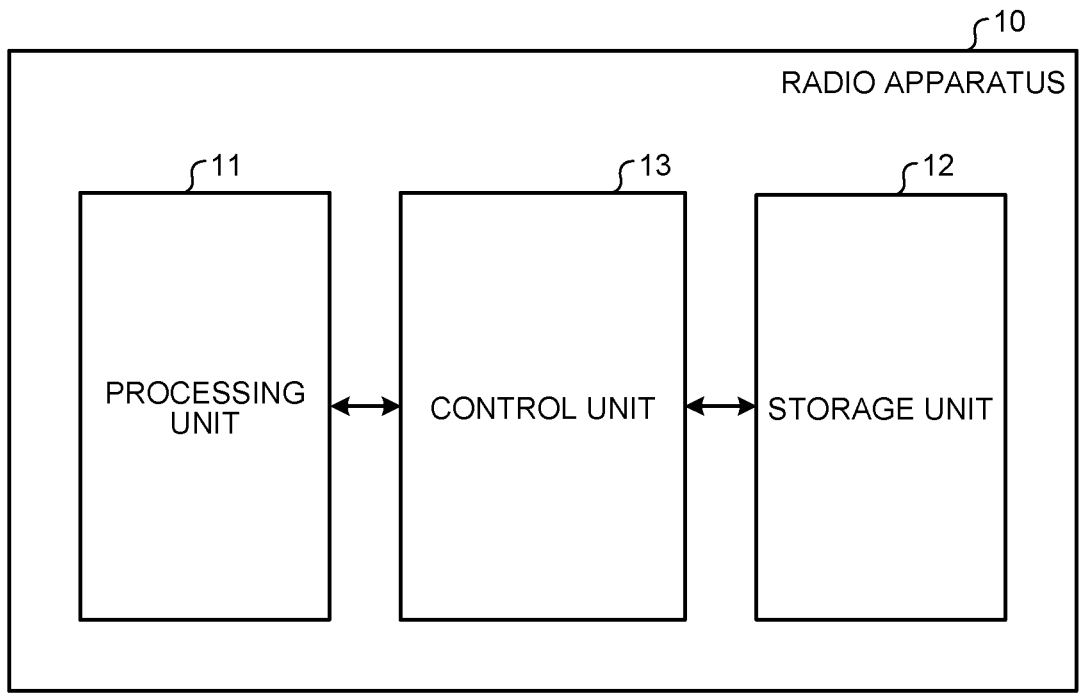
FIG. 9 is a diagram illustrating a configuration example of a radio apparatus according to the embodiment of the present disclosure.

First, a configuration of the radio apparatus 10 will be described. FIG. 9 is a diagram illustrating a configuration example of the radio apparatus 10 according to the embodiment of the present disclosure. The radio apparatus 10 primarily uses a predetermined frequency band. For example, the radio apparatus 10 is the communication apparatus (radio system) that wirelessly communicates with another radio communication apparatus. In this case, the radio apparatus 10 can be regarded as one type of communication apparatus. Note that the radio apparatus 10 may be a radio emission device or a reflected wave receiver. The radio apparatus 10 is one type of information processor.

The radio apparatus 10 includes a processing unit 11, a storage unit 12, and a control unit 13. Note that the configuration illustrated in FIG. 9 is a functional configuration, and a hardware configuration may be different from the functional configuration. Furthermore, functions of the radio apparatus 10 may be implemented in a distributed manner in a plurality of physically separated structures.

The processing unit 11 uses radio waves in a predetermined frequency band. For example, the processing unit 11 is a signal processing unit that performs various processes for outputting and receiving radio waves in the predetermined frequency band. When the radio apparatus 10 is the radio communication apparatus, the processing unit 11 may be a radio communication interface that wirelessly communicates with another communication apparatus. Here, another communication apparatus includes not only the communication apparatus that performs the cellular communication or the like but also the transmitter that transmits broadcast waves such as television broadcasting and the receiver that receives broadcast waves.

The storage unit 12 is a data readable/writable storage device such as a dynamic random access memory (DRAM), a static random access memory (SRAM), a flash memory, or a hard disk. The storage unit 12 functions as a storage means of the radio apparatus 10.

The control unit 13 is a controller that controls each part of the radio apparatus 10. The control unit 13 is realized by, for example, a processor such as a central processing unit (CPU) or a micro processing unit (MPU). For example, the control unit 13 is implemented by a processor executing various programs stored in a storage device inside the radio apparatus 10, using a random access memory (RAM) or the like as a work area. Note that the control unit 13 may be realized by an integrated circuit such as an application specific integrated circuit (ASIC) or a field programmable gate array (FPGA). Any of the CPU, the MPU, the ASIC, and the FPGA can be regarded as a controller.

Note that the radio apparatus 10 may have a function as the management apparatus 20. In this case, the control unit 13 may have each functional block included in the control unit of the management apparatus 20.

<2-3. Configuration of Management Apparatus>

Figure 10:
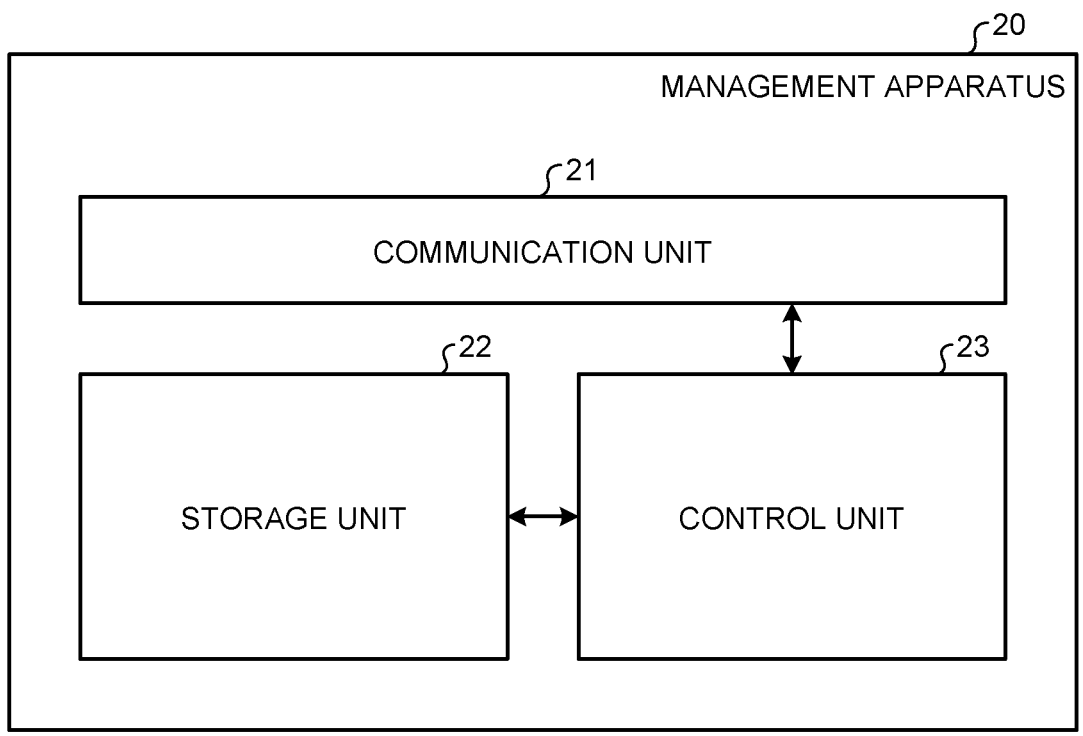
FIG. 10 is a diagram illustrating a configuration example of a management apparatus according to the embodiment of the present disclosure.

Next, a configuration of the management apparatus 20 will be described. FIG. 10 is a diagram illustrating a configuration example of the management apparatus 20 according to the embodiment of the present disclosure. The management apparatus 20 manages the radio apparatus 10. The management apparatus 20 may be an apparatus that manages radio wave output of the radio apparatus 10, or may be an apparatus that manages information such as an installation mode and a management entity of the radio apparatus 10. The management apparatus 20 is one type of information processor.

The management apparatus 20 includes a communication unit 21, a storage unit 22, and a control unit 23. Note that the configuration illustrated in FIG. 9 is a functional configuration, and a hardware configuration may be different from the functional configuration. Furthermore, functions of the management apparatus 20 may be implemented in a distributed manner in a plurality of physically separated structures.

The communication unit 21 is a communication interface for communicating with other devices. The communication unit 21 may be a network interface or a device connection interface. For example, the communication unit 21 may be a local area network (LAN) interface such as a network interface card (NIC), or may be a universal serial bus (USB) interface including a USB host controller, a USB port, and the like. Furthermore, the communication unit 21 may be a wired interface or a wireless interface. The communication unit 21 functions as a communication means of the management apparatus 20. The communication unit 21 communicates with the radio apparatus 10 under the control of the control unit 23.

The storage unit 22 is a storage device capable of reading and writing data, such as a DRAM, an SRAM, a flash memory, and a hard disk. The storage unit 22 functions as a storage means of the management apparatus 20. The storage unit 22 stores a first identifier and the like. The first identifier will be described later.

The control unit 23 is a controller that controls each part of the management apparatus 20. The control unit 23 is realized by, for example, a processor such as a CPU or an MPU. For example, the control unit 23 is realized by the processor executing various programs stored in the storage device inside the management apparatus 20 using a RAM or the like as a work area. Note that the control unit 23 may be realized by an integrated circuit such as an ASIC or an FPGA. Any of the CPU, the MPU, the ASIC, and the FPGA can be regarded as a controller.

As described above, the radio apparatus 10 can be regarded as the management apparatus 20. In this case, the "management apparatus 20" in the following description can be rephrased as the "radio apparatus 10" as appropriate.

<2-4. Configuration of Terminal Device>

Figure 11:
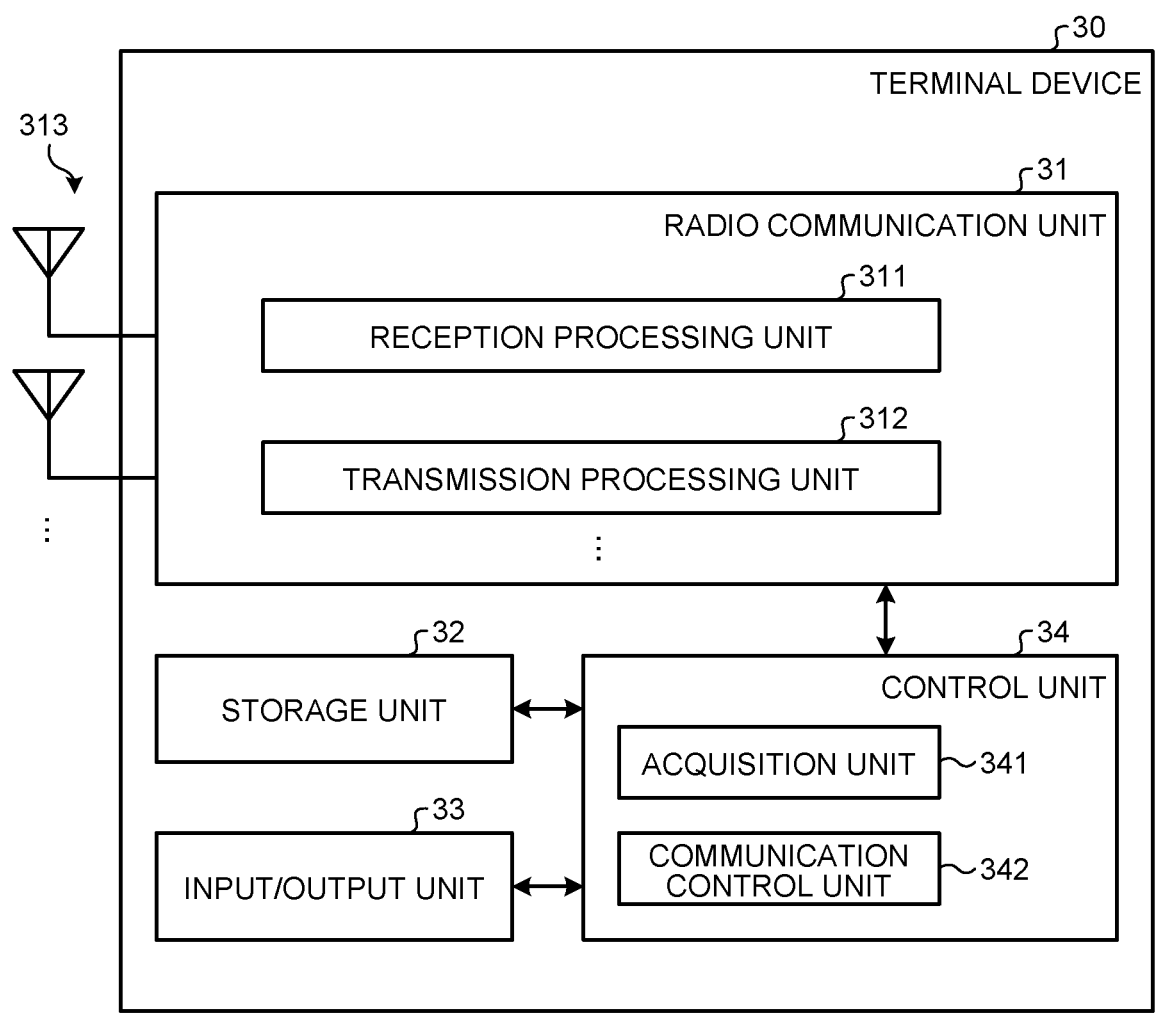
FIG. 11 is a diagram illustrating a configuration example of a terminal device according to the embodiment of the present disclosure.

Next, a configuration of the terminal device 30 will be described. FIG. 11 is a diagram illustrating a configuration example of the terminal device 30 according to the embodiment of the present disclosure. The terminal device 30 is the communication apparatus (radio system) that wirelessly communicates with the base station device 40 and/or the communication control device 60. The terminal device 30 is one type of information processor.

The terminal device 30 includes a radio communication unit 31, a storage unit 32, an input/output unit 33, and a control unit 34. Note that the configuration illustrated in FIG. 11 is a functional configuration, and the hardware configuration may be different from the functional configuration. Furthermore, functions of the terminal device 30 may be implemented in a distributed manner in a plurality of physically separated structures.

The radio communication unit 31 is a radio communication interface that wirelessly communicates with other communication apparatuses (e.g., base station device 40 and another terminal device 30). The radio communication unit 31 operates under the control of the control unit 34. The radio communication unit 31 supports one or a plurality of radio access methods. For example, the radio communication unit 31 supports both NR and LTE. The radio communication unit 31 may support other radio access methods such as W-CDMA and cdma2000.

The radio communication unit 31 includes a reception processing unit 311, a transmission processing unit 312, and an antenna 313. The radio communication unit 31 may include a plurality of reception processing units 311, a plurality of transmission processing units 312, and a plurality of antennas 313. When the radio communication unit 31 supports a plurality of radio access methods, each part of the radio communication unit 31 can be configured individually for each radio access method. For example, the reception processing unit 311 and the transmission processing unit 312 may be individually configured for the LTE and the NR. Configurations of the reception processing unit 311 and the transmission processing unit 312 are similar to those of a reception processing unit 411 and a transmission processing unit 412 of the base station device 40.

The storage unit 32 is a storage device capable of reading and writing data, such as a DRAM, an SRAM, a flash memory, or a hard disk. The storage unit 32 functions as a storage means of the terminal device 30.

The input/output unit 33 is a user interface for exchanging information with the user. For example, the input/output unit 33 is an operation device for the user to perform various operations, such as a keyboard, a mouse, an operation key, and a touch panel. Alternatively, the input/output unit 33 is a display device such as a liquid crystal display and an organic electroluminescence (EL) display. The input/output unit 33 may be an audio device such as a speaker or a buzzer. The input/output unit 33 may be a lighting device such as a light emitting diode (LED) lamp. The input/output unit 33 functions as an input/output means (input means, output means, operation means, or notification means) of the terminal device 30.

The control unit 34 is a controller that controls each part of the terminal device 30. The control unit 34 is realized by, for example, a processor such as a CPU or an MPU. For example, the control unit 34 is realized by a processor executing various programs stored in the storage device inside the terminal device 30 using a RAM or the like as a work area. Note that the control unit 34 may be realized by an integrated circuit such as an ASIC or an FPGA. Any of the CPU, the MPU, the ASIC, and the FPGA can be regarded as a controller. Note that the control unit 34 may include each functional block included in the control unit of the base station device 40.

As illustrated in FIG. 11, the control unit 34 includes an acquisition unit 341 and a communication control unit 342. Each block (acquisition unit 341 and communication control unit 342) configuring the control unit 34 is a functional block indicating each function of the control unit 34. These functional blocks may be software blocks or hardware blocks. For example, each of the functional blocks described above may be one software module realized by software (microprogram), or may be one circuit block on a semiconductor chip (die). It is apparent that each functional block may be one processor or one integrated circuit. A configuration method of the functional block is arbitrary. Note that the control unit 34 may be configured by a functional unit different from the above-described functional block.

<2-5. Configuration of Base Station Device>

Figure 12:
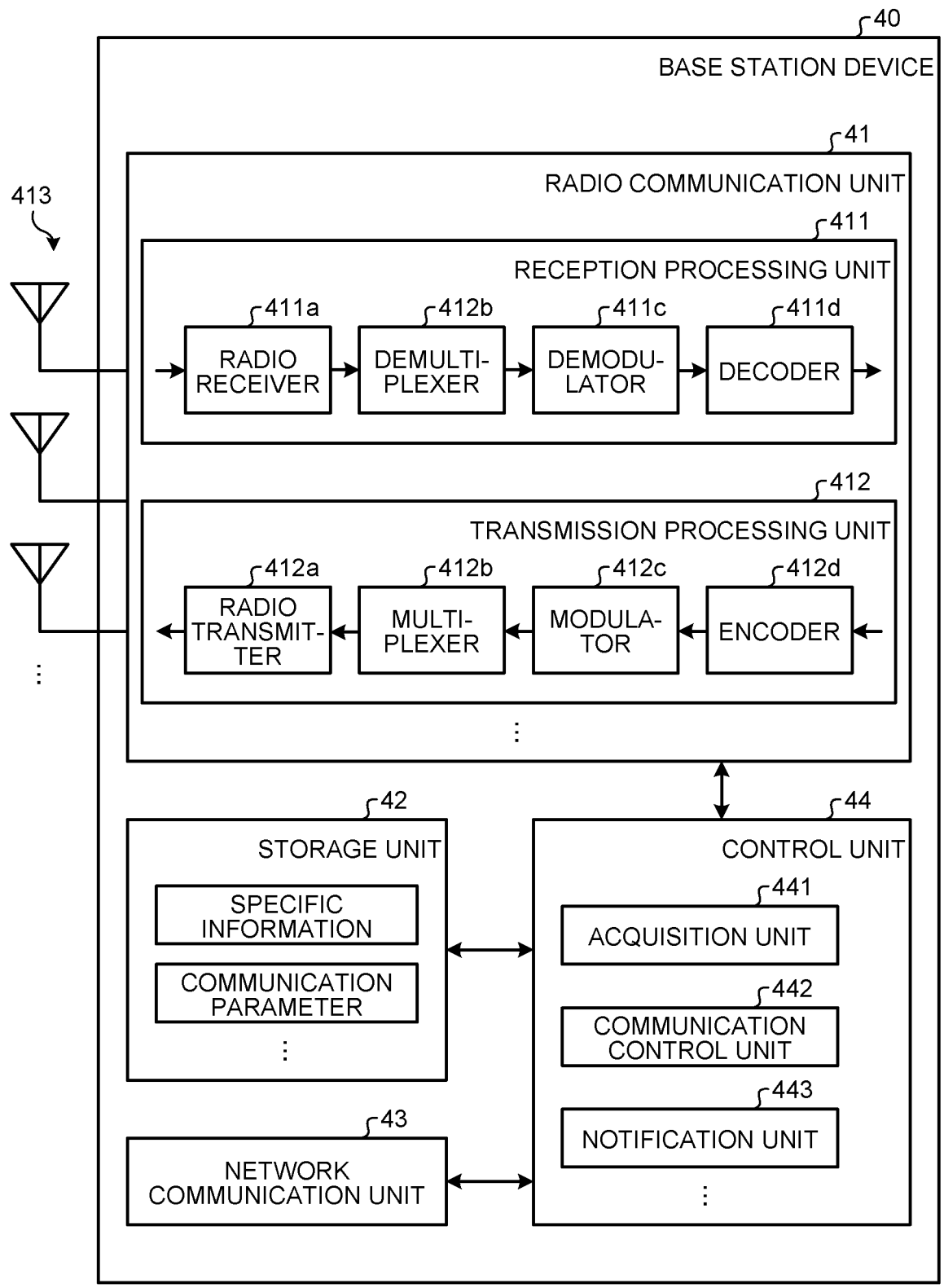
FIG. 12 is a diagram illustrating a configuration example of a base station device according to the embodiment of the present disclosure.

Next, a configuration of the base station device 40 will be described. FIG. 12 is a diagram illustrating a configuration example of the base station device 40 according to the embodiment of the present disclosure. The base station device 40 is a communication apparatus (radio system) that wirelessly communicates with the terminal device 30 under the control of the communication control device 60. The base station device 40 is one type of information processor.

The base station device 40 includes a radio communication unit 41, a storage unit 42, a network communication unit 43, and a control unit 44. Note that the configuration illustrated in FIG. 12 is a functional configuration, and the hardware configuration may be different from the functional configuration. Furthermore, functions of the base station device 40 may be implemented in a distributed manner in a plurality of physically separated devices.

The radio communication unit 41 is a radio communication interface that wirelessly communicates with other communication apparatuses (e.g., terminal device 30, communication control device 60, intermediate device 50, and another base station device 40). The radio communication unit 41 operates under the control of the control unit 44. The radio communication unit 41 may support a plurality of radio access methods. For example, the radio communication unit 41 may support both NR and LTE. The radio communication unit 41 may support other cellular communication methods such as W-CDMA and cdma2000. Furthermore, the radio communication unit 41 may support the wireless LAN communication system in addition to the cellular communication method. Obviously, the radio communication unit 41 may support only one radio access method.

The radio communication unit 41 includes the reception processing unit 411, the transmission processing unit 412, and an antenna 413. The radio communication unit 41 may include a plurality of reception processing units 411, a plurality of transmission processing units 412, and a plurality of antennas 413. When the radio communication unit 41 supports the plurality of radio access methods, each part of the radio communication unit 41 can be configured individually for each radio access method. For example, when the base station device 40 supports the NR and the LTE, the reception processing unit 411 and the transmission processing unit 412 may be individually configured for the NR and the LTE.

The reception processing unit 411 processes an uplink signal received via the antenna 413. The reception processing unit 411 includes a radio receiver 411*a*, a demultiplexer 411*b*, a demodulator 411*c*, and a decoder 411*d*.

The radio receiver 411*a* performs, with respect to the uplink signal, down-conversion, removal of an unnecessary frequency component, control of an amplification level, quadrature demodulation, conversion to a digital signal, removal of a guard interval, extraction of a frequency domain signal by fast Fourier transform, and the like. For example, it is assumed that the radio access method of the base station device 40 is the cellular communication method such as the LTE. In this case, the demultiplexer 411b separates an uplink channel, such as a physical uplink shared channel (PUSCH) and a physical uplink control channel (PUCCH), and an uplink reference signal from a signal output from the radio receiver 411a. The demodulator 411c demodulates the received signal using a modulation system such as binary phase shift keying (BPSK) or quadrature phase shift keying (QPSK) with respect to a modulation symbol of the uplink channel. The modulation system used by demodulator 411c may be multi-level quadrature amplitude modulation (QAM) such as 16 QAM, 64 QAM, or 256 QAM. The decoder 411d decodes encoded bits of the demodulated uplink channel. The decoded uplink data and uplink control information are output to the control unit 44.

The transmission processing unit 412 performs transmission processing of downlink control information and downlink data. The transmission processing unit 412 includes an encoder 412a, a modulator 412b, a multiplexer 412c, and a radio transmitter 412d.

The encoder 412a encodes the downlink control information and the downlink data input from the control unit 44 using an encoding system such as block encoding, convolutional encoding, turbo encoding, or the like. The modulator 412b modulates the coded bits output from the encoder 412a by a predetermined modulation system such as the BPSK, QPSK, 16QAM, 64QAM, or 256QAM. The multiplexer 412c multiplexes the modulation symbol of each channel and the downlink reference signal, and arranges the multiplexed result in a predetermined resource element. The radio transmitter 412d performs various types of signal processing on a signal from the multiplexer 412c. For example, the radio transmitter 412d performs processing such as conversion into a time domain by fast Fourier transform, addition of a guard interval, generation of a baseband digital signal, conversion into an analog signal, quadrature modulation, up-conversion, removal of an extra frequency component, and power amplification. A signal generated by the transmission processing unit 412 is transmitted from the antenna 413.

The storage unit 42 is a storage device capable of reading and writing data, such as a DRAM, an SRAM, a flash memory, or a hard disk. The storage unit 42 functions as a storage means of the base station device 40. The storage unit 42 stores desired transmission power information, an operation parameter, holding resource information, and the like.

The desired transmission power information is requested by the base station device 40 to the communication control device 60, and is information on transmission power required for transmitting radio waves.

The operation parameter is information (e.g., setting information) related to radio wave transmission by the base station device 40. For example, the operation parameter is information on the maximum value of the transmission power (maximum allowable transmission power) allowed for the base station device 40. Obviously, the operation parameter is not limited to the information on the maximum allowable transmission power.

In addition, the holding resource information is information related to radio resources held by the base station device 40. For example, the holding resource information is information on radio resources that the base station device 40 can currently use. For example, the holding resource information is information on a holding amount of the interference margin allocated from the communication control device 60 to the base station device 40. The information on the holding amount may be information on a resource block unit described later. In other words, the holding resource information may be information regarding the resource block (e.g., resource block holding amount) held by the base station device 40.

The network communication unit 43 is a communication interface for communicating with other devices (e.g., communication control device 60, intermediate device 50, and another base station device 40). For example, the network communication unit 43 is the LAN interface such as the NIC. The network communication unit 43 may be a USB interface including a USB host controller, a USB port, and the like. Furthermore, the network communication unit 43 may be a wired interface or a wireless interface. The network communication unit 43 functions as a network communication means of the base station device 40. The network communication unit 43 communicates with other devices under the control of the control unit 44.

The control unit 44 is a controller that controls each unit of the base station device 40. The control unit 44 is realized by, for example, a processor such as a CPU or an MPU. For example, the control unit 44 is implemented by a processor executing various programs stored in the storage device inside the base station device 40 using a RAM or the like as a work area. Note that the control unit 44 may be realized by an integrated circuit such as the ASIC or the FPGA. Any of the CPU, the MPU, the ASIC, and the FPGA can be regarded as a controller.

As illustrated in FIG. 12, the control unit 44 includes an acquisition unit 441, a communication control unit 442, and a notification unit 443. Each block (acquisition unit 441 to notification unit 443) configuring the control unit 44 is a functional block indicating a function of the control unit 44. These functional blocks may be software blocks or hardware blocks. For example, each of the functional blocks described above may be one software module realized by software (microprogram), or may be one circuit block on a semiconductor chip (die). It is apparent that each functional block may be one processor or one integrated circuit. A configuration method of the functional block is arbitrary. Note that the control unit 44 may be configured by a functional unit different from the above-described functional block.

Note that the control unit 34 of the terminal device 30 may include each functional block (acquisition unit 441 to notification unit 443) included in the control unit 44 of the base station device 40. In this case, the "base station device 40" in the following description can be appropriately replaced with the "terminal device 30". In addition, the "control unit 44", the "acquisition unit 441", the "communication control unit 442", and the "notification unit 443" in the following description can also be replaced with the "control unit 34" as appropriate.

<2-6. Configuration of Intermediate Device>

Figure 13:
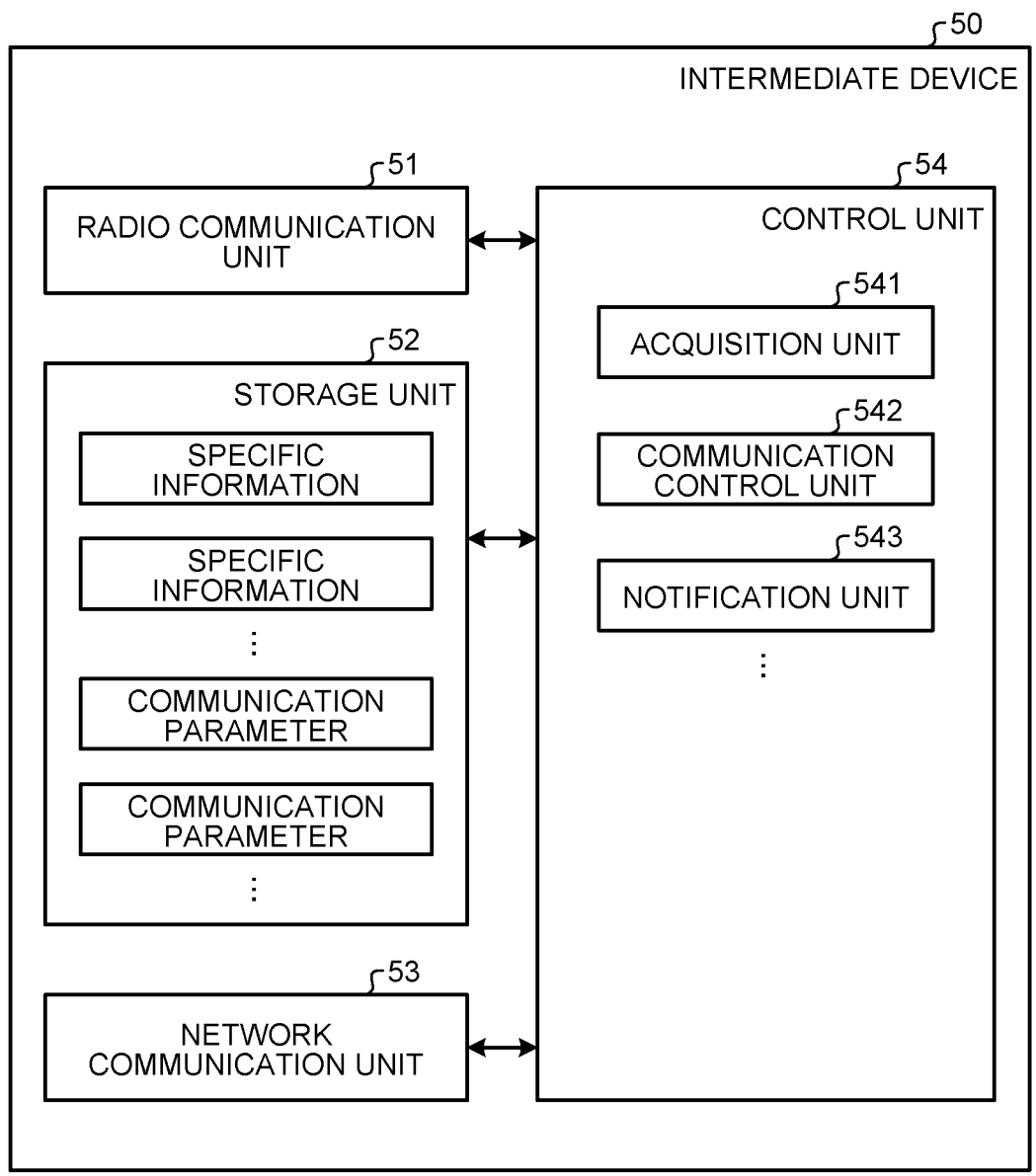
FIG. 13 is a diagram illustrating a configuration example of a proxy device according to the embodiment of the present disclosure.

Next, a configuration of the intermediate device 50 will be described. FIG. 13 is a diagram illustrating a configuration example of the intermediate device 50 according to the embodiment of the present disclosure. The intermediate device 50 is a communication apparatus that communicates with the base station device 40 and the communication control device 60. The intermediate device 50 is one type of information processor.

The intermediate device 50 includes a radio communication unit 51, a storage unit 52, a network communication unit 53, and a control unit 54. Note that the configuration illustrated in FIG. 13 is a functional configuration, and a hardware configuration may be different from the functional configuration. Furthermore, functions of the intermediate device 50 may be implemented in a distributed manner in a plurality of physically separated structures.

The radio communication unit 51 is a radio communication interface that wirelessly communicates with other communication apparatuses (e.g., base station device 40, terminal device 30, communication control device 60, and another intermediate device 50). The radio communication unit 51 operates under the control of the control unit 54. The radio communication unit 51 supports one or more radio access methods. For example, the radio communication unit 51 supports both NR and LTE. The radio communication unit 51 may support other radio access methods such as the W-CDMA and the cdma2000. The configuration of the radio communication unit 51 is similar to that of the radio communication unit 41 of the base station device 40.

The storage unit 52 is a storage device capable of reading and writing data, such as a DRAM, an SRAM, a flash memory, or a hard disk. The storage unit 52 functions as a storage means of the intermediate device 50. The storage unit 52 may store unique information, communication parameters, and the like of each of the subordinate base station devices 40 (or terminal device 30 further subordinate to the subordinate base station device 40).

The network communication unit 53 is a communication interface for communicating with other devices (e.g., base station device 40, communication control device 60, and another intermediate device 50). For example, the network communication unit 53 is a LAN interface such as the NIC. The network communication unit 53 may be the USB interface including the USB host controller, the USB port, and the like. Furthermore, the network communication unit 53 may be a wired interface or a wireless interface. The network communication unit 53 functions as a network communication means of the intermediate device 50. The network communication unit 53 communicates with other devices under the control of the control unit 54.

The control unit 54 is a controller that controls each part of the intermediate device 50. The control unit 54 is realized by, for example, a processor such as a CPU or an MPU. For example, the control unit 54 is realized by a processor executing various programs stored in the storage device inside the intermediate device 50 using a RAM or the like as a work area. Note that the control unit 54 may be realized by an integrated circuit such as the ASIC or the FPGA. Any of the CPU, the MPU, the ASIC, and the FPGA can be regarded as a controller.

As illustrated in FIG. 13, the control unit 54 includes an acquisition unit 541, a communication control unit 542, and a notification unit 543. Each block (acquisition unit 541 to notification unit 543) configuring the control unit 54 is a functional block indicating a function of the control unit 54. These functional blocks may be software blocks or hardware blocks. For example, each of the functional blocks described above may be one software module realized by software (microprogram), or may be one circuit block on a semiconductor chip (die). It is apparent that each functional block may be one processor or one integrated circuit. A configuration method of the functional block is arbitrary. Note that the control unit 54 may be configured with a functional unit different from the above-described functional block. The operation of each block configuring the control unit 54 will be described later.

The operation of each block (acquisition unit 541 to notification unit 543) configuring the control unit 54 may be the same as the operation of each block (acquisition unit 441 to notification unit 443) configuring the control unit 44 of the base station device 40. In this case, the "intermediate device 50" in the following description can be appropriately replaced with the "base station device 40". Similarly, the "control unit 54", the "acquisition unit 541", the "communication control unit 542", and the "notification unit 543" in the following description can be replaced with the "control unit 44", the "acquisition unit 441", the "communication control unit 442", and the "notification unit 443" as appropriate.

<2-7. Configuration of Communication Control Device>

The communication control device 60 is a device that controls radio communication of the base station device 40. The communication control device 60 may control radio communication of the terminal device 30 directly or via the base station device 40. The communication control device 60 is one type of information processor.

Figure 14:
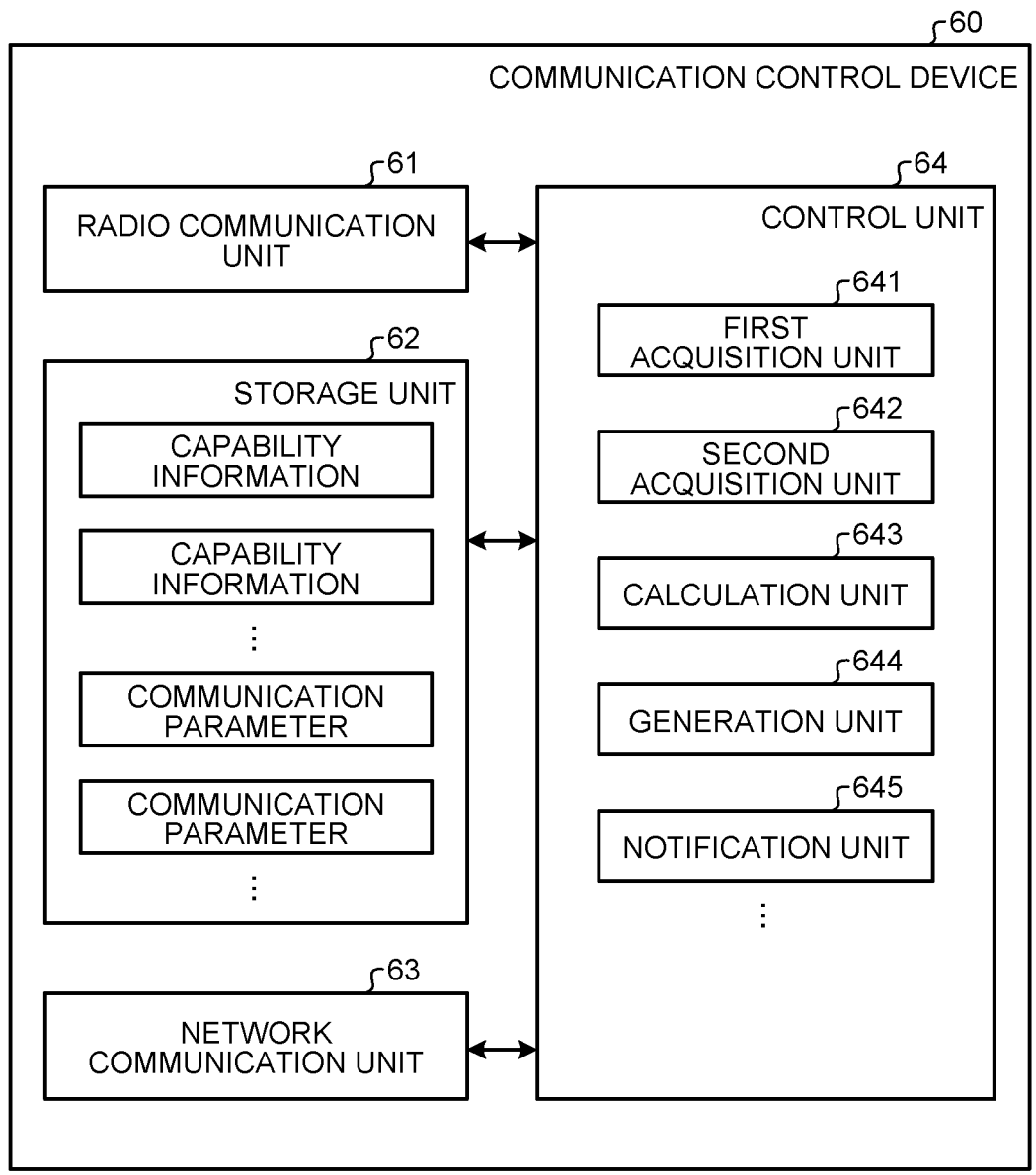
FIG. 14 is a diagram illustrating a configuration example of a communication control device according to the embodiment of the present disclosure.

FIG. 14 is a diagram illustrating a configuration example of the communication control device 60 according to the embodiment of the present disclosure. The communication control device 60 includes a radio communication unit 61, a storage unit 62, a network communication unit 63, and a control unit 64. Note that the configuration illustrated in FIG. 14 is a functional configuration, and the hardware configuration may be different from the functional configuration. Furthermore, the functions of the communication control device 60 may be implemented in a distributed manner in a plurality of physically separated structures. For example, the communication control device 60 may include a plurality of server devices.

The radio communication unit 61 is a radio communication interface that wirelessly communicates with other communication apparatuses (e.g., base station device 40, terminal device 30, intermediate device 50, and another communication control device 60). The radio communication unit 61 operates under the control of the control unit 64. The radio communication unit 61 corresponds to one or a plurality of radio access methods. For example, the radio communication unit 61 supports both NR and LTE. The radio communication unit 61 may support other radio access methods such as the W-CDMA and the cdma2000. The configuration of the radio communication unit 61 is similar to that of the radio communication unit 41 of the base station device 40.

The storage unit 62 is a storage device capable of reading and writing data, such as a DRAM, an SRAM, a flash memory, or a hard disk. The storage unit 62 functions as a storage means of the base station device 40. The storage unit 62 stores operation parameters of each of the plurality of base station devices 40 configuring the communication system 2. Note that the storage unit 62 may store the holding resource information of each of the plurality of base station devices 40 configuring the communication system 2. As described above, the holding resource information is information related to radio resources held by the base station device 40.

The network communication unit 63 is a communication interface for communicating with other devices (e.g., base station device 40, intermediate device 50, and another communication control device 60). The network communication unit 63 may be a network interface or a device connection interface. For example, the network communication unit 63 may be a LAN interface such as an NIC. Furthermore, the network communication unit 63 may be a USB interface including the USB host controller, a USB port, and the like. Furthermore, the network communication unit 63 may be a wired interface or a wireless interface. The network communication unit 63 functions as a communication means of the communication control device 60. The network communication unit 63 communicates with the base station device 40, the terminal device 30, and the intermediate device 50 under the control of the control unit 64.

The control unit 64 is a controller that controls each unit of the communication control device 60. The control unit 64 is realized by, for example, a processor such as a CPU or an MPU. For example, the control unit 64 is realized by a processor executing various programs stored in the storage device inside the communication control device 60 using a RAM or the like as a work area. Note that the control unit 64 may be realized by an integrated circuit such as an ASIC or a FPGA. Any of the CPU, the MPU, the ASIC, and the FPGA can be regarded as a controller.

As illustrated in FIG. 14, the control unit 64 includes a first acquisition unit 641, a second acquisition unit 642, a calculation unit 643, a generation unit 644, and a notification unit 645. Each block (acquisition unit 641 to notification unit 645) configuring the control unit 64 is a functional block indicating a function of control unit 64. These functional blocks may be software blocks or hardware blocks. For example, each of the functional blocks described above may be one software module realized by software (microprogram), or may be one circuit block on a semiconductor chip (die). It is apparent that each functional block may be one processor or one integrated circuit. A configuration method of the functional block is arbitrary. Note that the control unit 64 may be configured by a functional unit different from the above-described functional block. The operation of each block configuring the control unit 64 will be described later.

Note that the control unit 44 of the base station device 40 may include each functional block (acquisition unit 641 to notification unit 645) included in the control unit 64 of the communication control device 60. In this case, the "communication control device 60" in the following description can be appropriately replaced with the "base station device 40" or the "intermediate device 50". In addition, the "control unit 64", "first acquisition unit 641", "second acquisition unit 642", "calculation unit 643", "generation unit 644", and "notification unit 645" in the following description can also be replaced with "control unit 44" or "control unit 54" as appropriate.

3. INTERFERENCE MODEL

Figure 15:
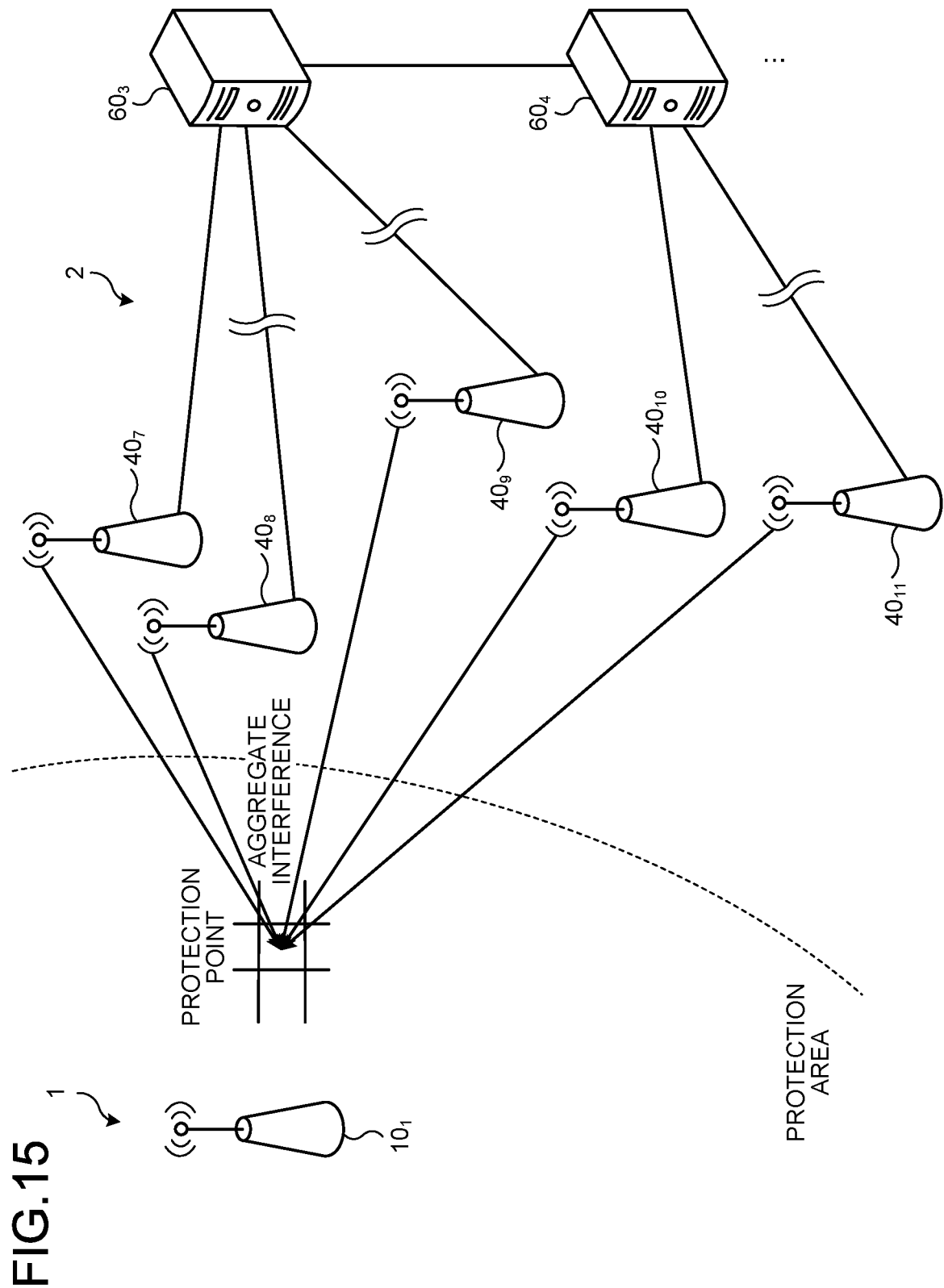
FIG. 15 is an explanatory diagram illustrating an example of an interference model assumed in the embodiment of the present disclosure.

Next, an interference model assumed in the present embodiment will be described. FIG. 15 is an explanatory diagram illustrating an example of an interference model assumed in the embodiment of the present disclosure. Note that the base station device 40 in the following description can be replaced with a word indicating another communication apparatus having a radio communication function.

The interference model illustrated in FIG. 15 is applied, for example, in a case where the primary system has a service area. In the example in FIG. 15, the communication system 1 (primary system) is the radio communication system having the service area. This service area is, for example, a protection area of the communication system 1. A plurality of interference calculation reference points (hereinafter referred to as an interference calculation point or a protection point.) is set in the protection area. The protection point is set by, for example, an operator of the communication system 1 or a public organization that manages radio waves (hereinafter referred to as an administrator). For example, the administrator may divide the protection area into lattice-like sections and set the center of a predetermined lattice as the protection point. A method of determining the protection point is arbitrary.

The protection point may be set not only in the horizontal direction but also in the vertical direction. In other words, the protection points may be arranged three-dimensionally. In the following description, a three-dimensionally arranged protection points (i.e., protection points assumed not in a horizontal plane but in three-dimensional space) may be referred to as a spatial protection point.

The interference margin of each protection point is set by the administrator or the like. FIG. 15 illustrates interference given to protection points by a plurality of base station devices 40 configuring the communication system 2 (secondary system). The communication control device 60 of the communication system 2 controls the transmission power of the plurality of base station devices 40 so that aggregate interference at each protection point does not exceed the interference margin set.

Figure 16:
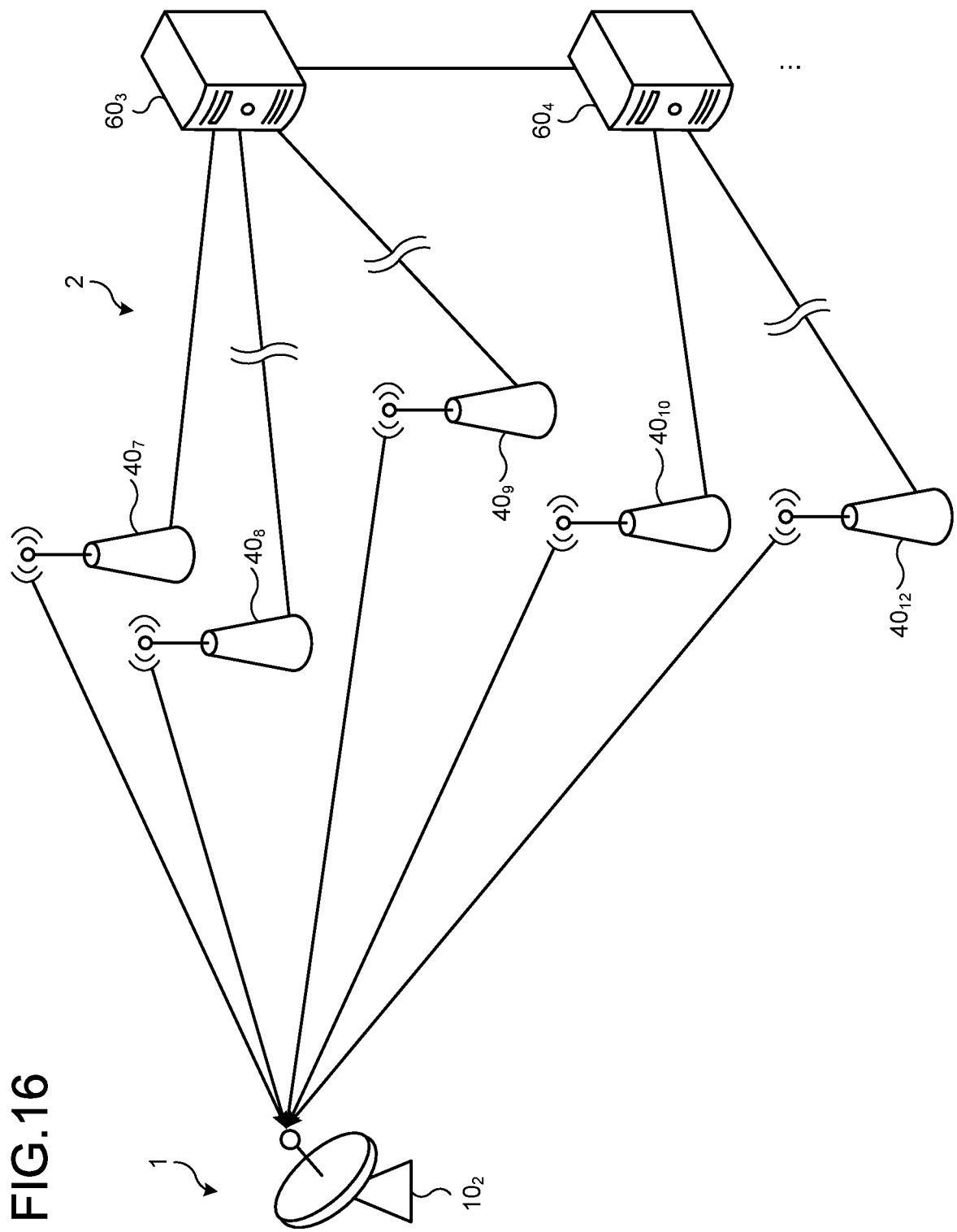
FIG. 16 is an explanatory diagram illustrating another example of the interference model assumed in the embodiment of the present disclosure.

FIG. 16 is an explanatory diagram illustrating another example of the interference model conceivable in the embodiment of the present disclosure. The interference model illustrated in FIG. 16 is applied, for example, in a case where the primary system performs only reception. In the example in FIG. 16, the communication system 1 (primary system) includes a reception antenna as the radio apparatus $10_2$. The radio apparatus $10_2$ is, for example, a reception antenna of a satellite ground station. The communication control device 60 of the communication system 2 sets the position of the reception antenna as the protection point, and controls the transmission power of the plurality of base station devices 40 so that the aggregate interference at that point does not exceed the interference margin.

4. PRIMARY SYSTEM PROTECTION METHOD

Next, a primary system protection method will be described. As described above, the primary system protection method can be classified into, for example, the following two types.

(1) Interference margin simultaneous allocation type
(2) Interference margin interactive allocation type Note that, an example of the interference margin simultaneous allocation type of the primary system protection method is given in a method disclosed in Non Patent Literature 3 (e.g., calculation method of the maximum allowable equivalent isotropic radiated power (EIRP)). In addition, an example of the interference margin interactive allocation type of the primary system protection method is an interactive allocation process (IAP) disclosed in Non Patent Literature 6.

Hereinafter, the "interference margin simultaneous allocation type" of the primary system protection method and the "interference margin interactive allocation type" of the primary system protection method will be described. Note that the base station device 40 in the following description can be replaced with a word indicating another communication apparatus having a radio communication function.

<4-1. Interference Margin Simultaneous Allocation Type>

Figure 17:
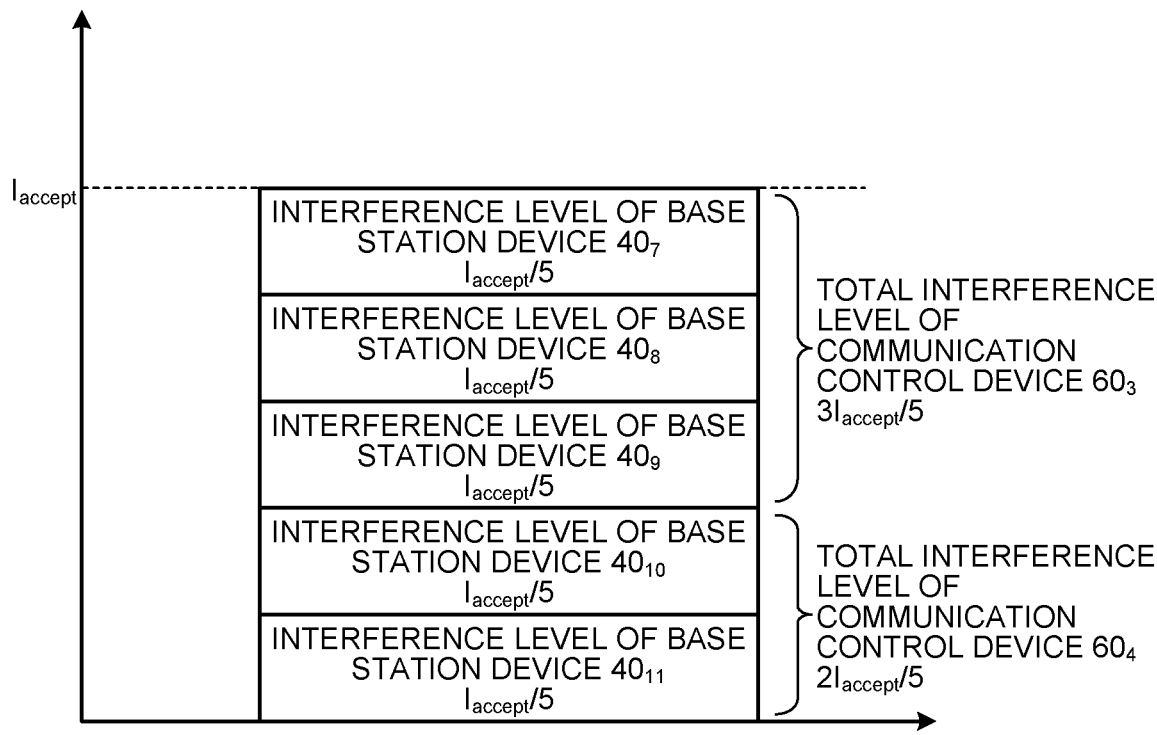
FIG. 17 is an explanatory diagram illustrating an interference margin simultaneous allocation type of a primary system protection method.

First, the interference margin simultaneous allocation type of the primary system protection method will be described. FIG. 17 is an explanatory diagram for describing an interference margin simultaneous allocation type of the primary system protection method. As described above, in the interference margin simultaneous allocation type, the communication control device 60 calculates the maximum allowable transmission power of the secondary system using a "value uniquely obtained by positional relationship between a reference protection point of the primary system and the secondary system" as a reference value. In the example in FIG. 17, the acceptable interference threshold of the primary system is $I_{accept}$. This threshold may be an actual threshold, or may be a value set securing a certain margin (e.g., protection ratio) from the actual threshold in consideration of a calculation error and an interference variation.

In the interference margin simultaneous allocation type of the primary system protection method, interference control means to determine the transmission power of the wireless apparatus (EIRP, conducted power+antenna gain, etc.) that does not exceed the acceptable interference threshold. Here, when there are a large number of base station devices 40 and each device is controlled not exceed the acceptable interference threshold, the interference power received by the communication system 1 (primary system) may exceed the acceptable interference threshold. Therefore, the interference margin (acceptable interference level) is "allocated" based on the number of base station devices 40 registered in the communication control device 60.

For example, in the example in FIG. 17, there are five base station devices 40 in total. Therefore, the acceptable interference level of $I_{accept}/5$ is allocated to each base station device 40. Since each of the base station devices 40 cannot recognize the allocated interference by itself, the base station device 40 recognizes the allocated interference through the communication control device or acquires the transmission power determined based on the allocated interference. Since the communication control device cannot recognize the number of wireless apparatuses managed by other communication control devices, the communication control device can recognize the total number of devices by exchanging information with each other, so as to allocate the acceptable interference level. For example, the acceptable interference level of 3 $I_{accept}/5$ is allocated in the communication control device $60_1$.

Figure 18:
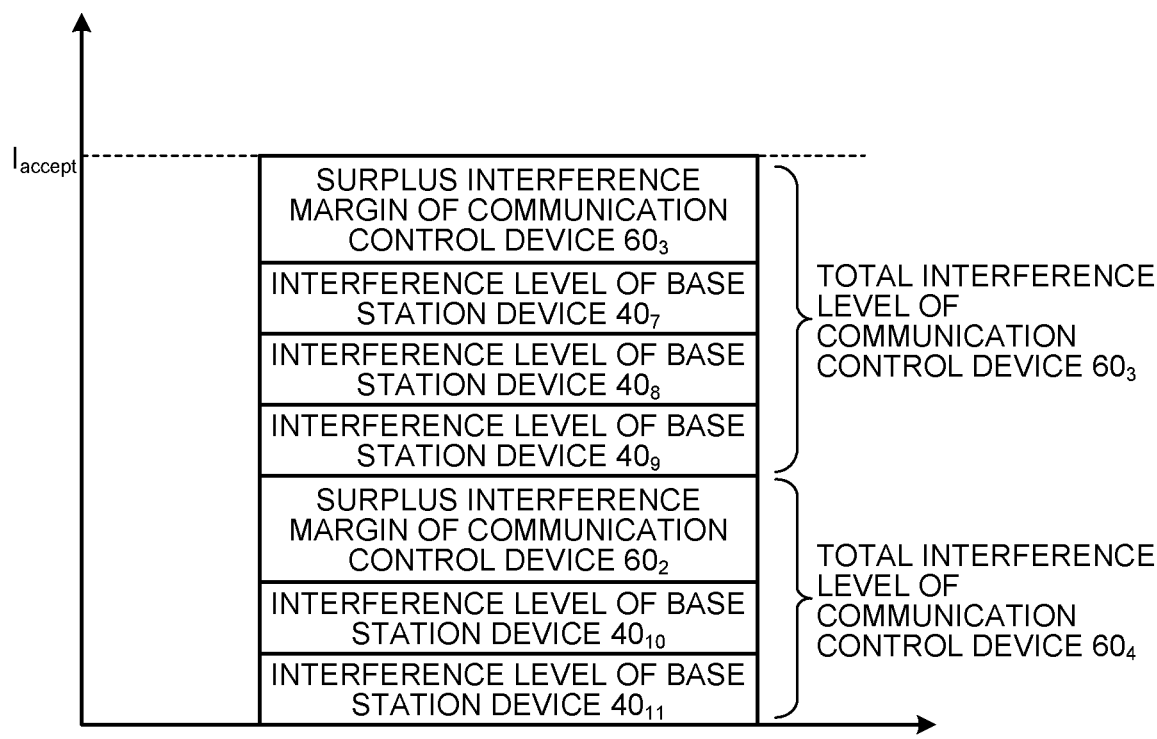
FIG. 18 is a diagram illustrating a state in which a surplus interference margin occurs.

Note that, in this method, the interference margin not used by the base station device 40 may become a surplus interference margin. FIG. 18 is a diagram illustrating a state in which the surplus interference margin has been generated. FIG. 18 illustrates a total interference level set in each of the two communication control devices 60 (communication control device $60_3$ and $60_4$). In addition, FIG. 18 illustrates the interference level given to a predetermined protection point of the communication system 1 by the plurality of base station devices 40 (base station devices $40_7$ to $40_{11}$) under the control of the two communication control devices 60. The interference level obtained by subtracting the interference level of the base station device 40 from the total interference level of each of the two communication control devices 60 is the surplus interference margin. In the following description, a surplus interference level is referred to as a surplus interference margin. The surplus interference margin can be rephrased as a surplus interference level.

<4-2. Interference Margin Interactive Allocation Type>

Figure 19:
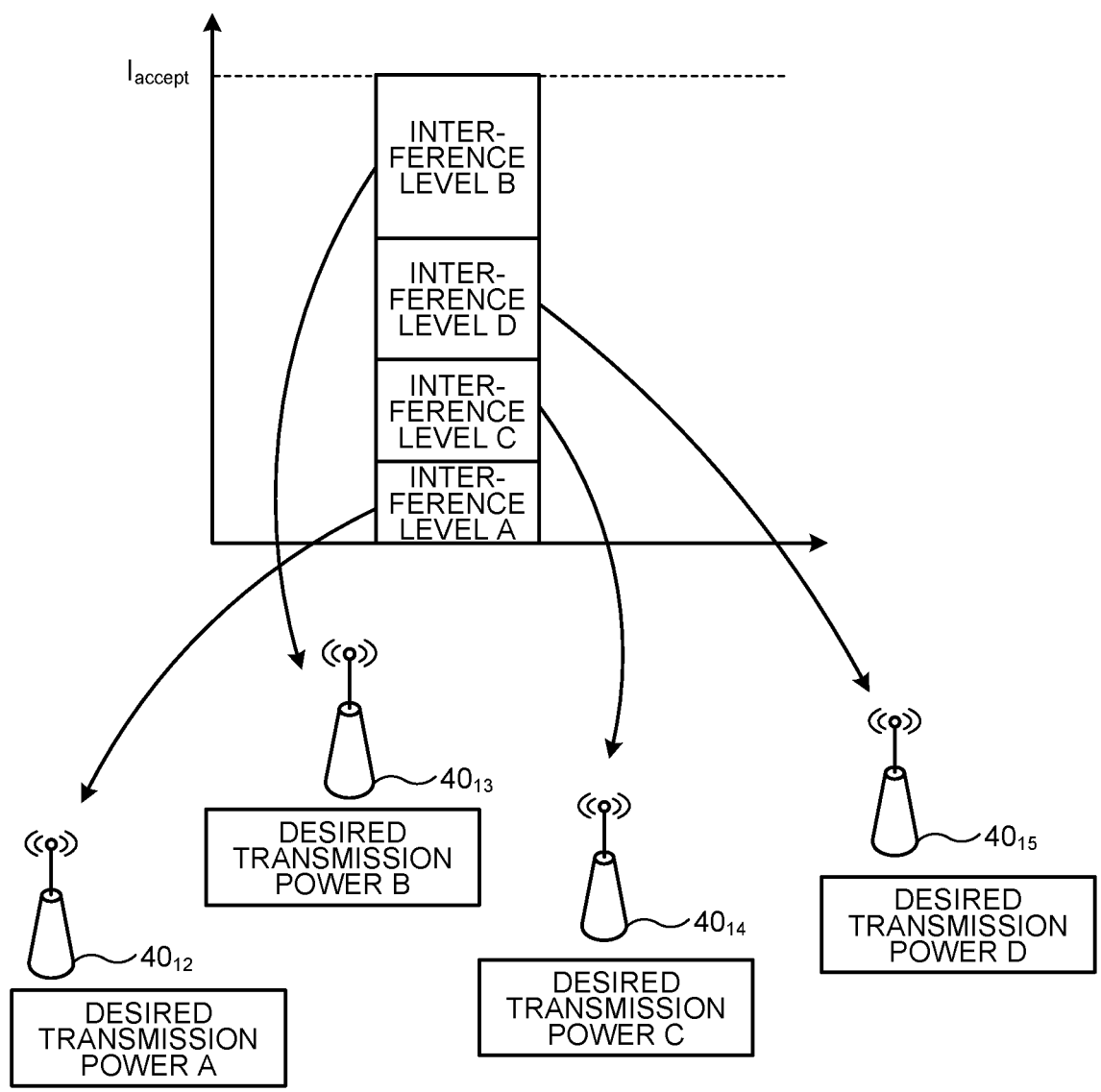
FIG. 19 is an explanatory diagram illustrating an interference margin interactive allocation type of the primary system protection method.

Next, the interference margin interactive allocation type of the primary system protection method will be described. As described above, in the interference margin interactive allocation type, the communication control device 60 calculates the maximum allowable transmission power of the secondary system using the "desired transmission power of the secondary system" as a reference value. FIG. 19 is an explanatory diagram illustrating the interference margin interactive allocation type of the primary system protection method. In the interference margin interactive allocation type, for example, each of the plurality of base station devices 40 stores the desired transmission power information in the storage unit 42. The desired transmission power information is requested by the base station device 40 to the communication control device 60, and is information on transmission power required for transmitting radio waves. In the example in FIG. 19, the base station devices $40_{12}$ to $40_{15}$ hold the desired transmission power information A to D, respectively. The communication control device 60 allocates interference levels A to D to the base station devices $40_{12}$ to $40_{15}$ based on the desired transmission power information A to D, respectively.

5. DESCRIPTION OF PROCEDURES

Next, a basic procedure that can be used when the system (e.g., communication system 2) of the present embodiment is implemented will be described. Note that the base station device 40 in the following description can be replaced with a word indicating another communication apparatus having a radio communication function.

<5-1. Registration Procedure>

A registration procedure is to register a device parameter related to the base station device 40 in the communication control device 60. Typically, the registration procedure starts when one or more communication systems including the base station device 40 or the plurality of base station devices 40 notify the communication control device 60 of a registration request including the device parameter. The registration request may be transmitted by the communication system that substitutes (represents) one or more base station devices 40 (e.g., proxy system such as the intermediate device 50).

In the following description, it is assumed that the communication system that substitutes (represents) the plurality of base station devices 40 is the intermediate device 50, but the term "intermediate device 50" in the following description can be replaced with a term indicating the communication system that substitutes (represents) another communication apparatus such as the proxy system. Obviously, the base station device 40 can also be replaced with a term indicating another communication apparatus having the radio communication function.

(Details of Required Parameter)

The device parameter refers to, for example, information indicated below.

Communication apparatus user information
Communication apparatus-specific information
Position information
Antenna information
Radio interface information
Legal information
Installer information
Communication apparatus group information
Practically speaking, information other than these may also be regarded as device parameters.

The communication apparatus user information is information related to a user of the communication apparatus. For example, the information may include a user ID, an account name, a user name, a user contact address, and a call sign. The user ID and the account name may be independently generated by the communication apparatus user or may be issued in advance by the communication control device. As the call sign, it is preferable to use a call sign issued by the NRA.

For example, the communication apparatus user information can be used for the purpose of interference resolution. As a specific example, in a spectrum use notification procedure in <5-4> described later, in a case where the spectrum use notification request of applicable frequency continues even when the communication control device determines and instructs to suspend the use of the spectrum that is being used by the communication apparatus, it is possible to make a request to confirm the behavior of the communication apparatus via the user contact address included in the communication apparatus user information, suspecting a failure of the communication apparatus. Without being limited to this example, when it is determined that the communication apparatus is performing an operation against the communication control by the communication control device, the communication apparatus user information can be used to make a contact.

The communication apparatus-specific information includes information for identifying the communication apparatus, communication apparatus product information, communication apparatus hardware information, communication apparatus software information, and the like. For example, the information may include a serial number and a product model number. Here, the communication apparatus is, for example, the base station device 40.

The information that can identify the communication apparatus refers to the communication apparatus user information, a communication apparatus serial number, a communication apparatus ID, and the like. For example, the user ID, the call sign, and the like can be assumed as the communication apparatus user information. The user ID may be independently generated by the communication apparatus user or may be issued in advance by the communication control device 60. For example, the communication apparatus ID may be uniquely assigned by the communication apparatus user.

The communication apparatus product information may include, for example, an authentication ID, a product model number, manufacturer information, and the like. The authentication ID is, for example, an ID given from an authentication organization in each country or region, such as an FCC ID, a CE number, and a technical standard conformity certification (technical conformity). An ID issued by an industrial association or the like based on a unique authentication program may be included.

The communication apparatus-specific information represented by the above can be used, for example, for whitelist/blacklist application. For example, in a case where any piece of information corresponding to the communication apparatus in operation is included in the blacklist, the communication control device instructs to suspend the use of spectrum in the spectrum use notification procedure in <5-4> described later, and is capable of behaving such that the use suspension is retained until the blacklist is canceled. Furthermore, for example, in a case where a communication apparatus included in the blacklist performs the registration procedure, the communication control device can reject registration. Furthermore, for example, it is also possible to exclude a communication apparatus applicable to information included in the blacklist from consideration of the interference calculation described in the present specification, or include in consideration of the interference calculation only a communication apparatus applicable to information included in the whitelist.

The communication apparatus hardware information may include, for example, transmission power class information, manufacturer information, and the like. For example, in FCC C.F.R Part 96, two classes, Category A and Category B, are defined as the transmission power class information, and one of the categories may be included in the information. Further, in 3GPP TS 36.104 and TS 38.104, some classes of eNodeB and gNodeB are defined, and these may also be used.

The transmission power class information may be used, for example, in the interference calculation. The interference calculation can be performed using the maximum transmission power defined for each class as the transmission power of the communication apparatus.

The communication apparatus software information may include, for example, version information, a build number, and the like regarding an execution program in which a process necessary for interaction with the communication control device 60 is described. In addition, version information, a build number, and the like of software for operating as the base station device 40 may also be included.

The position information is typically information that can identify geographical location of the communication apparatus (e.g., base station device 40). For example, the information is coordinate information acquired by a positioning function represented by a global positioning system (GPS), Beidou, a quasi-zenith satellite system (QZSS), Galileo, and an assisted global positioning system (A-GPS). Typically, information on latitude, longitude, altitude, and positioning error may be included. Alternatively, for example, the position information may be position information registered in an information management apparatus managed by the NRA or its agency. Alternatively, for example, coordinates of an X axis, a Y axis, and a z axis with a specific geographical location as an origin may be used. In addition, an identifier indicating outdoor/indoor can be provided together with these pieces of coordinate information.

Furthermore, the position information may be information indicating an area where the communication apparatus (e.g., base station device 40) is located. For example, information defined by the government such as a postal code and an address may be used. Furthermore, for example, the area may be indicated by a set of three or more geographic coordinates. The information indicating these areas may be provided together with the coordinate information.

Furthermore, in a case where the communication apparatus (e.g., base station device 40) is located indoors, information indicating a floor of a building may be provided in the position information. For example, a floor number, an identifier indicating above ground/underground, or the like may be provided. Furthermore, for example, information indicating a further closed space inside the building, such as a room number and a room name in the building, may be provided in the information.

Typically, the above-described positioning function is desirably provided by the communication apparatus (e.g., base station device 40). However, it is not always possible to acquire the position information satisfying required accuracy depending on the performance of the positioning function or the installation position. Therefore, the positioning function may be used by the installer. In this case, it is desirable that the position information measured by the installer is written in the base station device 40.

The antenna information is typically information indicating performance, configuration, and the like of the antenna included in the communication apparatus (e.g., base station device 40). Typically, information such as an antenna installation height, a tilt angle (downtilt), a horizontal orientation (azimuth), a boresight, an antenna peak gain, and an antenna model may be included.

The antenna information may also include formable beam information. For example, information such as a beam width, a beam pattern, and an analog/digital beamforming capability may be included in the information.

The antenna information may also include information related to performance and configuration of multiple input multiple output (MIMO) communication. For example, information such as the number of antenna elements and the maximum number of spatial streams may be included. In addition, codebook information to be used, weight matrix information (a unitary matrix obtained by singular value decomposition (SVD), eigen value decomposition (EVD), block diagonalization (BD), and the like, a zero-forcing (ZF) matrix, or a minimum mean square error (MMSE) matrix), and the like may be included in the information. In addition, when maximum likelihood detection (MLD) or the like that requires nonlinear calculation is provided, information indicating the MLD or the like may be included in the information.

The antenna information may also include zenith of direction, departure (ZoD). The ZoD is one type of radio wave arrival angle. The ZoD may be estimated by another communication apparatus (e.g., another base station device 40) from a radio wave radiated from the antenna of the communication apparatus (e.g., base station device 40). In this case, the communication apparatus may be the terminal device that operates as a base station or an access point, a device that performs D2D communication, a moving relay base station, or the like. ZoD can be estimated by a radio wave arrival direction estimation technology such as multiple signal classification (MUSIC) or estimation of signal propagation via rotation invariance techniques (ESPRIT). The measurement information can be used by the communication control device 60.

The radio interface information is typically information indicating a radio interface technology included in the communication apparatus (e.g., base station device 40). For example, the information includes a technology used in GSM (registered trademark), CDMA2000, UMTS, E-UTRA, E-UTRA NB-IoT, 5G NR or a further next generation cellular system, an LTE-compliant derivative technology such as MulteFire or LTE-unlicensed (LTE-U), identifier information indicating a standard technology such as a metropolitan area network (MAN) such as WiMAX or WiMAX 2+, and an IEEE 802.11 wireless LAN. The radio interface information may be identifier information indicating a proprietary radio technology. In addition, a version number or a release number of technical specifications that define them may also be provided.

The radio interface information may also include spectrum information supported by the communication apparatus (e.g., base station device 40). For example, the information may be expressed by one or more combinations of the upper limit frequency and the lower limit frequency, one or more combinations of the center frequency and the bandwidth, and one or more 3GPP operating band numbers.

The spectrum information supported by the communication apparatus may further include capability information of a band extension technology such as carrier aggregation (CA) or channel bonding. For example, the information may include spectrum information that can be combined. Furthermore, the carrier aggregation may also include spectrum information to be used as a primary component carrier (PCC) or a secondary component carrier (SCC). Further, the number of CCs that can be aggregated at the same time may be included in the information.

The spectrum information supported by the communication apparatus may further include combination information of spectra supported by the dual connectivity and the multi connectivity. In addition, information on other communication apparatuses that cooperatively provide the dual connectivity or the multi connectivity may be provided together.

As the spectrum information supported by the communication apparatus, information indicating the radio wave access priority such as the PAL and the GAA may be included.

The radio interface information may also include modulation system information supported by the communication apparatus (e.g., base station device 40). As a representative example, primary modulation system information such as frequency shift keying (FSK) or n-value phase shift keying (PSK) (n is 2, 4, 8, and so on), or n-value QAM (n is 4, 16, 64, 256, and so on), or secondary modulation system information such as orthogonal frequency division multiplexing (OFDM), scalable OFDM, DFT spread OFDM (DFT-s-OFDM), generalized frequency division multiplexing (GFDM), or filter bank multi carrier (FBMC) may be included.

The radio interface information may also include information related to an error correction code. For example, information may include capabilities such as a turbo code, a low density parity check (LDPC) code, a polar code, and an erasure correction code, and applicable coding rate information.

As another aspect, the modulation system information and the information related to the error correction code may also be expressed by a modulation and coding scheme (MCS).

The radio interface information may also include information indicating a function specific to each radio technology specifications supported by the communication apparatus (e.g., base station device 40). As a representative example, there is transmission mode (TM) information defined by the LTE. In addition, those having two or more modes with respect to the specific function may be included in the radio interface information as in the TM described above. In addition, in the technical specification, in a case where the base station device 40 supports a function that is not essential in the specification even when there are no two or more modes, information indicating this may also be included.

The radio interface information may also include radio access technology (RAT) information supported by the communication apparatus (e.g., base station device 40). For example, the information may include the orthogonal multiple access (OMA) system such as time division multiple access (TDMA), frequency division multiple access (FDMA), and orthogonal frequency division multiple access (OFDMA); a non-orthogonal multiple access (NOMA) system such as power division multiple access (PDMA) (a typical example is a method implemented by a combination of superposition coding (SPC) and successive interference canceller (SIC)), code division multiple access (CDMA), sparse code multiple access (SCMA), interleaver division multiple access (IDMA), and spatial division multiple access (SDMA); or the opportunistic access system such as carrier sense multiple access/collision avoidance (CSMA/CA) and carrier sense multiple access/collision detection (CSMA/CD).

When the radio interface information includes information indicating the opportunistic access system, information indicating details of the access method may be further included. As a specific example, information indicating which one of frame based equipment (FBE) or load based equipment (LBE) defined in ETSI EN 301 598 may also be included.

When the radio interface information described above indicates the LBE, information specific to the LBE, such as a priority class defined in ETSI EN 301 598, may be further included.

The radio interface information may also include information about a duplex mode supported by the communication apparatus (e.g., base station device 40). As a representative example, the information may include frequency division duplex (FDD), time division duplex (TDD), or full duplex (FD).

In a case where the TDD is included as the radio interface information, TDD frame configuration information used/supported by the base station device 40 may be provided. Furthermore, information regarding the duplex mode may be included for each spectrum indicated by the above spectrum information.

When the FD is included as the radio interface information, information related to an interference power detection level may be included.

Still more, the radio interface information may also include information on transmission diversity technique supported by the communication apparatus (e.g., base station device 40). For example, space time coding (STC) or the like may be included.

The radio interface information may also include guardband information. For example, information related to a standardized guardband size may be included. Alternatively, for example, information regarding a guardband size desired by the base station device 40 may be included.

The radio interface information may be provided for each spectrum regardless of the above-described aspect.

The legal information is typically information related to regulations that the communication apparatus (e.g., base station device 40) need to comply with and are defined by the radio administration agencies or equivalent organizations in each country or region, authentication information acquired by the communication apparatus (e.g., base station device 40), or the like. Typically, the information related to regulations may include, for example, upper limit value information of out-of-band radiation, information regarding a blocking characteristic of the receiver, and the like. Typically, the authentication information may include, for example, type approval information (FCC ID, technical standard conformance certificate, etc.), and legal/regulatory information serving as a standard for authentication acquisition (e.g., FCC regulation number, ETSI harmonized standard number, etc.).

Among the legal information, numerical values may be substituted by those defined in the specifications of the radio interface technology. For example, the upper limit value of the out-of-band radiation may be derived and used by using an adjacent channel leakage ratio (ACLR) instead of the upper limit value information of the out-of-band radiation. In addition, the ACLR itself may be used as necessary. Further, adjacent channel selectivity (ACS) may be used instead of the blocking characteristic. In addition, these may be used in combination, or an adjacent channel interference ratio (ACIR) may be used. In general, ACIR has a relationship with ACLR and ACS represented by the following Formula (1).

$$ACIR = \left(\frac{1}{ACS} + \frac{1}{ACLR}\right)^{-1} \quad (1)$$

Although the true value expression is used in the above formula (1), the formula may be appropriately converted into a logarithmic expression.

The installer information may include information capable of identifying a person (installer) who has installed the communication apparatus (e.g., base station device 40), unique information associated with the installer, and the like. Typically, the information may include information related to a person who is responsible for the position information of the communication apparatus, which is referred to as a certified professional installer (CPI) defined by Non Patent Literature 2. The information on certified professional installer registration ID (CPIR-ID) and a CPI name are disclosed. In addition, as unique information associated with the CPI, for example, a contact address (mailing/contact address), an e-mail address, a telephone number, a public key identifier (PKI), and the like are disclosed. The information is not limited thereto, and other information related to the installer may be included as necessary.

The communication apparatus group information may include information on a communication apparatus group to which the communication apparatus belongs. Specifically, for example, the information may include information related to the same or equivalent type of group as disclosed in WINNF-SSC-0010. Furthermore, for example, when a communication carrier manages communication apparatuses in units of groups according to its own operation policy, group information may be included.

Figures 20, 21:
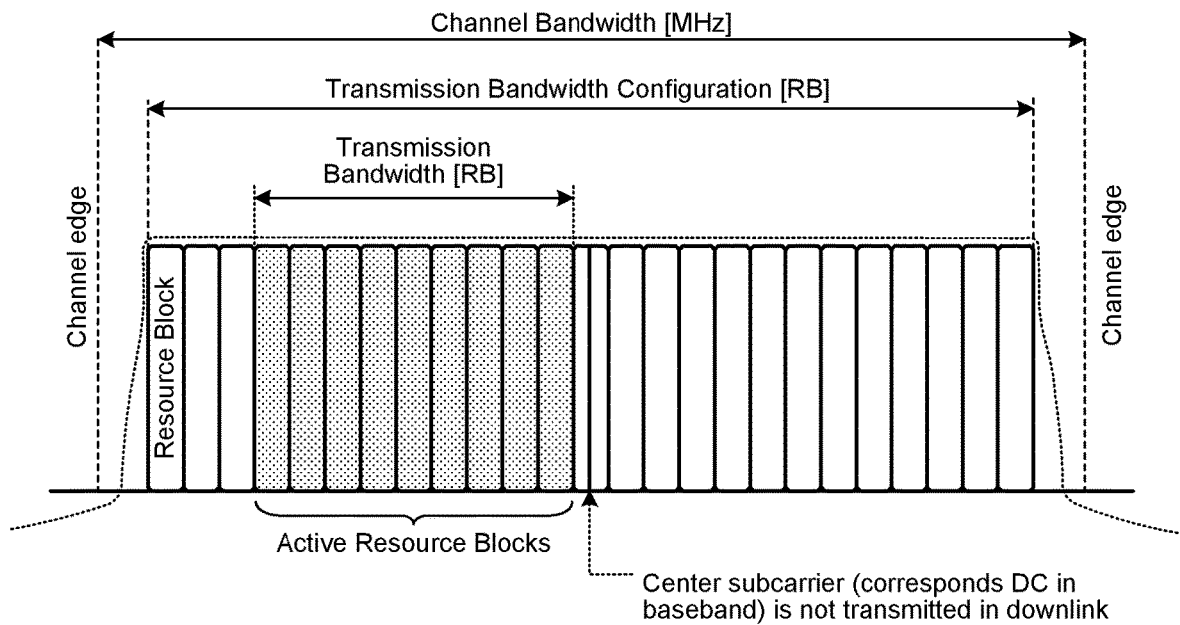
FIG. 20 is a diagram illustrating specifications of a transmission bandwidth.
FIG. 21 is a diagram illustrating specifications of the transmission bandwidth.
Figures 22, 23:
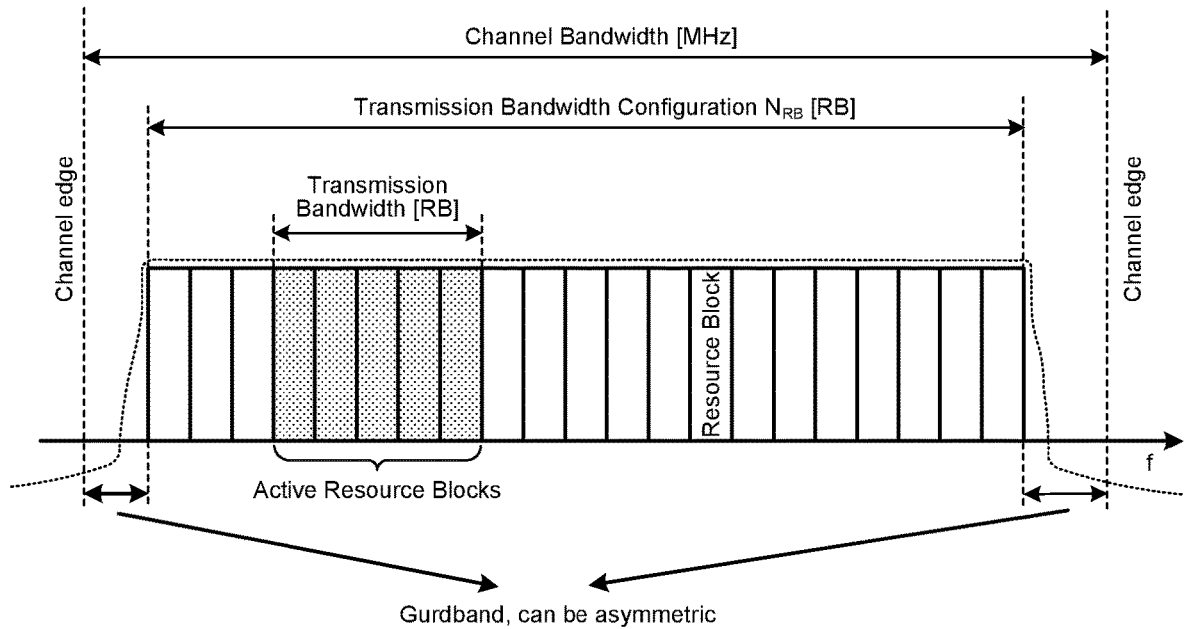
FIG. 22 is a diagram illustrating specifications of the transmission bandwidth.
FIG. 23 is a diagram illustrating specifications of the transmission bandwidth.

The information listed so far may be estimated from other pieces of information provided from the communication apparatus to the communication control device without the communication apparatus providing the information to the communication control device. Specifically, for example, the guardband information can be estimated from the radio interface specification information. When the radio interface used by the communication apparatus is E-UTRA or 5G NR, it can be estimated based on the transmission bandwidth specification described in TS36.104 or the table described in TS38.104. FIG. 20 to FIG. 25 illustrate transmission bandwidth specifications. FIG. 20 and FIG. 21 illustrate transmission bandwidth specifications in E-UTRA, and FIG. 22, FIG. 23, FIG. 24, and FIG. 25 illustrate transmission bandwidth specifications in the NR.

In other words, the communication apparatus or the intermediate device that substitutes for the plurality of communication apparatuses (e.g., network manager) does not necessarily need to provide the information listed so far to the communication control device. Providing information to the communication control device by the communication apparatus or the intermediate apparatus that substitutes for the plurality of communication apparatuses is merely one means of providing information. The information listed so far is information that may be necessary for the communication control device to normally complete the procedures, and means for providing the information is not limited.

Note that the transmission bandwidth of the present embodiment is not limited to the examples illustrated in FIG. 20 to FIG. 25.

(Supplement of Required Parameters)

In the registration procedure, depending on the embodiment, it is conceivable that not only the base station device 40 but also the device parameters related to the terminal device 30 are required to be registered in the communication control device 60. In such a case, the term "communication apparatus" in the above description (details of required parameter) may be replaced with a term "terminal device" or an equivalent term. In addition, a parameter specific to the "terminal device" that is not described above (details of required parameter) may also be treated as the required parameter in the registration procedure. For example, this includes a UE category specified by 3GPP.

(Details of Registration Process)

Figure 26:
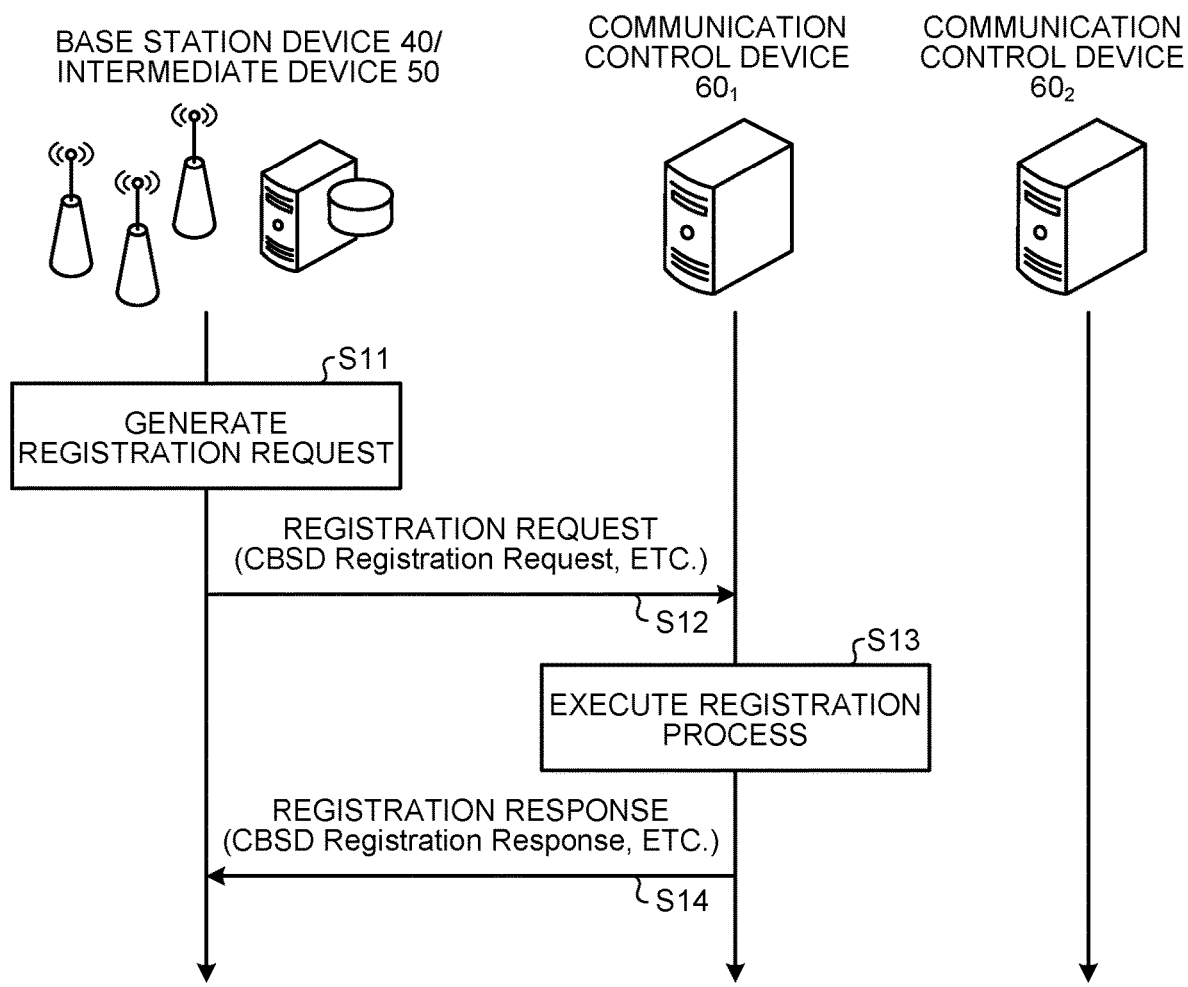
FIG. 26 is a sequence diagram illustrating a registration procedure.

FIG. 26 is a sequence diagram illustrating the registration procedure. In the procedure, one or more communication systems including the base station device 40 or the plurality of base station devices 40 generate a registration request message using the above device parameter (Step S11), and notify the communication control device 60 of the registration request message (Step S12). The generation and/or notification of the message may be performed by the intermediate device 50.

Here, when the device parameter includes the installer information, a falsification prevention process or the like may be applicable to the registration request by using this information. In addition, a part or all of the information included in the registration request may be subjected to an encryption process. Specifically, for example, a process in which a public key specific to the installer is shared in advance between the installer and the communication control device 60, and the installer encrypts information using a secret key. Examples of an encryption target include security sensitive information such as position information.

Further, as disclosed in Non Patent Literature 2, for example, the installer may directly write the position information into the communication control device 60.

After receiving the registration request, the communication control device 60 performs the registration process for the base station device 40 (Step S13), and returns a registration response according to a process result (Step S14). When there is no shortage or abnormality in information necessary for registration, the communication control device 60 records the information in the storage unit 42 and notifies of normal completion. Otherwise, the communication control device 60 notifies of a registration failure. When the registration is normally completed, the communication control device 60 may allocate an ID to each communication apparatus and notify the communication apparatus of the ID information by enclosing the ID information at the time of response. When the registration fails, typically, one or more communication systems including the base station device 40 or the plurality of base station devices 40, or the operator (e.g., mobile communication carrier or individual) or the installer thereof corrects the registration request and tries the registration procedure until the registration is normally completed.

Note that the registration procedure may be executed a plurality of times. Specifically, for example, the registration procedure can be re-executed in a case where the position information is changed beyond a predetermined standard due to movement/accuracy improvement or the like. The predetermined standard is typically defined by a legal system. For example, in 47 C.F.R Part 15, the mode II personal/portable white space device is obliged to access the database again when the position information changes by 100 meters or more.

<5-2. Available Spectrum Query Procedure>

An available spectrum query procedure is a procedure in which the base station device 40 or the intermediate device 50 makes inquiry to the communication control device 60 about available spectrum information. Typically, the procedure starts when the base station device 40 or the intermediate device 50 notifies the communication control device 60 of a query request including information that can identify applicable base station device 40 (or the base station device 40 under the intermediate device 50).

As described above, the "base station device 40" can be replaced with a word indicating another communication apparatus having the radio communication function. Furthermore, the "intermediate device 50" can also be replaced with a word indicating a communication system that substitutes (represents) another communication apparatus such as the proxy system.

Here, typically, the available spectrum information is information indicating the spectrum in which the base station device 40 (or the base station device 40 under the control of the intermediate device 50) does not give fatal interference to the primary system, and secondary use can be safely performed.

(1) Example 1

The available spectrum information is determined, for example, based on a secondary use prohibition area called an exclusion zone. Specifically, for example, when the base station device 40 is installed in the secondary use prohibition area provided for the purpose of protecting the primary system using a frequency channel F1, the frequency channel F1 is not notified as an available channel to the base station device 40.

(2) Example 2

The available spectrum information may also be determined, for example, by a degree of interference with the primary system. Specifically, for example, when it is determined that the critical interference is given to the primary system even outside the secondary use prohibition area, the frequency channel may not be notified as an available channel. An area where such determination may be necessary is also referred to as a neighborhood area. An example of a specific calculation method related to the determination of the neighborhood area is described in "Details of available spectrum evaluation Process" described later.

(3) Example 3

In addition, there may be a frequency channel on which the available spectrum information is not notified as available under conditions other than the primary system protection requirements described in Examples 1 and 2. Specifically, for example, in order to avoid interference that may occur between the base station devices 40 in advance, the frequency channel being used by another base station device 40 existing in the neighborhood of the base station device 40 (or the base station device 40 under the control of the intermediate device 50) may not be notified as an available channel. In this manner, the available spectrum information set in consideration of interference with another communication apparatus may be set as, for example, "recommended spectrum information" and provided together with the available spectrum information. In other words, the "recommended spectrum information" is preferably a subset of the available spectrum.

Note that the communication control device 60 may transmit, as the recommended spectrum information, information on spectrum that does not cause interference between the base station devices 40, separately from the available spectrum described in Example 1 and Example 2. Here, the available spectrum information referred to in Example 1 and Example 2 may be, for example, information on available channel described in Non Patent Literature 13. Further, the recommended spectrum information may be information on the recommended channel described in Non Patent Literature 13. Note that the recommended spectrum information can be regarded as one type of available spectrum.

(4) Example 4

Even in a case corresponding to the situation described in Example 2 or Example 3, it is possible to notify the same spectrum as that of the primary system or the neighboring base station device 40 as the available channel. In such a case, typically, the maximum allowable transmission power information is included in the available spectrum information. The maximum allowable transmission power is typically expressed by the EIRP. However, the present invention is not necessarily limited thereto, and may be provided by, for example, a combination of conducted power and antenna gain. Furthermore, the antenna gain may be set to an allowable peak gain in each spatial direction.

(Details of Required Parameter)

It is conceivable that the information that can identify the base station device 40 includes, for example, the communication apparatus-specific information registered at the time of the registration procedure, and the ID information described above (Details of registration process).

The query request may also include query requirement information. The query requirement information may include, for example, information indicating a spectrum for which it is desired to know whether or not the spectrum is available. Also, for example, transmission power information may be included. The base station device 40 or the intermediate device 50 may include the transmission power information, for example, when it is desired to know only the spectrum information in which the desired transmission power can be used. The query requirement information does not necessarily need to be included.

The query request may also include a measurement report. The measurement report includes a result of measurement performed by the base station device 40 and/or the terminal device 30. For example, not only raw data but also processed information may be included. For example, standardized metrics represented by reference signal received power (RSRP), reference signal strength indicator (RSSI), and reference signal received quality (RSRQ) may be used.

(Details of Available Spectrum Evaluation Process)

Figure 27:
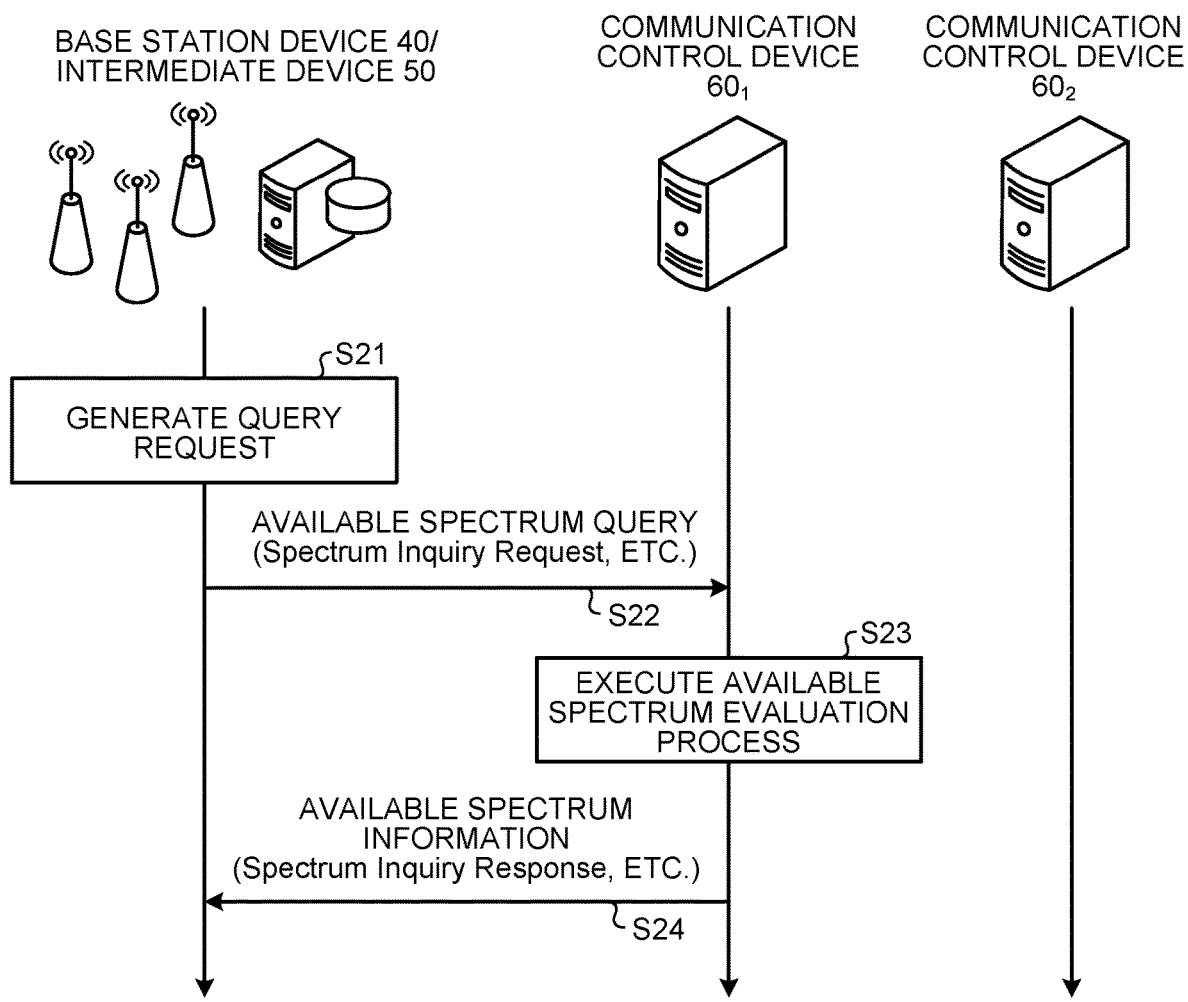
FIG. 27 is a sequence diagram illustrating an available spectrum query procedure.

FIG. 27 is a sequence diagram illustrating an available spectrum query procedure. The base station device 40 or the intermediate device 50 generates a query request including information that can identify the base station device 40 (or the base station device 40 under the intermediate device 50) (Step S21), and notifies the communication control device 60 of the query request (Step S22).

After receiving the query request, the communication control device 60 evaluates the available spectrum based on the query requirement information (Step S23). For example, as described in Examples 1 to 3 described above, the available spectrum can be evaluated in consideration of the existence of the primary system, the secondary use prohibition area thereof, and the base station device 40 in the vicinity thereof.

As described in Example 4 above, the communication control device 60 may derive the maximum allowable transmission power information. Typically, the acceptable interference power information in the primary system or a protection zone thereof, calculation reference point information of an interference power level experienced by the primary system, registration information of the base station device 40, and a propagation loss estimation model are used for calculation. Specifically, as an example, the following Formula (2) is used for calculation.

$$P_{MaxTx(dBm)} = I_{Th(dBm)} + PL(d)_{(dB)} \quad (2)$$

Here, $P_{MaxTx(dBm)}$ is the maximum allowable transmission power, $I_{Th\ (dBm)}$ is acceptable interference power, d is a distance between the reference point and the base station device 40, and $PL(d)_{(dB)}$ is a propagation loss at the distance d. Although the antenna gain in the transceiver is not explicitly indicated in the Formula, the antenna gain may be included according to an expression of the maximum allowable transmission power (EIRP, conducted power, etc.) or the reference point of the reception power (antenna input point, antenna output point, etc.). Further, the safety margin or the like for compensating for variation due to fading may be included. In addition, a feeder loss and the like may be considered as necessary.

In addition, the above Formula is described according to the assumption that the single base station device 40 is the interference source. For example, when it is necessary to consider aggregated interference from a plurality of base station devices 40 at the same time, a correction value may be added. Specifically, for example, the correction value may be determined based on three kinds of interference margin methods (fixed/predetermined, flexible, flexible minimized) disclosed in Non Patent Literature 3 (ECC Report 186).

Note that, although the above Formula is expressed using logarithms, it is a matter of course that the mathematical expression may be converted into the true value expression for use at the time of implementation. In addition, all parameters in logarithmic notation described in the present embodiment may be appropriately converted into the true value for use.

(1) Method 1

Furthermore, as described in the above section "Details of required parameter", when the transmission power information is included in the query requirement information, the available spectrum can be evaluated by a method different from the above-described method. Specifically, for example, it is assumed that the desired transmission power indicated in the transmission power information is used. In this case, when an estimated interference level is less than acceptable interference power in the primary system or the protection zone thereof, an applicable frequency channel is determined to be available, and the base station device 40 (or the intermediate device 50) is notified of the frequency channel.

(2) Method 2

The example is given to describe calculation of the above spectrum use condition based on aforementioned other system related information. However, the present disclosure is not limited thereto. For example, similarly to an area of a radio environment map (REM), when an area/space in which the base station device 40 can use the shared spectrum is determined in advance, the available spectrum information may be derived according to only the position-related information and the height-related information. Furthermore, for example, even when a lookup table for associating the position and the height with available spectrum information is prepared, the available spectrum information may be derived according to only the position-related information and the height-related information.

The evaluation of the available spectrum does not necessarily need to be performed after the query request is received. For example, after the normal completion of the above-described registration procedure, the communication control device 60 may independently perform the procedure without the query request. In this case, the communication control device 60 may create the REM or the lookup table exemplified in Method 2 or an information table similar thereto.

In any of the methods, the radio wave access priority such as the PAL or the GAA may also be evaluated. For example, when information regarding the radio wave access priority is included in the registered device parameter or the query requirement, whether or not the frequency spectrum can be used is determined based on the priority, and notification may be performed. Furthermore, for example, as disclosed in Non Patent Literature 2, when the information (referred to as a cluster list in Non Patent Literature 6 (WINNF-TS-0112) regarding the base station device 40 having priority access (e.g., PAL) is registered in the communication control device 60 in advance by the user, evaluation may be performed according to this information.

After evaluating the available spectrum, the communication control device 60 notifies the base station device (or the intermediate device 50) of an evaluation result (Step S24). The base station device 40 may select a desired communication parameter by using the evaluation result received from the communication control device 60.

<5-3. Spectrum Grant Procedure>

A spectrum grant procedure is a procedure for the base station device 40 to receive the secondary use permission of the spectrum from the communication control device 60. Typically, after the registration procedure is normally completed, one or more communication systems including the base station device 40 or the plurality of base station devices 40 start the procedure by notifying the communication control device 60 of a spectrum grant request including information that can identify the base station device 40. This notification may be performed by the intermediate device 50. Note that "after normal completion of the registration procedure" also means that the available spectrum query procedure does not necessarily need to be performed.

As described above, the "base station device 40" can be replaced with a word indicating another communication apparatus having the radio communication function. Furthermore, the "intermediate device 50" can also be replaced with a word indicating a communication system that substitutes (represents) another communication apparatus such as the proxy system.

In the present invention, it is assumed that at least the following two types of spectrum grant requests can be used.

Designation method

Flexible method

The designation method is a request method in which the base station device 40 designates at least a frequency band channel to be used and maximum transmission power as desired communication parameters and requests the communication control device 60 to permit operation based on the desired communication parameters. The parameters are not necessarily limited to these parameters, and parameters specific to the radio interface technology (such as a modulation system and a duplex mode) may be specified. In addition, information indicating radio wave access priority, such as PAL and GAA, may be included.

The flexible method is a request method in which the base station device 40 specifies only a requirement regarding a communication parameter, and requests the communication control device 60 to specify a communication parameter that can receive the secondary use permission while satisfying the requirement. The requirement for a communication parameter may include bandwidth, a desired maximum transmission power, or a desired minimum transmission power. The parameters are not necessarily limited to these parameters, and parameters specific to the radio interface technology (such as a modulation system and a duplex mode) may be specified. Specifically, for example, one or more TDD frame configurations may be selected in advance and notified.

In any of the methods, a measurement report may be included. The measurement report includes a result of measurement performed by the base station device 40 and/or the terminal device 30. For example, not only raw data but also processed information may be included. For example, standardized metrics represented by reference signal received power (RSRP), reference signal strength indicator (RSSI), and reference signal received quality (RSRQ) may be used.

The method information used by the base station device 40 may be registered in the communication control device 60 at the time of the registration procedure described in <5-1>.

(Details of Spectrum Grant Procedure)

Figure 28:
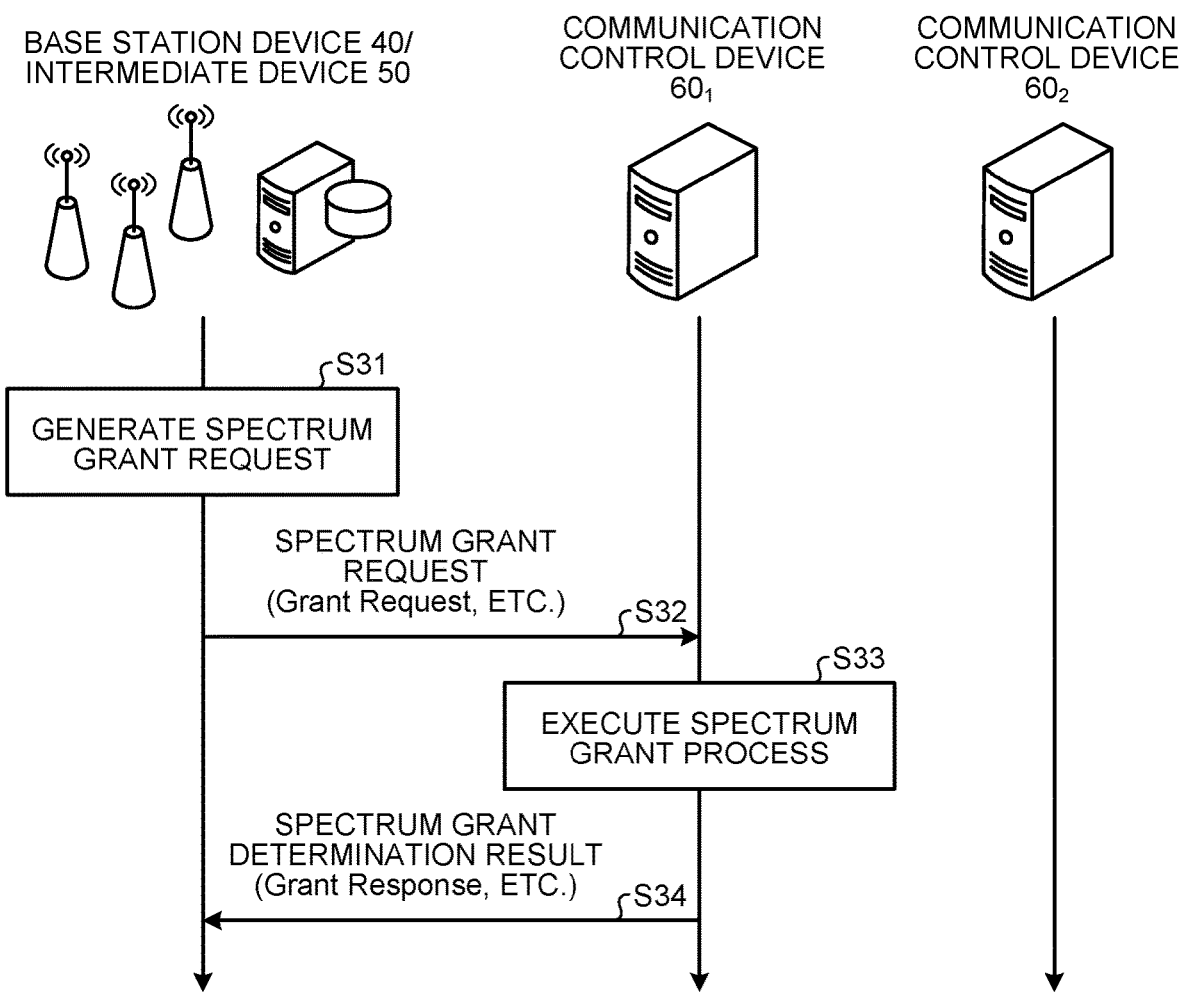
FIG. 28 is a sequence diagram illustrating a spectrum grant procedure.

FIG. 28 is a sequence diagram illustrating a spectrum grant procedure. In the procedure, one or more communication systems including the base station device 40 or the plurality of base station devices 40 generates the spectrum grant request including the information that can specify the base station device 40 (Step S31), and notifies the communication control device 60 of the spectrum grant request (Step S32). The generation and/or notification of the request may be performed by the intermediate device 50.

After acquiring the spectrum grant request, the communication control device 60 performs the spectrum grant process according to the spectrum grant request method (Step S33). For example, the communication control device 60 can perform the spectrum grant process in consideration of the existence of the primary system, the secondary use prohibition area thereof, and the base station device 40 in the vicinity using the method described in <5-2. Available spectrum query procedure>.

In a case where the flexible method is used, the communication control device 60 may derive the maximum allowable transmission power information using the method described in "Details of available spectrum evaluation process" in <5-2. Available spectrum query procedure>. Typically, the communication control device 60 calculates the maximum allowable transmission power by using the acceptable interference power information in the primary system or the protection zone thereof, the calculation reference point information of the interference power level suffered by the primary system, the registration information of the base station device 40, and the propagation loss estimation model. For example, the communication control device 60 calculates the maximum allowable transmission power by the following Formula (3).

$$P_{MaxTx(dBm)} = I_{Th(dBm)} + PL(d)_{(dB)} \quad (3)$$

Here, $P_{MaxTx\ (dBm)}$ is the maximum allowable transmission power, $I_{Th\ (dBm)}$ is acceptable interference power, d is a distance between the reference point and the base station device 40, and $PL(d)_{(dB)}$ is a propagation loss at the distance d. Although the antenna gain in the transmitter/receiver is not explicitly indicated in Formula, Formula may be modified and used according to the expression method of the maximum allowable transmission power (EIRP, conducted power, etc.) or the reference point of the reception power (antenna input point, antenna output point, and the like). Further, the safety margin or the like for compensating for variation due to fading may be included. In addition, a feeder loss and the like may be considered as necessary.

In addition, the above Formula is described according to the assumption that the single base station device 40 is the interference source. For example, when it is necessary to consider aggregated interference from a plurality of base station devices 40 at the same time, a correction value may be added. Specifically, for example, the correction value can be determined based on three methods (fixed/predetermined, flexible, flexible minimized) disclosed in Non Patent Literature 3 (ECC Report 186).

Various models may be used as the propagation loss estimation model. When a model is designated for each application, it is desirable to use the designated model. For example, in Non Patent Literature 6 (WINNF-TS-0112), the propagation loss model such as extended hata (eHATA) or irregular terrain model (ITM) is adopted for each application. Obviously, during implementation of the present invention, the propagation loss model does not need to be limited thereto.

The propagation loss estimation model requires information on a radio wave propagation path depending on the model. This may include, for example, information indicating inside and outside of line of sight (LOS/NLOS), terrain information (undulations, sea levels, etc.), and environmental information (urban, suburban, rural, open sky, etc.). In using the propagation loss estimation model, these pieces of information may be estimated from the registration information of the communication apparatus or the information of the primary system. Alternatively, when there is a pre-specified parameter, it is desirable to use the pre-specified parameter.

In a predetermined application, when a model is not designated, the model may be selectively used as necessary. As a specific example, it is possible to selectively use a model in which a loss is calculated to be small such as a free space loss model when estimating the interference power to another base station device 40, and a model in which a loss is calculated to be large when estimating coverage of the base station device 40.

In addition, in a case where the designation method is used, for example, the spectrum grant process can be performed by evaluating the interference risk. Specifically, for example, when it is assumed that the desired transmission power indicated by the transmission power information is used and an estimated interference level is less than the acceptable interference power in the primary system or the protection zone thereof, it is determined that the frequency channel is available, and the base station device 40 (or the intermediate device 50) is notified of the determination.

In any of the methods, the radio wave access priority such as the PAL or the GAA may also be evaluated. For example, when information regarding the radio wave access priority is included in the registered device parameter or the query requirement, whether or not the frequency spectrum can be used is determined based on the priority, and notification may be performed. Furthermore, for example, as disclosed in Non Patent Literature 2, when the information (referred to as a cluster list in Non Patent Literature 6 (WINNF-TS-0112) regarding the base station device 40 having priority access (e.g., PAL) is registered in the communication control device 60 in advance by the user, evaluation may be performed according to this information.

The spectrum grant process is not necessarily performed when the request is received. For example, after the normal completion of the above-described registration procedure, the communication control device 60 may independently perform without the spectrum grant request. Furthermore, for example, the spectrum grant determination process may be performed at regular intervals. In this case, an information table similar to the REM and the lookup table exemplified in Method 2 of <5-2. Available spectrum query procedure> may be created. In other words, the communication control device 60 can quickly return a response after receiving the spectrum grant request.

After completion of the spectrum grant process, the communication control device 60 notifies the base station device 40 of the determination result (Step S34).

<5-4. Spectrum Use Notification/Heartbeat>

The spectrum use notification is a procedure in which the base station device 40 or the intermediate device 50 notifies the communication control device 60 of the spectrum use based on the communication parameter allowed to be used in the spectrum grant procedure. This is also called heartbeat. Typically, the procedure starts when the base station device 40 or the intermediate device 50 notifies the communication control device 60 of a notification message including information that can identify the base station device 40.

As described above, the "base station device 40" can be replaced with a word indicating another communication apparatus having the radio communication function. Furthermore, the "intermediate device 50" can also be replaced with a word indicating a communication system that substitutes (represents) another communication apparatus such as the proxy system.

This procedure is desirably performed periodically until the use of frequency spectrum is rejected from the communication control device 60. When this procedure is normally completed, the base station device 40 may start or continue the radio wave transmission. For example, when the state of the grant is "granted", the state of the grant is transferred to "authorized" when the procedure is successful. In addition, when the state of the grant is authorized, the state of the grant shifts to Granted or Idole due to the failure of this procedure.

Here, the grant is authorization for radio wave transmission given by the communication control device 60 (e.g., SAS) to the base station device 40 (e.g., CBSD). The grant is described, for example, in Non Patent Literature 2. In Non Patent Literature 2, a signaling protocol is standardized between the database (SAS) and the base station (CBSD) for sharing spectrum of 3550 to 3700 MHz in the United States. In this standard, the authorization of radio wave transmission that SAS gives to CBSD is called "grant". The operational parameters allowed for the grant are defined by two factors that are the maximum allowable EIRP and a frequency channel. In other words, in order to perform radio wave transmission using a plurality of frequency channels, CBSD needs to acquire a plurality of grants from SAS.

Figure 29:
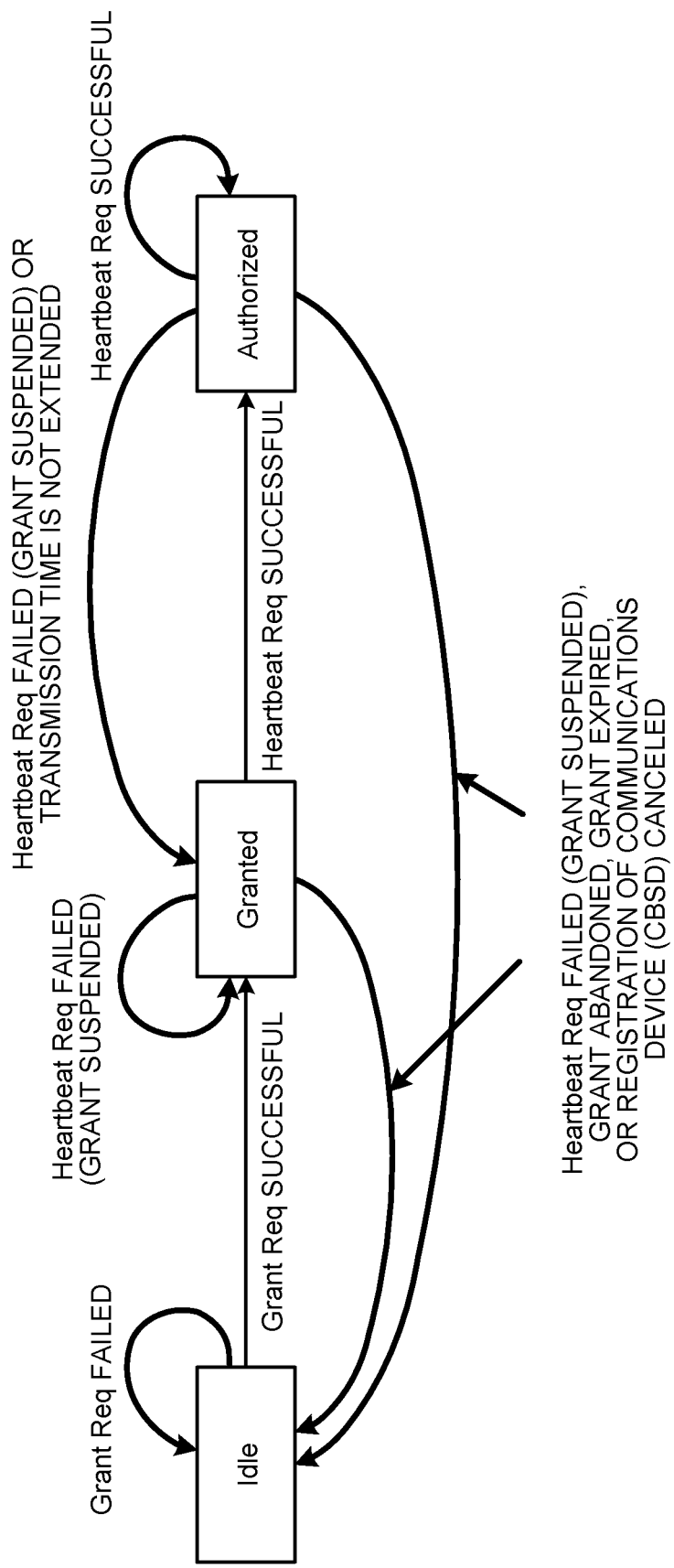
FIG. 29 is a state transition diagram illustrating a radio wave transmission permission state.

In the grant, a state indicating a radio wave transmission permission state is defined. Examples of the state indicating the radio wave transmission permission state include a granted state and an authorized state. FIG. 29 is a state transition diagram illustrating a radio wave transmission permission state. In FIG. 29, a granted state indicates a state in which a grant is held but radio wave transmission is prohibited, and the authorized state indicates a state in which radio wave transmission is permitted based on an operation parameter value defined in the grant. These two states change according to a result of the heartbeat procedure specified in the same standard.

In the following description, the spectrum use notification may be referred to as a heartbeat request or simply a heartbeat. In addition, a transmission interval of the heartbeat request may be referred to as a heartbeat interval. Note that the description of the heartbeat request or the heartbeat in the following description can be appropriately replaced with "request for starting or continuing radio wave transmission". Similarly, the heartbeat interval can be replaced with another description (e.g., transmission interval) indicating the transmission interval of the spectrum use notification.

Figure 30:
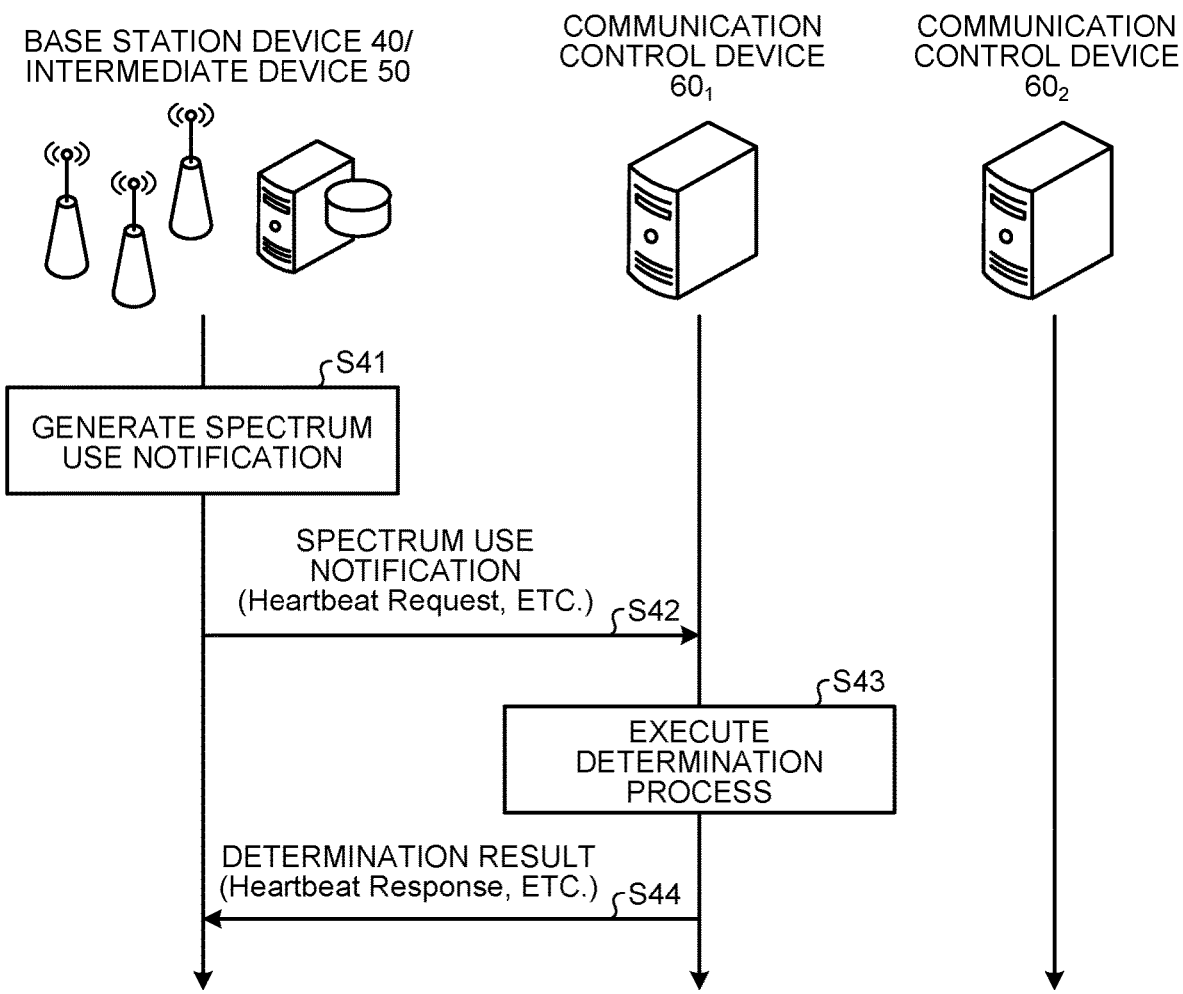
FIG. 30 is a sequence diagram illustrating a spectrum use notification procedure.

FIG. 30 is a sequence diagram illustrating the spectrum use notification procedure. In the procedure, one or more communication systems including the base station device 40 or the plurality of base station devices 40 generate a notification message including information that can identify the base station device 40 (Step S41), and notifies the communication control device 60 of a notification message (Step S42). The generation and/or notification of the message may be performed by the intermediate device 50.

After receiving the spectrum use notification, the communication control device 60 may determine whether the start/continuation of the radio wave transmission is allowed (Step S43). Examples of the determination method include confirmation of the frequency use information of the primary system. Specifically, the start/continuation permission or rejection of the radio wave transmission can be determined based on a change in spectrum used by the primary system, a change in the frequency use status of the primary system in which the radio wave access is not steady (e.g., on-board radar), or the like.

When the determination process is completed, the communication control device 60 notifies the base station device (or the intermediate device 50) of the determination result (Step S44).

In this procedure, a reconfiguration command for the communication parameters may be given from the communication control device 60 to the base station device 40 (or the intermediate device 50). Typically, it may be performed in response to the spectrum use notification. For example, recommended communication parameter information may be provided. The base station device 40 (or the intermediate device 50) to which the recommended communication parameter information has been provided preferably performs the spectrum grant procedure described in <5-4> again using the recommended communication parameter information.

<5-5. Supplement to Procedures>

Here, the various procedures do not necessarily need to be individually implemented as described below. For example, two different procedures may be implemented by substituting a third procedure having roles of the two different procedures. Specifically, for example, the registration request and the available spectrum information query request may be integrally notified. Furthermore, for example, the spectrum grant procedure and the spectrum use notification may be integrally performed. Of course, the number of combinations is not limited to these combinations, and may be three or more. Furthermore, the above procedure may be separately performed.

In addition, in a case where the present embodiment is applied for the purpose of sharing spectrum with the existing system, it is preferable that appropriate procedures or equivalent procedures are selected and used according to the radio law related to applicable spectrum in a country or region in which the technology of the present embodiment will be implemented. For example, when registration of the communication apparatus is required for use of a specific spectrum in a specific country or region, it is preferable to perform the aforementioned registration procedure.

In addition, an expression of "acquiring information" or an expression equivalent thereto in the present embodiment does not necessarily mean that the information is acquired according to the procedure described above. For example, although it is described that the position information of the base station device 40 is used in the available spectrum evaluation process, it does not mean that the information acquired through the registration procedure is always necessary. It means that when the position information is included in a request for the available spectrum query procedure, that position information may be used. In other words, the parameters described may be included in other procedures within the scope described in the present embodiment and within the scope of technical feasibility.

Furthermore, information that can be included in a response from the communication control device 60 described in the above procedure to the base station device 40 (or the intermediate device 50) may be push notification. As a specific example, available spectrum information, recommended communication parameter information, radio continuation rejection notificaton, and the like may be notified by the push notification.

<5-6. Procedures for Terminal Device>

The description has been made assuming mainly the use of communication apparatus (Type A). However, in some embodiments, an assumed scenario includes the terminal device 30 and the communication apparatus (Type B) including the terminal device 30, in addition to the communication apparatus (Type A), under the control of the communication control device 60. In other words, the communication control device 60 determines communication parameters of these devices. Even in such a case, basically, each procedure described in <5-1> to <5-4> can be used. However, unlike the communication apparatus (Type A), the terminal device 30 and the communication apparatus (Type B) need to use spectrum managed by the communication control device 60 for the backhaul link, and cannot transmit radio waves without permission. Therefore, it is desirable to start backhaul communication for the purpose of access to the communication control device 60 only after a radio wave or an authorization signal transmitted by a serving communication apparatus or a master communication apparatus is detected.

On the other hand, since the terminal device 30 and the communication apparatus (Type B) are under the control of the communication control device 60, it is preferable that the terminal device 30 and the communication apparatus (Type B) also have allowable communication parameters set for the purpose of protecting the primary system. However, the communication control device 60 is not informed of the position information and the like of these devices in advance. In addition, these devices are also likely to have mobility. In other words, the position information of these devices is dynamically updated. In some cases, depending on the legal system, re-registration to the communication control device 60 may be required when the position information changes by a certain amount or more.

In consideration of such various ways of use of terminals and communication apparatuses, the following two types of communication parameters are defined in the operation of the TVWS (see Non Patent Literature 4) specified by the Office of Communication (Ofcom) in UK.

Generic operational parameters

Specific operational parameters

The generic operational parameters are communication parameters defined as "Operational parameters with which any slave WSD located within the coverage area of a given master WSD (corresponding to the base station device 40) can be used" in applicable Non Patent Literature. As a feature, the WSDB calculates a parameter without using the position information of the slave WSD.

The generic operational parameters may be provided by unicast/broadcast from the communication apparatus (e.g., base station device 40) that is already permitted to transmit radio waves from the communication control device 60. For example, a broadcast signal represented by a contact verification signal (CVS) specified by the FCC rule Part 15 Subpart H may be used. Alternatively, a broadcast signal specific to a radio interface may provide the parameters. As a result, the terminal or the communication apparatus (Type B) can use the parameters as a communication parameter used for radio wave transmission for the purpose of accessing the communication control device 60.

The specific operational parameters are communication parameters defined as "Parameters usable by specific slave white space device (WSD)" in the applicable Non Patent Literature. In other words, it is a communication parameter calculated using a device parameter of the slave WSD corresponding to the terminal. As a feature, the WSDB calculates the parameter using the position information of the slave WSD.

<5-7. Procedure Required Between Communication Control Devices>

(Information Exchange)

Figure 31:
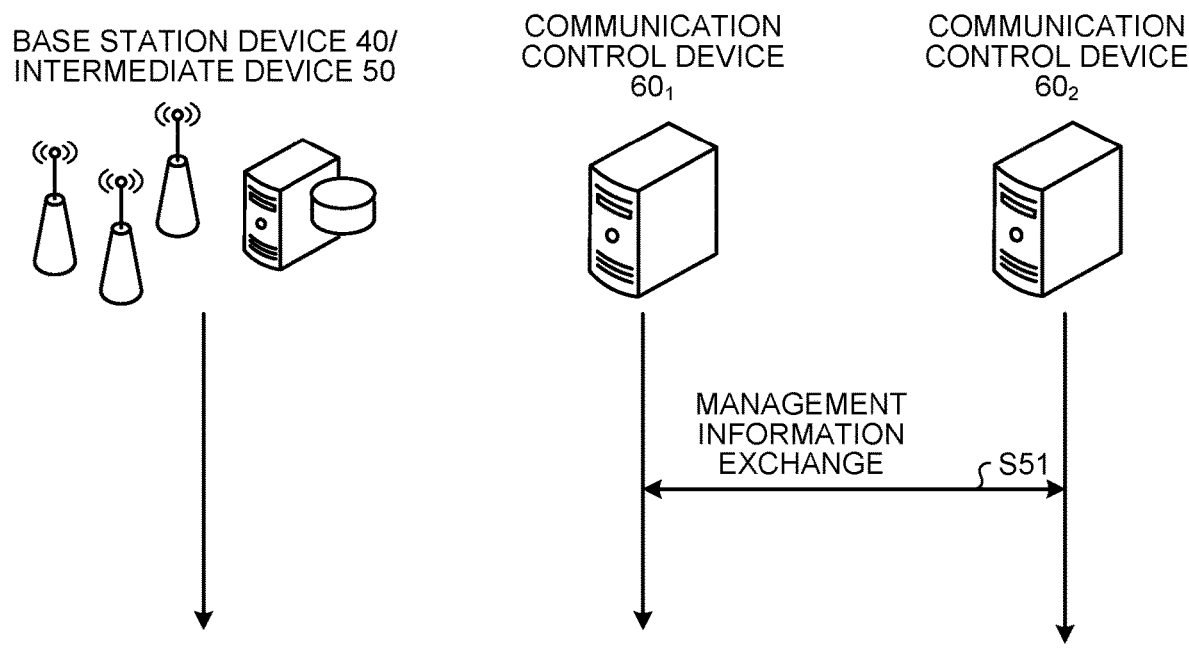
FIG. 31 is a sequence diagram illustrating a management information exchange procedure.

The communication control device 60 can exchange management information with another communication control device 60. FIG. 31 is a sequence diagram illustrating a management information exchange procedure. In an example in FIG. 31, the communication control device $60_1$ and the communication control device $60_2$ exchange information. Obviously, the communication control device that exchanges information is not limited to two, the communication control device $60_1$ and the communication control device $60_2$.

In the management information exchange procedure, at least the following information is preferably exchanged.

Information related to communication apparatus

Area information

Applicable protection system information

The information related to the communication apparatus includes at least the registration information and the communication parameter information of the communication apparatus (e.g., base station device 40) operating under permission of the communication control device 60. The registration information of a communication apparatus that does not have an authorized communication parameter may also be included.

Communication apparatus registration information is typically a device parameter of the base station device 40 registered in the communication control device 60 in the registration procedure. It is not necessary to exchange all pieces of the registered information. For example, information that may correspond to personal information does not need to be exchanged. Furthermore, when the communication apparatus registration information is exchanged, encrypted and obscured information may be exchanged. For example, information converted into binary values or information signed using an electronic signature mechanism may be exchanged.

Typically, the communication apparatus communication parameter information is information on a communication parameter currently used by the base station device 40. At least information indicating spectrum used and the transmission power is preferably included. Other communication parameters may also be included.

The area information is typically information indicating a predetermined geographical area. The information may include region information of various attributes in various manners.

For example, the protection zone information of the base station device 40 serving as a high priority secondary system such as PAL protection area (PPA) disclosed in Non Patent Literature 6 (WINNF-TS-0112) may be included. The area information in this case can be expressed by, for example, a set of three or more geographical location coordinates. Furthermore, for example, when a plurality of communication control devices 60 can refer to a common external database, the information can be expressed by an ID indicating the information.

Furthermore, for example, information indicating the coverage of the base station device 40 may be included. The area information in this case can also be expressed by, for example, a set of three or more geographical location coordinates. Furthermore, for example, assuming a circle with the geographical location of the base station device 40 as an origin, the circle can also be expressed by information indicating a radius. Furthermore, for example, when the plurality of communication control devices 60 can refer to the common external database that records the area information, the information can be expressed by an ID indicating the information.

Furthermore, as another aspect, information regarding an area section predetermined by an administrative organ or the like can be included. Specifically, for example, it is possible to indicate a certain region by indicating an address. Furthermore, for example, a license area or the like can be similarly expressed.

Furthermore, as still another aspect, the area information does not necessarily express a planar area, and may express a three-dimensional space. For example, it may be expressed using a spatial coordinate system. In addition, for example, information indicating a predetermined closed space such as a building floor number, a floor, and a room number may be used.

The applicable protection system information is, for example, information on a radio system regarded as incumbent. An example of the situation in which this information needs to be exchanged is cross-border coordination. It is sufficiently conceivable that there are different incumbents in the same spectrum between adjacent countries or regions. In addition, it is not always possible to acquire the incumbent information of an adjacent country or region even when incumbents use the same radio system. In this case, the applicable protection system information can be exchanged as necessary between different communication control devices in different countries or regions to which the applicable protection system information belongs.

As another aspect, the applicable protection system information may include a secondary licensee and information on a radio system operated under the secondary license. The secondary licensee is specifically a lessee of the license. For example, it is assumed that the secondary licensee borrows the PAL from the owner to operate the radio system owned by the secondary licensee. When the communication control device independently performs rent management, the communication control device 60 can exchange information on the secondary licensee and the information on the radio system operated under the secondary license with another communication control device 60 for the purpose of protection.

These pieces of information can be exchanged between the communication control devices 60 regardless of the decision-making topology applied to the communication control device 60.

Further, these pieces of information may be exchanged using various systems Examples thereof will be described below.

ID designation system
Period designation system
Region designation system
Dump system The ID designation system is to acquire information corresponding to a particular ID using the ID given in advance to identify information managed by the communication control device 60. For example, it is assumed that the communication control device $60_1$ manages a base station device 40 with ID: AAA. In this case, the communication control device $60_2$ designates the ID: AAA and makes an information acquisition request to the communication control device $60_1$. After receiving the request, the communication control device $60_1$ searches information on ID: AAA, and notifies the registration information and the communication parameter information of the applicable base station device 40 by a response.

The period designation system designates a specific period, and information satisfying a predetermined condition in the specific period can be exchanged.

An example of the predetermined condition is information update. For example, when acquisition of the communication apparatus information in the specific period is designated by a request, the registration information of the base station device 40 newly registered in the period and the registration information and the communication parameter information of the base station device 40 whose communication parameter has been changed may be notified by a response.

An example of the predetermined condition is whether or not the communication control device 60 performs recording. For example, when acquisition of the communication apparatus information in the specific period is designated by the request, the registration information of the base station device 40 and the communication parameter information recorded by the communication control device 60 in the specific period may be notified by a response. Furthermore, the latest information in the period may be notified. Alternatively, update history may be notified for each piece of information.

In the region designation system, a specific area is designated, and information belonging to the area is exchanged. For example, when acquisition of the communication apparatus information in the specific area is designated by the request, the registration information and the communication parameter information of the base station device 40 installed in the area may be notified by a response.

The dump system is to provide all pieces of information recorded by the communication control device 60. At least information on the base station device 40 and the area information are preferably provided by the dump system.

Information exchange described above between the communication control devices 60 is performed based on a pull system. In other words, information corresponding to the parameter specified in the request is responded. For example, the HTTP GET method may be used. However, the present disclosure is not limited to the pull system, and information may be actively provided to another communication control device 60 by a push system. The push system may be implemented by, for example, the HTTP POST method.

(Command/Request Procedure)

The communication control devices 60 may execute a command and/or a request with each other. Specifically, one example is reconfiguration of communication parameters of the base station device 40. For example, when it is determined that the base station device $40_1$ managed by the communication control device $60_1$ receives large interference from the base station device $40_4$ managed by the communication control device $60_2$, the communication control device $60_1$ may request the communication control device $60_2$ to change the communication parameter of the base station device $40_4$.

Another example is reconfiguration of area information. For example, when calculation of coverage information and protection zone information regarding the base station device $40_4$ managed by the communication control device $60_2$ are inadequate, the communication control device $60_1$ may request the communication control device $60_2$ to reconfigure the area information. Other than these examples, the area information reconfiguration request may be made for various reasons.

<5-8. Information Transmission Means>

Signaling between entities described above may be implemented via various media. As an example, E-UTRA or 5G NR will be described. Obviously, the present disclosure is not limited thereto.

(Communication Control Device-to-Communication Apparatus Signaling)

The notification from the communication apparatus (e.g., base station device 40 and the intermediate device 50) to the communication control device 60 may be performed, for example, in an application layer. For example, hyper text transfer protocol (HTTP) may be used. Signaling may be performed by describing a required parameter in a message body of the HTTP according to a predetermined form. Furthermore, when using the HTTP, notification from the communication control device 60 to the communication apparatus is also performed according to a HTTP response mechanism.

(Communication Apparatus-to-Terminal Signaling)

The notification from the communication apparatus (e.g., base station device 40 and intermediate device 50) to the terminal device 30 may be performed by using, for example, at least part of radio resource control (RRC) signaling, system information (SI), and downlink control information (DCI). Further, the notification may be implemented by using at least part of downlink physical channel (physical downlink control channel (PDCCH), physical downlink shared channel (PDSCH), or physical broadcast channel (PBCH)).

The notification from the terminal device 30 to the communication apparatus may be performed, for example, by using part of the RRC signaling or uplink control information (UCI). In addition, the notification may be performed by using an uplink physical channel (uplink physical control channel (PUCCH), physical uplink shared channel (PUSCH), or physical random access channel (PRACH)).

The signaling is not limited to the physical layer signaling described above, and the signaling may be performed in a higher layer. For example, at the time of implementation in the application layer, signaling may be implemented by describing a required parameter in a message body of the HTTP according to a predetermined form.

(Inter-Terminal Signaling)

As communication between the terminal device 30 and another terminal device 30, terminal-to-terminal communication, D2D, and V2X are assumed. The terminal-to-terminal communication, D2D, and V2X, may be performed using a physical sidelink channel (physical sidelink control channel (PSCCH), physical sidelink shared channel (PSSCH), or physical sidelink broadcast channel (PSBCH)).

When a target frequency channel for spectrum sharing is used in the sidelink, the communication parameter may be notified, acquired, and set in association with a resource pool for the sidelink in the target frequency channel. The resource pool is sidelink radio resources set by a specific frequency resource (e.g., resource block), a component carrier, and a time resource (e.g., radio frame, subframe, slot, mini-slot, and the like.). When the resource pool is set in the frequency channel to be subjected to spectrum sharing, the resource pool is set by at least one of RRC signaling, system information, or downlink control information from the communication apparatus to the terminal device. Then, the communication parameters to be applied in the resource pool and the sidelink are also set by at least one of RRC signaling, system information, and downlink control information from the communication apparatus to the terminal device. The notification of resource pool setting and the notification of the communication parameter to be used in the sidelink may be performed simultaneously or individually.

(Example of Signaling Procedure)

Figure 32:
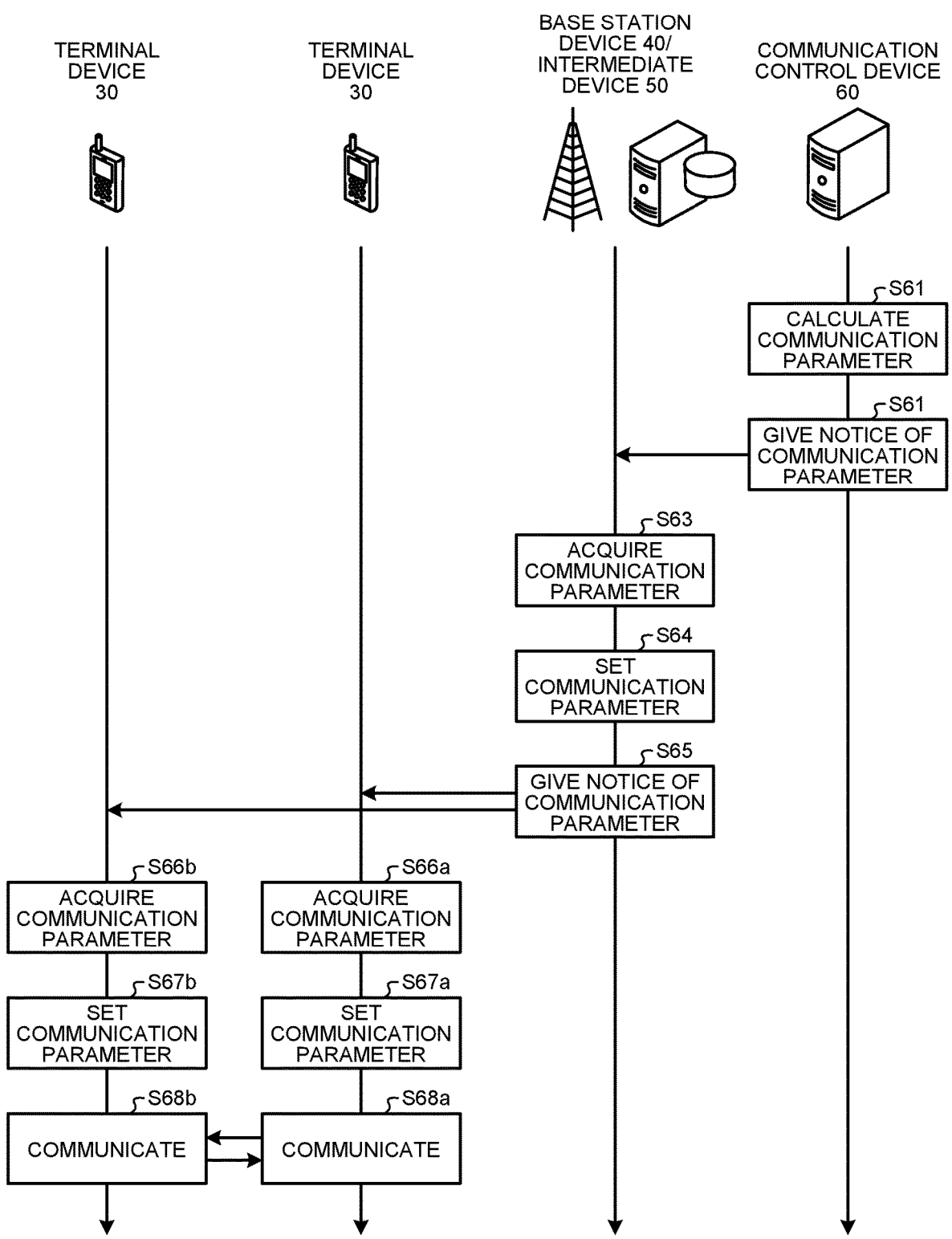
FIG. 32 is a diagram illustrating an example of a signaling procedure in a case where communication between terminal devices is assumed as communication of a secondary system.

FIG. 32 is a diagram illustrating an example of a signaling procedure when communication between the terminal devices 30 is assumed as communication of the secondary system. Hereinafter, the signaling procedure will be described with reference to FIG. 32.

The communication control device 60 calculates the communication parameter to be used by the communication apparatus (base station device 40 or intermediate device 50) of the secondary system (Step S61). Then, the communication control device 60 notifies the communication apparatus of the secondary system of the communication parameter (Step S62). Here, the communication apparatus of which the communication parameter is notified from the communication control device 60 may be the base station device 40 or the intermediate device 50. Furthermore, the communication apparatus of which the communication parameter is notified from the communication control device 60 may be the terminal device 30. In the following description, it is assumed that the communication apparatus of which the communication parameter is notified from the communication control device 60 is the base station device 40.

The base station device 40 acquires the communication parameter to be used by the communication apparatus (terminal device 30, base station device 40, or intermediate device 50) of the secondary system from the communication control device 60 (Step S63). Then, the base station device 40 sets the communication parameter to be used by itself (Step S64). Then, the base station device 40 notifies its own subordinate communication apparatus of the communication parameter to be used by the subordinate communication apparatus (Step S65). The subordinate communication apparatus may be the terminal device 30 or another base station device 40. In the following description, the subordinate communication apparatus is assumed to be the terminal device 30.

The terminal device 30 acquires the communication parameter to be used by itself from the base station device 40 (Steps S66a and S66b). Then, the terminal device 30 sets the communication parameter to be used by itself (Steps S67a and S67b). Then, the terminal device 30 communicates with another communication apparatus (e.g., another terminal device 30) in the secondary system (Steps S68a and S68b).

<5-9. Representative Operation Flow>

Next, a representative operation flow related to interference control calculation will be described.

Figure 33:
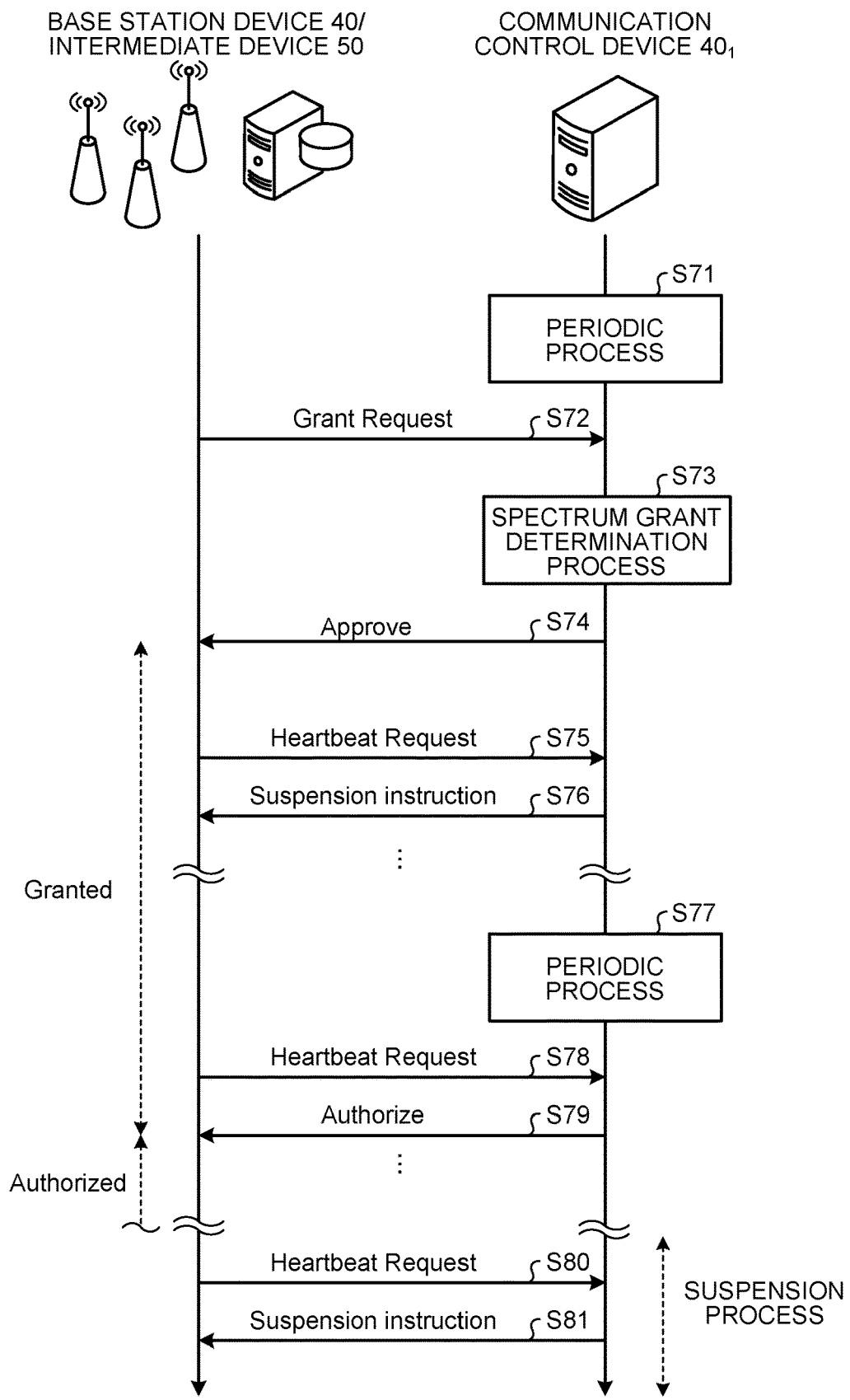
FIG. 33 is a sequence diagram illustrating an example of a grant process.

FIG. 33 is a sequence diagram illustrating an example of a grant operation. Specifically, FIG. 33 is a sequence diagram illustrating an operation of the communication system 2 corresponding to the procedures in <5-3. Spectrum grant procedure> and <5-4. Spectrum use notification>. Note that the operation flow illustrated in FIG. 33 is merely an example, and various modifications are made depending on a state of the base station device 40, the communication control device 60, and the intermediate device 50.

First, the communication control device $60_1$ executes a periodic process at an execution timing of the periodic process (Step S71). The periodic process is to synchronize information between the communication control devices 60 and perform calculation related to primary system protection. The periodic process is, for example, coordinated periodic activities among SASs (CPAS) described in Non Patent Literature 10 and Non Patent Literature 11. In the following description, the periodic process may be referred to as periodic protection calculation. The execution timing of the periodic process is, for example, 24 hours after the previous execution of the periodic process. Obviously, an execution interval of the periodic process is not limited to 24 hours.

Figure 34:
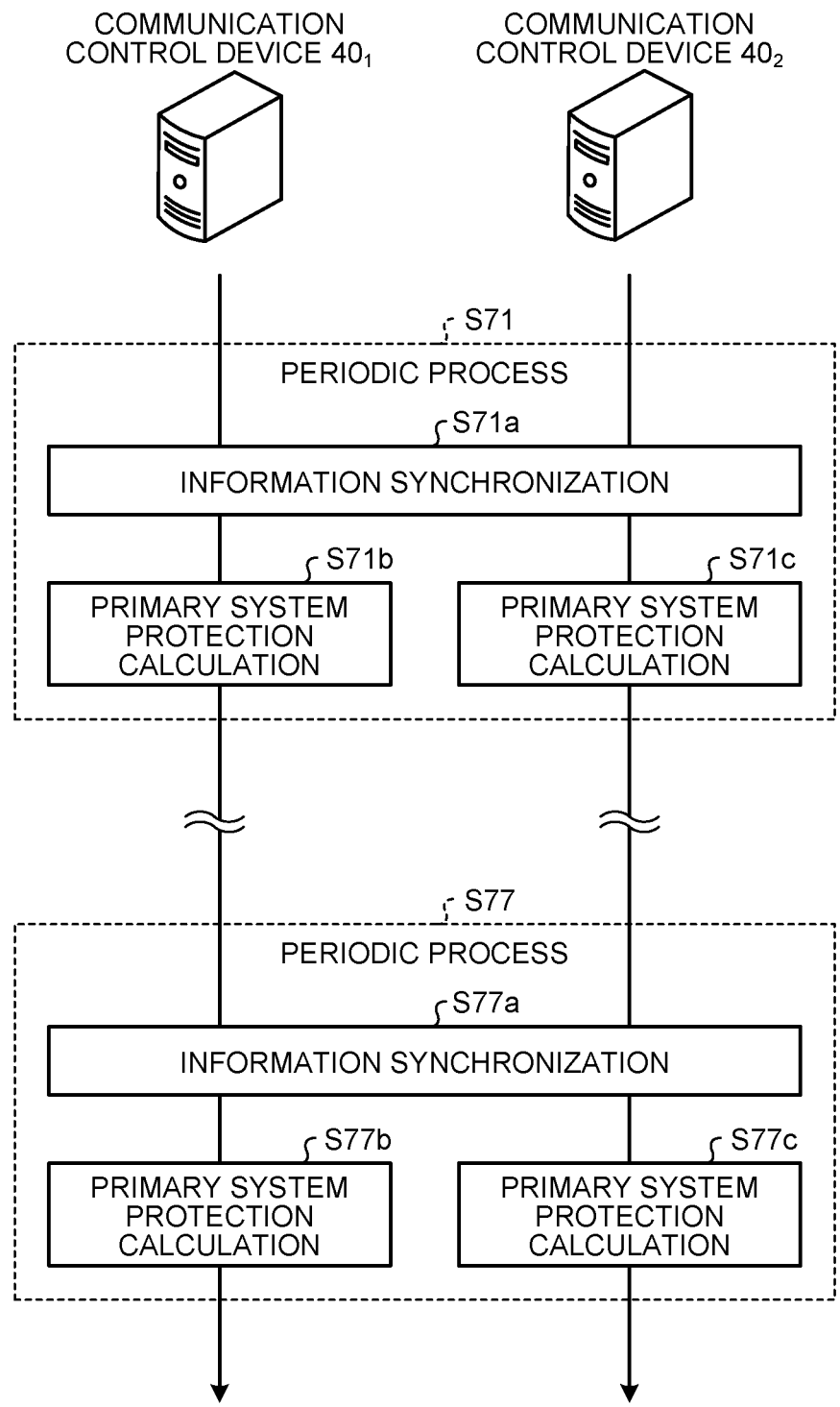
FIG. 34 is a diagram illustrating a specific periodic process.

FIG. 34 is a diagram illustrating a specific periodic process. In the example in FIG. 34, the communication control device $60_1$ and the communication control device $60_2$ synchronize information and perform calculation related to primary system protection. Obviously, more than two communication control devices 60 may perform the periodic process (information synchronization, etc.).

As illustrated in FIG. 34, each of the plurality of communication control devices 60 executes the periodic process (Step S71). First, each of the plurality of communication control devices 60 synchronizes information with another communication control device 60 (Step S71a). Then, each of the plurality of communication control devices 60 performs calculation related to primary system protection (Step S71b and Step S71c). Here, the communication control device 60 may calculate an estimated interference level, a surplus interference margin, and the like that an individual communication node (e.g., base station device 40) can give to the primary system.

Returning to FIG. 33, the base station device 40 or the intermediate device 50 transmits a grant request to the communication control device $60_1$ (Step S72). In the present embodiment, the base station device 40 or the intermediate device 50 provides, in the grant request, information regarding a use mode of frequency resources (radio resources) to be allocated as a result of the grant request. For example, the base station device 40 or the intermediate device 50 adds information indicating the application and details of the grant to the grant request.

The communication control device $60_1$ acquires the grant request to which the use mode information is added. The communication control device $60_1$ performs a process related to the frequency resources (i.e., grant process) based on the use mode information (Step S73). For example, the communication control device $60_1$ performs the spectrum grant determination process for allocating an available spectrum to the base station device 40 based on the use mode information.

After allocating the spectrum, the communication control device $60_1$ transmits a grant response to the base station device 40 or the intermediate device 50. In the example in FIG. 33, the communication control device $60_1$ notifies a success of the grant request (approve in FIG. 33) as the grant response (Step S74). The acquisition unit 441 of the base station device 40 or the acquisition unit 541 of the intermediate device 50 acquires the grant response from the communication control device $60_1$. In line with the success of the grant request, the grant state of the base station device 40 changes from Idole to Granted as illustrated in FIG. 29. The base station device 40 sets each unit according to the allocated grant.

Next, the base station device 40 or the intermediate device 50 transmits a heartbeat request to the communication control device $60_1$ (Step S75). Then, the communication control device $60_1$ acquires the heartbeat request transmitted. Then, the communication control device $60_1$ transmits a heartbeat response.

Note that, in the example in FIG. 33, the grant allocated to the base station device 40 has not passed the periodic process (e.g., CPAS) yet. Therefore, in the example in FIG. 33, the communication control device $60_1$ cannot approve the start of radio wave transmission. Therefore, the communication control device $60_1$ transmits a suspension instruction of radio wave transmission as the heartbeat response (Step S75).

Thereafter, the base station device 40 or the intermediate device 50 continues to transmit the heartbeat request at a heartbeat interval notified from the communication control device $60_1$. In response to the heartbeat request, the communication control device $60_1$ continues to transmit the suspension instruction of radio wave transmission as the heartbeat response until the next periodic process is completed.

When the execution timing of the periodic process comes, each of the plurality of communication control devices 60 including the communication control device $60_1$ executes the periodic process (Step S77). For example, as illustrated in FIG. 34, each of the plurality of communication control devices 60 synchronizes information with other communication control devices 60 (Step S77a). Then, each of the plurality of communication control devices 60 performs primary system protection calculation (Step S77b and Step S77c). The protection calculation is an example of interference calculation in this embodiment.

Next, the base station device 40 or the intermediate device 50 transmits the heartbeat request to the communication control device $60_1$ (Step S78). Then, the communication control device $60_1$ acquires the heartbeat request transmitted. Then, the communication control device $60_1$ transmits the heartbeat response. At this time, since the grant allocated to the base station device 40 has passed the periodic process, the communication control device $60_1$ can give approval for the start of radio wave transmission to the base station device 40 that has transmitted the heartbeat request. Therefore, the communication control device $60_1$ transmits a successful heartbeat response (Authorize in FIG. 33) as the heartbeat response (Step S78). With the success of the heartbeat request, the grant state of the base station device 40 changes from Granted to Authorized as illustrated in FIG. 29. The base station device 40 performs radio communication by controlling the radio communication unit 41 according to the allocated grant.

As described above, the grant state (radio wave transmission permission state) transitions according to the result of the heartbeat procedure. Various purposes are defined in the heartbeat procedure, and one of them is the radio wave suspension instruction of the base station device 40 when the incumbent system (e.g., marine radar) accesses radio waves in the same spectrum. For example, when it is determined that the incumbent system such as the communication system 1 is accessing radio waves, the communication control device 60 is obliged to suspend radio waves of all the base station devices 40 that may cause interference within a predetermined time (e.g., within 300 seconds). Since it is assumed that the push notification of the suspension instruction becomes complicated with respect to implementation, the communication control device 60 may emit a radio wave suspension instruction using the heartbeat response. In the following description, a process for suspending access of the base station device 40 to frequency resources by the communication control device 60 is referred to as "frequency resource suspension process" or "grant suspension process".

For example, the base station device 40 or the intermediate device 50 transmits the heartbeat request to the communication control device $60_1$ (Step S70). Then, the communication control device $60_1$ acquires the heartbeat request transmitted. Then, the communication control device $60_1$ determines whether the primary system such as the communication system 1 is accessing radio waves. When it is determined that the primary system is accessing radio waves related to a predetermined frequency resource, the communication control device $60_1$ transmits the suspension instruction of radio wave transmission as the heartbeat response (Step S71). The base station device 40 stops transmitting the radio wave related to the predetermined frequency resource. As a result, the grant state of the base station device 40 changes from Authorized to Idle (or Granted) as illustrated in FIG. 29. Alternatively, as illustrated in FIG. 29, the grant state of the base station device 40 changes from Granted to Idole.

6. OPERATION RELATED TO CONSTRUCTION OF SERVICE AREA

Next, an operation related to construction of the service area according to the present embodiment will be described, taking the operation of the communication control device 60 as an example.

The communication control device 60 acquires the desire information from the user who requests construction of a local service area, and generates permitted area information based on the desire information. The desire information is information related to an area setting of a predetermined service provided by using the secondary system, and includes at least information on an area desired by the user (desired area information). The permitted area information is, for example, information regarding an area in which the service using the secondary system is permitted.

In the following description, a device that generates the permitted area information is assumed to be the communication control device 60, but the device that generates the permitted area information is not limited to the communication control device 60. The device that generates the permitted area information may be a simple server device having no function of controlling radio communication.

<6-1. Scenario and Parameter>

Next, a scenario assumed in the present embodiment will be described.

Figure 35:
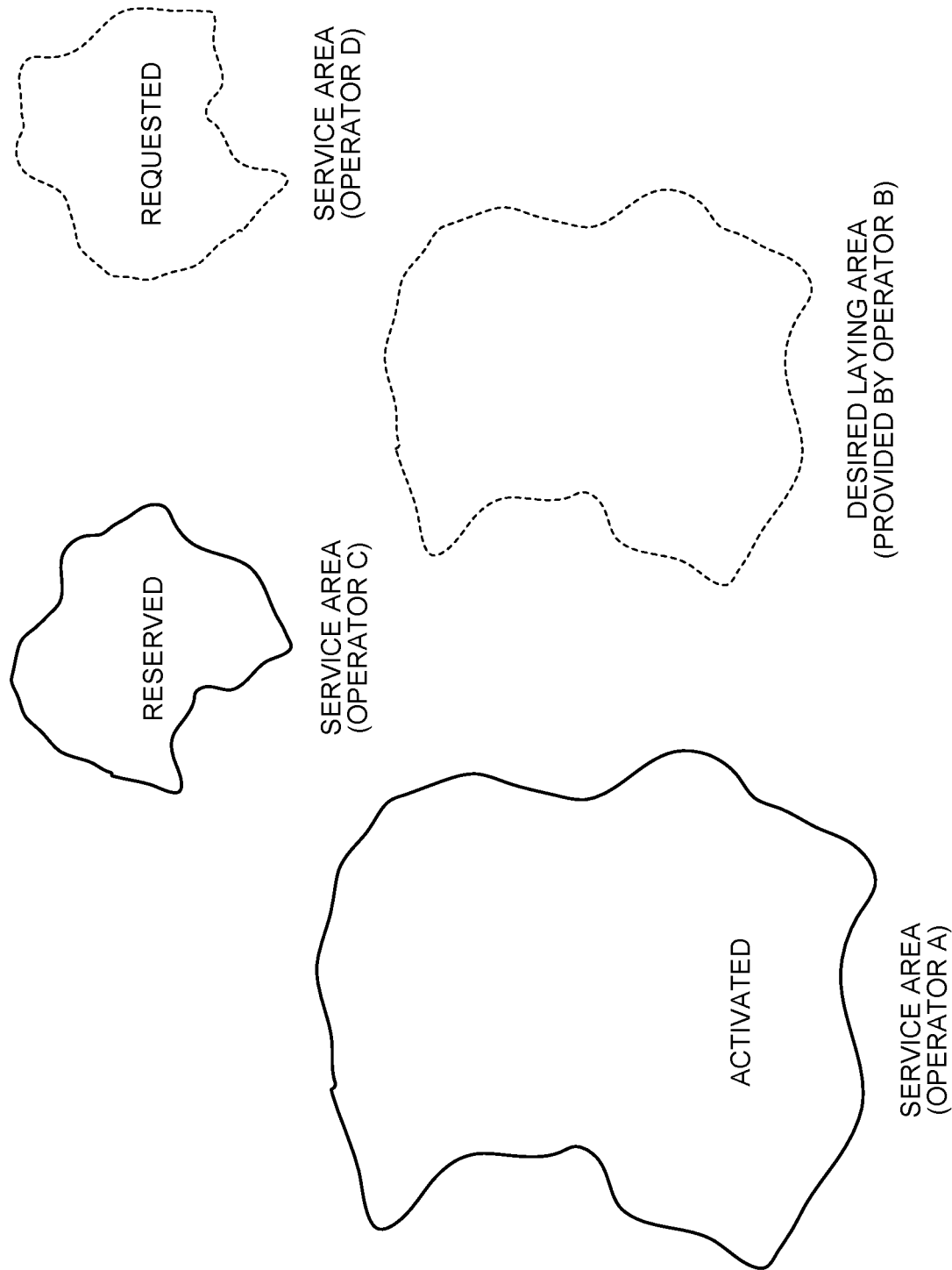
FIG. 35 is a diagram illustrating a scenario assumed in the embodiment.

FIG. 35 is a diagram illustrating a scenario assumed in the present embodiment. In the present embodiment, the scenario illustrated in FIG. 35 is assumed. In the example in FIG. 35, one local service area has already been activated. In the example in FIG. 35, a local service area for use by an operator A is activated.

Further, in the example in FIG. 35, there is a new local service area construction request from an operator B. Here, the local service area construction request is a request from a user (user's device or a device serving as a substitute for the user's device) who wishes to construct a local service area to the communication control device 60. In the following description, the local service area construction request may be simply referred to as a construction request.

The local service area requested by the operator B is located near the local service area of the operator A (a place where radio interference is assumed). It is assumed that there are a local service area assigned to an operator C and a local service area related to the construction request by an operator D near the local service area requested by the operator B. Note that the local service area assigned to the operator C may be either in use or unused (before starting to use or being suspended).

In the example in FIG. 35, the local service area of the operator C is RESERVED, and the local service area of the operator D is REQUESTED. RESERVED and REQUESTED will be described later.

Note that the scenario illustrated in FIG. 35 is merely an example. Application of the technology described in the present embodiment is not limited to the scenario illustrated in FIG. 35.

Furthermore, in the present embodiment, the local service area is, for example, an area of a service provided using the radio communication system, and is a local area (e.g., a partial area that is not the entire area). In the following description, the "local service area" may be simply referred to as a "service area".

<6-2. Parameter>

Next, a parameter (e.g., content of desire information) used for generating the permitted area information will be described.

The first acquisition unit 641 of the communication control device 60 acquires the construction request of the local service area of the operator B. The construction request of the local service area includes information related to area setting of the user who wishes to construct the local service area (hereinafter also referred to as desire information). Specifically, the construction request for the local service area includes information shown in Table 1 below.

TABLE 1

| Information type | Outline | Type/Information format |
|---|---|---|
| Desired base station/network laying area information | Area that operation B is examining to lay base station/network | Shapefile GeoJSON Array of geographical location information indicating area edges, etc. |
| License information | Information on license scheduled to be exercised in examined area | License ID Valid period |
| Limit information on | Information on minimum area that operator B | Shapefile GeoJSON |

TABLE 1-continued

| Information type | Outline | Type/Information format |
|---|---|---|
| desired base station/network laying area (Optional) | requires for laying base station/network | Array of geographical location information indicating area edges, etc. |
| Construction priority information (Optional) | Information indicating priority between area size and permissible base station parameter for constructing area | Shapefile GeoJSON Array of geographical location information indicating area edges, etc. |

Desired base station/network laying area information is information on an area in which the user wishes to construct a local service area (desired area information). For example, the desired base station/network laying area information is information on an area in which the operator B is considering to lay a base station/network. A type and/or information format of the desired base station/network laying area information is assumed to be a shapefile, GeoJSON, an array of geographical location information indicating area edges, and the like.

In the desired base station/network laying area information, it is preferable that a size of the area to be indicated in the information is limited. For example, a maximum area may be pre-specified. The communication control device 60 may recognize the information in a configuration file or the like, or may acquire the information from an external server or the like. The communication control device 60 may also use hard-coded information.

License information is information related to a license scheduled to be exercised in an examined area. Here, the license is a license related to radio wave access. The type and/or information format of the desired base station/network laying area information is assumed to be a license ID, a license valid period, and the like.

Limit information of the desired base station/network laying area is information on a minimum area that the operator B desires to secure for laying the base station/network. In other words, the limit information is information indicating a reduction limit of the desired laying area. Type and/or information format of the limit information of the desired base station/network laying area is assumed to be a Shapefile, GeoJSON, an array of geographical location information indicating area edges, and the like.

Construction priority information is information indicating a priority between the area size and the permissible base station parameter on constructing the area. The type and/or information format of the construction priority information is assumed to be a shapefile, a GeoJSON, an array of geographical location information indicating an area edge, and the like.

Note that the above-described parameters are merely examples. The information included in the desire information is not limited to the above parameters.

In the following description, the "desired base station/network laying area information" may be simply referred to as "desired laying area information". In addition, in the following description, the "desired base station/network laying area" may be simply referred to as a "desired laying area".

<6-3. Search Process>

In the present embodiment, it is assumed that the operator B will be using the same spectrum as that used in the local service area of the operator A. Therefore, actually, at the time of receiving the construction request, the communication control device 60 needs to search for an existing local service area that may be interfered with, according to the desired laying area information of the operator B.

Specifically, the communication control device 60 acquires, for example, another service area information (e.g., existing area information) using the secondary system. Then, for example, when the area requested by the operator B overlaps with the existing area, the communication control device 60 rejects the request. When there is the existing area within a certain distance, although not overlapped, the communication control device 60 considers the area in a process described below. Furthermore, for example, the communication control device 60 may define a state of the service area that has not been activated, and determine whether or not to consider as the existing area in a subsequent process according to the state.

The state of the service area is assumed to be defined, for example, as follows.

ACTIVATED
RESERVED
REQUESTED

ACTIVATED is the state in which the communication control device 60 has accepted the construction request and the area has been constructed. In the ACTIVATED state, the service has already started in the area.

RESERVED is a state in which the communication control device 60 has accepted the construction request and the area has been constructed. However, in the RESERVED state, the service has not been started yet.

REQUESTED is a state in which the communication control device 60 has received the construction request. In the REQUESTED state, the area has not yet been constructed due to a reason of, for example, under calculation.

Note that, when a state of area present in the vicinity is REQUESTED (e.g., area existing at a certain distance from the area related to the construction request), any one of the following methods (A1) to (A3) is conceivable as a determination method.

(A1) Not considered.

(A2) After completing REQUESTED calculation, applicable construction request process is performed. In other words, the REQUESTED area is handled equally to an already activated area (first come first served).

(A3) A plurality of REQUESTED areas is constructed in consideration of "coexistence" between the REQUESTED areas. For example, when an area existing in the vicinity is in the RESERVED state, the area is considered as an activated area.

In the following description, it is assumed that after receiving the construction request from the operator B, the communication control device 60 completes the above-described search process and finds an activated service area for use by the operator A.

Note that, in the following description, the service area (another service area) discovered through the search process may be referred to as an "interfered area".

<6-4. Estimation of Maximum Interference Level>

After completing the search, the calculation unit 643 of the communication control device 60 calculates inter-area interference from the desired laying area to service area of another service. For example, the communication control device 60 estimates the maximum interference level from the desired laying area of the operator B to the local service area of the operator A. Here, the communication control device 60 may calculate in the following order from (B1) to (B3).

(B1) Desired Laying Area Division into Grids

Figure 36:
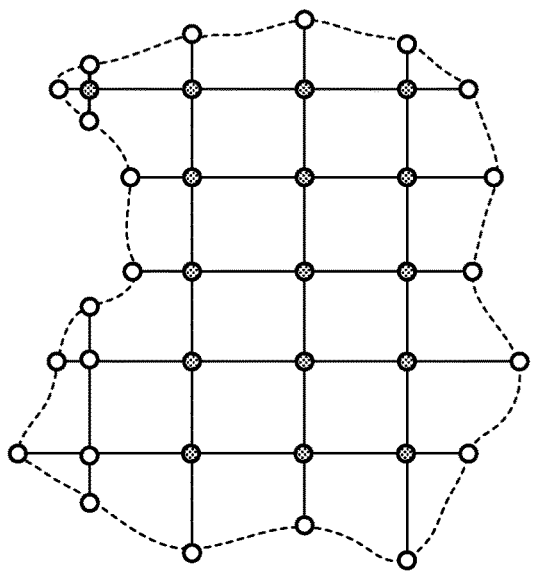
FIG. 36 is a diagram illustrating a state in which a desired laying area of an operator B is divided into grids.

First, the communication control device 60 divides the desired laying area into grids. FIG. 36 is a diagram illustrating a state in which the desired laying area of the operator B is divided into grids. Note that a grid interval is not limited to the example illustrated in FIG. 36. The communication control device 60 may freely determine the grid interval. In addition, the operator B may provide grid interval information as the desire information (e.g., the device of operator B or a device that substitutes for the device of operator B). Further, the operator A may provide the grid interval information (e.g., the device of operator A or a device that substitutes for the device of operator A). In this case, the desired laying area of the operator B may be divided into grids according to the grid interval information provided from the communication control device 60, the operator A, or the operator B.

(B2) Interfered Area Division into Grids

Figure 37:
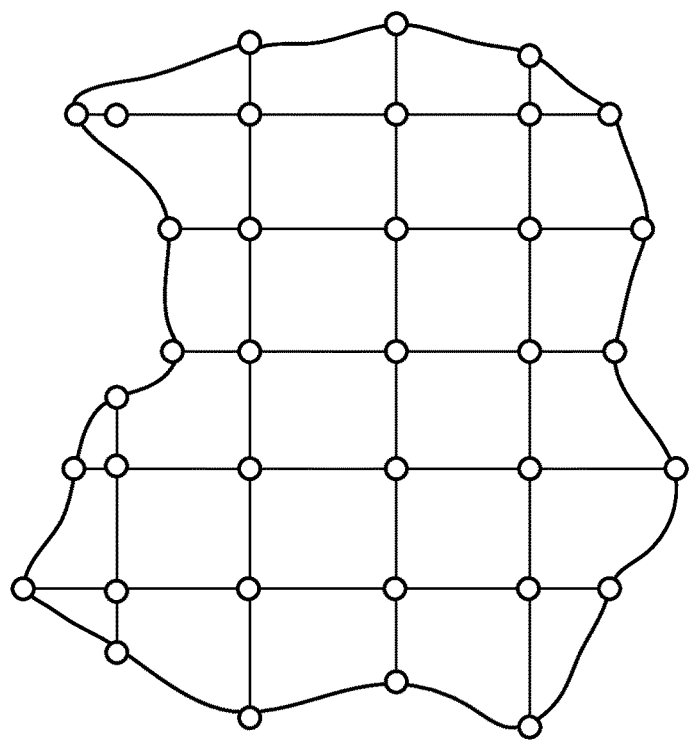
FIG. 37 is a diagram illustrating a state in which a local service area of an operator A is divided into grids.

Next, the communication control device 60 divides the interfered area into grids. FIG. 37 is a diagram illustrating a state in which the local service area of the operator A is divided into grids. The communication control device 60 may freely determine the grid interval. In addition, the operator B may provide grid interval information as the desire information (e.g., the device of operator B or a device that substitutes for the device of operator B). Further, the operator A may provide the grid interval information (e.g., the device of operator A or a device that substitutes for the device of operator A). In this case, the local service area of the operator A may be divided into grids according to the grid interval information provided from the communication control device 60, the operator A, or the operator B.

Then, the communication control device 60 sets a position where grid lines intersect (also including a service area edge) as an interference victim reference point. The communication control device 60 may set a lattice center as the interference victim reference point. Note that the interference victim reference point is desirably set on the service area edge (on the contour of the service area). In the following description, the interference victim reference point may be simply referred to as a reference point. The reference point can be rephrased as a protection point.

(B3) Interference Calculation

Next, the communication control device 60 calculates interference from the desired laying area to the interfered area. For example, the communication control device 60 calculates interference from the desired laying area of the operator B to the local service area of the operator A.

In the following description, it is assumed that the base stations of the operator B are installed in all the intersecting points of the grid lines in the desired laying area (including the area edge of the desired laying area). In the following description, these base stations may be referred to as virtual base stations.

The parameters of the virtual base stations of operator B are assumed as described in the following (1) to (5).

(1) The virtual base station uses the maximum transmission power.

(2) The virtual base station is at the maximum ground level at which the antenna can be installed.

(3) An antenna (or beam) of the virtual base station faces a direction of the local service area of the operator A.

(4) All the virtual base stations simultaneously transmit radio waves (e.g., all the virtual base stations use TDD and perform DL communication in synchronization.).

(5) The virtual base station is installed outdoors.

Note that the communication control device 60 may acquire capability information of a base station scheduled to be installed by the operator B. The capability information may be included in the desire information of the operator B. Then, the communication control device 60 may calculate the maximum transmission power of the virtual base station based on the capability information.

Figure 38:
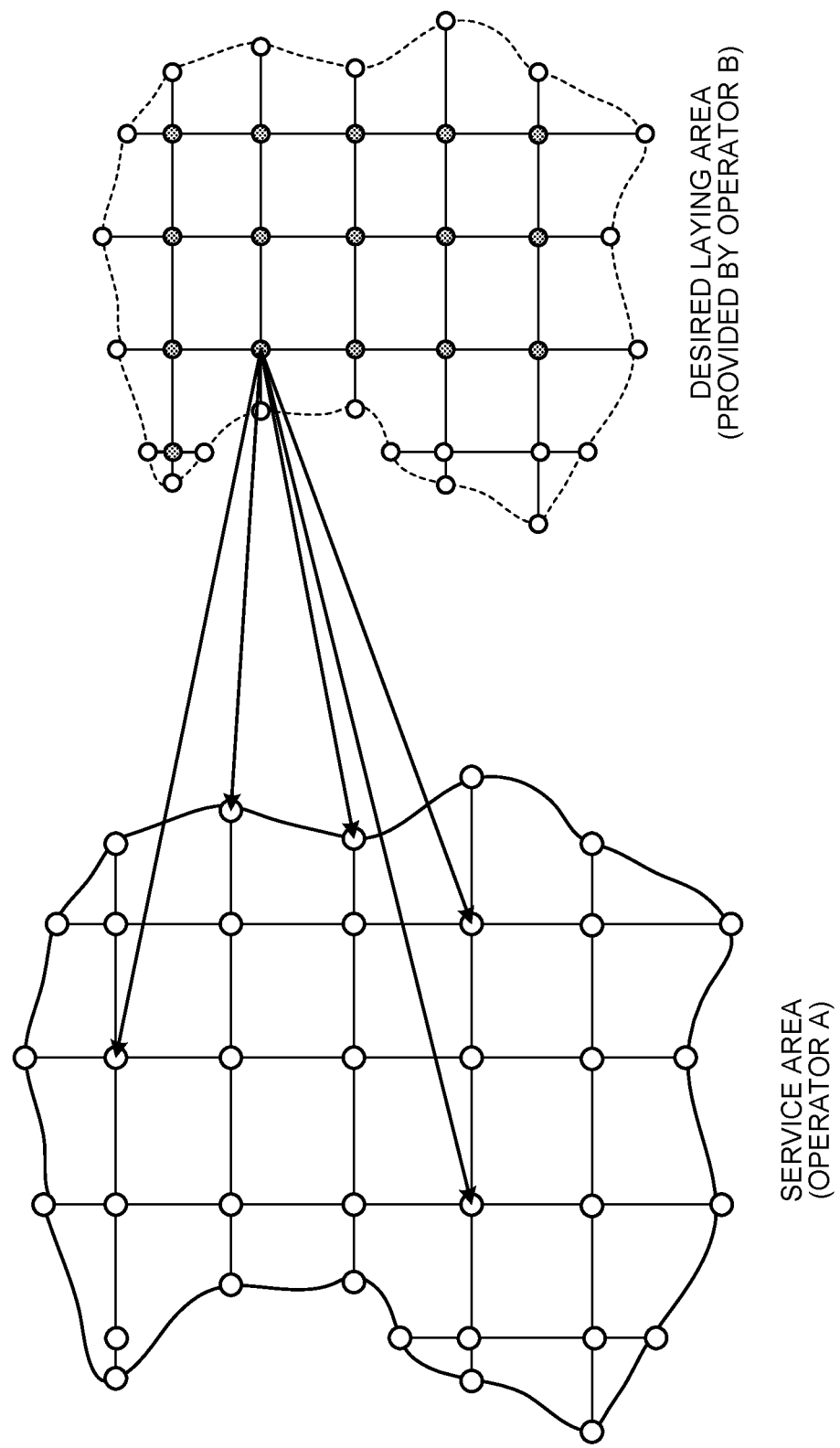
FIG. 38 is a diagram illustrating single-entry interference.

The communication control device 60 calculates single-entry interference for all reference points of all virtual base stations. FIG. 38 is a diagram illustrating the single-entry interference. In an example in FIG. 38, arrows indicate the single-entry interference. The single-entry interference can be calculated by applying, for example, the method described in "Details of available spectrum evaluation process" in <5-2>.

Then, the communication control device 60 calculates aggregate interference at all reference points. The maximum value obtained here is the "maximum interference level from the operator B's desired laying area to the operator A's local service area".

The maximum interference level calculated here may be a sum of single-entry interference. In addition, when a neighbor reference (interference calculation range) is set for each reference point, the communication control device 60 calculates the sum of the single-entry interference of corresponding virtual base stations.

In the following description, the "Maximum interference level from the operator B's desired laying area to the operator A's local service area" may be simply referred to as the "maximum interference level".

<6-5. Construction of Service Area>

After calculating the maximum interference level, the communication control device 60 constructs the service area based on the calculation result. For example, the communication control device 60 performs threshold determination of the maximum interference level, and constructs a local service area of the operator B based on a determination result. The local service area of the operator B may be constructed based on, for example, the following operation examples.

6-5-1. Operation Example 1

Operation Example 1 is a case where the maximum interference level is equal to or less than a predetermined threshold.

When the maximum interference level is equal to or less than the predetermined threshold, the communication control device 60 generates the permitted area information in which the desired laying area is set as the permitted laying area as it is. For example, the communication control device 60 sets "the desired laying area of the operator B" directly as a "permitted base station/network laying area of the operator B". The permitted area information is, for example, permitted base station/network laying area.

Figure 39:
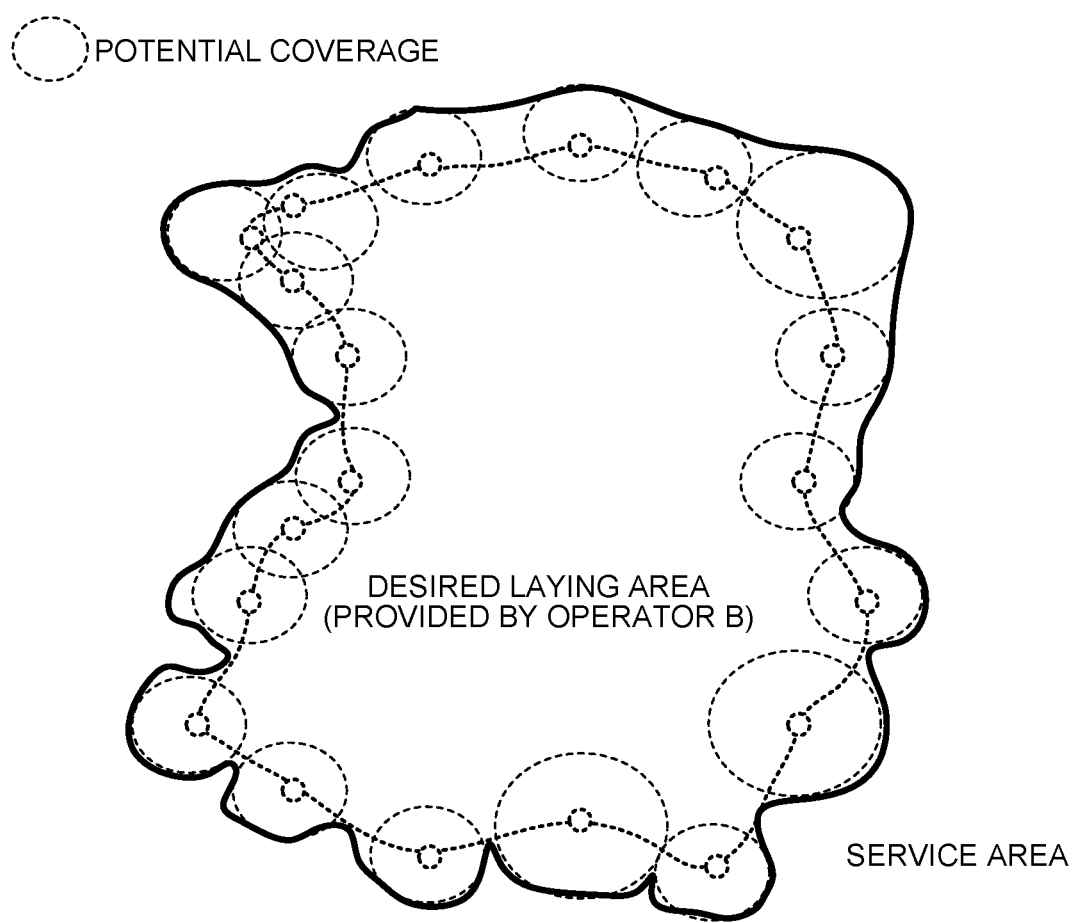
FIG. 39 is a diagram illustrating a local service area of the operator B.

When the maximum interference level is equal to or less than the predetermined threshold, the communication control device 60 draws the local service area of the operator B assuming that the base station is installed at an area edge (area boundary) of the desired laying area. FIG. 39 is a diagram illustrating the local service area of the operator B. For example, as illustrated in FIG. 39, the communication control device 60 draws coverage ("potential coverage" illustrated in FIG. 39) for each of the plurality of base stations arranged at the area edge of the desired laying area, and draws the local service area of the operator B by merging the coverage and the desired laying area. In the example in FIG. 39, a range surrounded by a bold line is the local service area of the operator B.

The communication control device 60 notifies the operator B (apparatus of operator B or apparatus for substituting apparatus of operator B) of permitted area information in which the desired laying area is set as a permitted laying area. At this point, the communication control device 60 may notify the operator B of permitted area information.

In Operation Example 1, the "desired laying area of the operator B" can be handled as the "permitted base station/network laying area of the operator B". Therefore, in Operation Example 1, the operator B can freely lay the base station/network as long as it is within the desired laying area.

6-5-2. Operation Example 2

Operation Example 2 is a case where the maximum interference level exceeds a predetermined threshold.

When the maximum interference level exceeds the predetermined threshold, the communication control device 60 returns a rejection response to the local service area construction request from the operator B. In other words, the communication control device 60 rejects the operator B's desire for constructing the local service area. In this case, the communication control device 60 may notify the operator B to request again by changing the size or the like of the "desired laying area of the operator B".

6-5-3. Operation Example 3

Operation Example 3 is another case where the maximum interference level exceeds the predetermined threshold.

When the maximum interference level exceeds the predetermined threshold, the communication control device 60 reduces the desired laying area until the maximum interference level falls below the predetermined threshold. Then, the communication control device 60 generates the permitted area information in which the reduced desired laying area is set as the permitted laying area. As a result, the communication control device 60 can generate the permitted area information even when the user's desire is not acceptable as it is.

Figure 40:
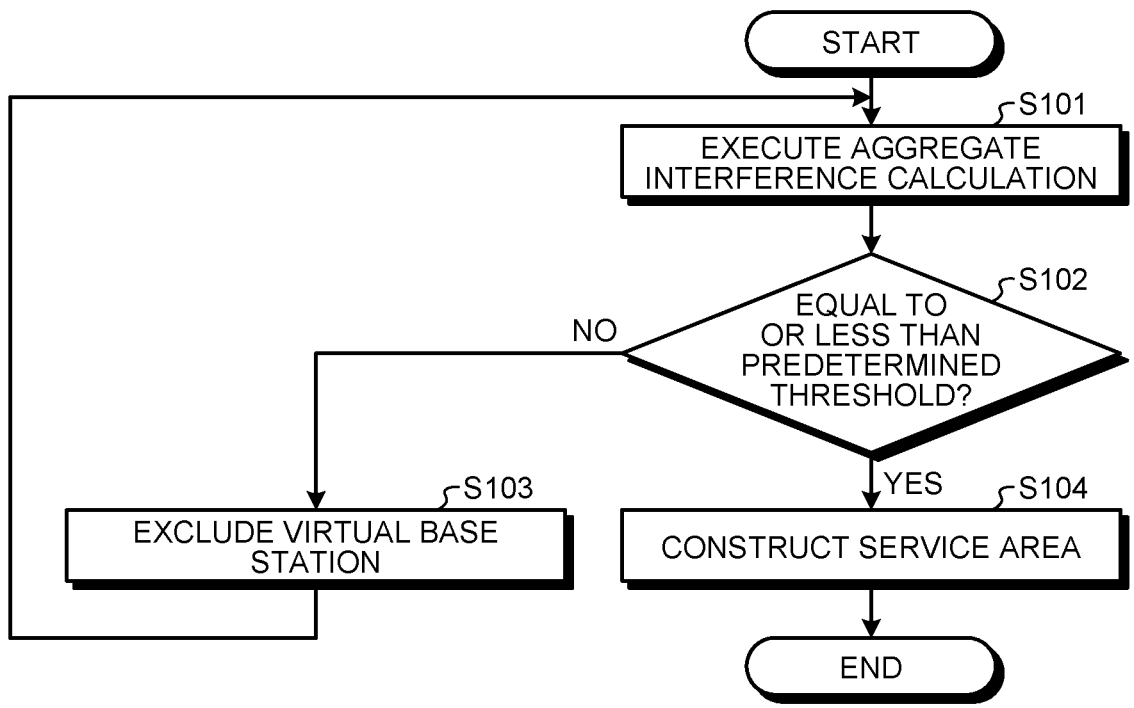
FIG. 40 is a flowchart illustrating an operation example of the communication control device in a case where a maximum interference level exceeds a predetermined threshold.

Specifically, the communication control device 60 executes the following process. FIG. 40 is a flowchart illustrating an operation example of the communication control device 60 in a case where the maximum interference level exceeds the predetermined threshold. Operation Example 3 will be described below with reference to FIG. 40.

First, the communication control device 60 calculates aggregate interference at all reference points as indicated in <6-4> (Step S101). Then, the communication control device 60 determines whether the maximum interference level is equal to or less than the predetermined threshold (Step S102).

When the maximum interference level exceeds the predetermined threshold (Step S102: No), the communication control device 60 excludes an outermost interference source (virtual base station) among the interference sources (virtual base stations) that contribute to the maximum interference (Step S103).

Then, the communication control device 60 checks the maximum interference level in the local service area of the operator A again (Step S102). The communication control device 60 repeats the process from Steps S101 to S103 until the maximum interference level becomes equal to or less than the predetermined threshold.

When the maximum interference level becomes equal to or less than the predetermined threshold (Step S102: Yes), the communication control device 60 draws the local service area of the operator B as in Operation Example 1 (Step S104). The communication control device 60 notifies the operator B of information on the constructed local service area.

In addition, the communication control device 60 notifies the operator B of the desired laying area information. When the virtual base station is not excluded in the above process (i.e., Step S103 has not been executed), the permitted laying area information may be the desired laying area of the operator B as it is.

On the other hand, when the virtual base station is excluded in the above process (i.e., Step S103 is executed,), the generation unit 644 of the communication control device 60 modifies the "desired laying area of the operator B" based on the virtual base station information after excluding the virtual base station. Then, the notification unit 645 of the communication control device 60 notifies the operator B of the modified desired laying area as the permitted laying area (permitted base station/network laying area).

6-5-4. Operation Example 4

Operation Example 4 is still another case where the maximum interference level exceeds the predetermined threshold.

When the maximum interference level exceeds the predetermined threshold, the communication control device 60 adjusts the communication parameter of the virtual base station until the maximum interference level falls below the predetermined threshold. In Operation Example 4, the permitted laying area may be the desired laying area as it is. As a result, the communication control device 60 can generate the permitted area information with the size desired by the user.

Figure 41:
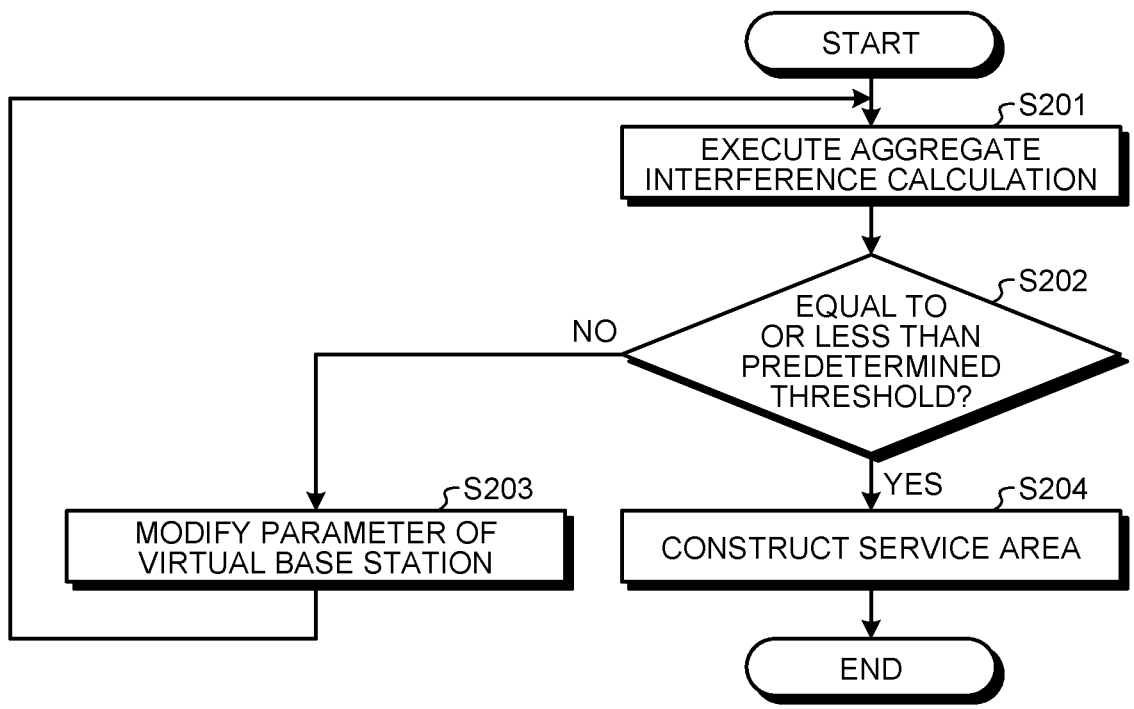
FIG. 41 is a flowchart illustrating the operation example of the communication control device in a case where the maximum interference level exceeds the predetermined threshold.

Specifically, the communication control device 60 executes the following process. FIG. 41 is a flowchart illustrating an operation example of the communication control device 60 when the maximum interference level exceeds the predetermined threshold. Operation Example 4 will be described below with reference to FIG. 41.

First, the communication control device 60 calculates aggregate interference at all reference points as indicated in <6-4> (Step S201). Then, the communication control device 60 determines whether the maximum interference level is equal to or less than the predetermined threshold (Step S202).

When the maximum interference level exceeds the predetermined threshold (Step S202: No), the communication control device 60 adjusts the parameter of an interference source (virtual base station) that gives the maximum single-entry interference among the interference sources (virtual base stations) that contribute to the maximum interference (Step S203). Here, the parameter adjusted by the communication control device 60 may include any of the following (1) to (3).

(1) Antenna installation height
(2) Antenna (or beam) orientation
(3) Maximum transmission power Then, the communication control device 60 checks the maximum interference level in the local service area of the operator A again (Step S202). The communication control device 60 repeats the process from Steps S201 to S203 until the maximum interference level becomes equal to or less than the predetermined threshold.

When the maximum interference level becomes equal to or less than the predetermined threshold (Step S202: Yes), the communication control device 60 draws the local service area of the operator B as in Operation Example 1 (Step S204). The communication control device 60 notifies the operator B of information on the constructed local service area.

In addition, the communication control device 60 notifies the operator B of the desired laying area information. In the case of Operation Example 4, the permitted laying area information may be the desired laying area information of the operator B as it is.

Note that in a case where the parameters of the virtual base station have been adjusted in the above-described process (i.e., Step S203 is executed), the generation unit 644 of the communication control device 60 generates "position of virtual base station whose parameter has been adjusted" and "adjusted parameter information". Then, the notification unit 645 of the communication control device 60 notifies the operator B of these pieces of information. At this point, the communication control device 60 may notify the operator B of the "adjusted parameter information" as parameter restriction information in the surrounding area (e.g., lattices) of the virtual base station whose parameter has been adjusted.

6-5-5. Operation Example 5

Operation Example 5 is another case where the maximum interference level exceeds the predetermined threshold.

In Operation Example 3 described above, the maximum interference level is suppressed by adjusting the size of the permitted laying area (hereinafter, the process of Operation Example 3 is referred to as "area size adjustment"). In Operation Example 4 described above, the maximum interference level is suppressed by adjusting the communication parameter of the virtual base station (hereinafter, the process of Operation Example 4 is referred to as "parameter adjustment"). Operation Example 5 adopts a hybrid system in which the area size adjustment and the parameter adjustment are combined. As a result, the communication control device 60 can generate more realistic permitted area information in consideration of the allowable limit of the user.

Figure 42:
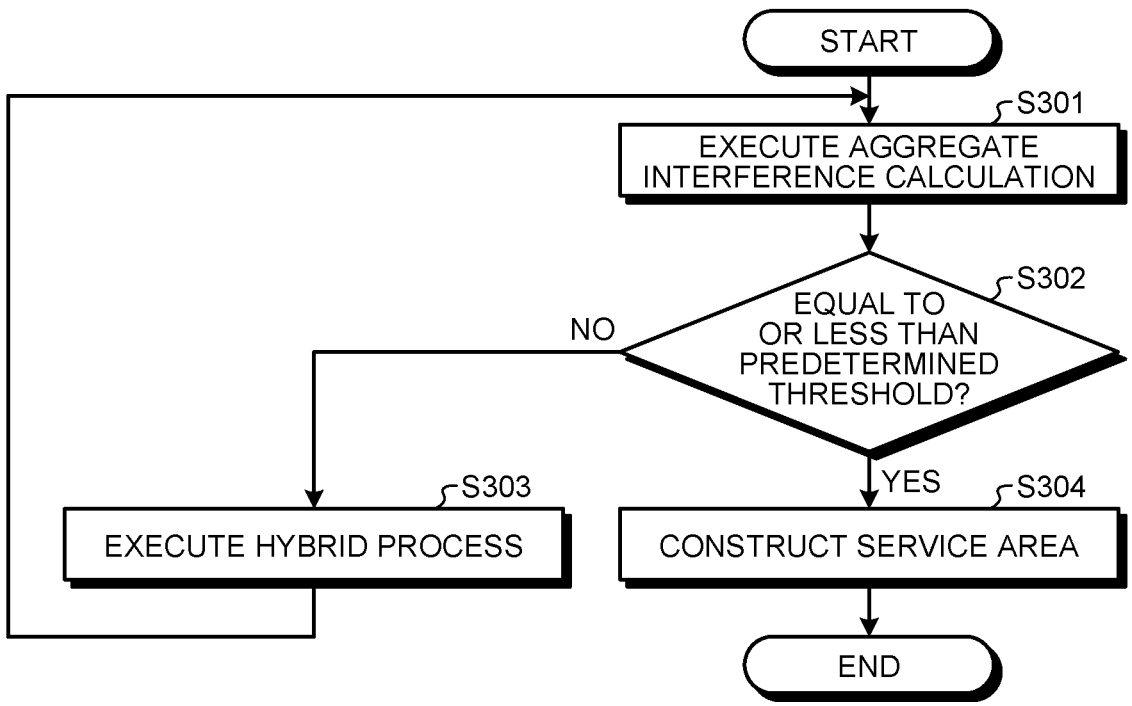
FIG. 42 is a flowchart illustrating the operation example of the communication control device in a case where the maximum interference level exceeds the predetermined threshold.

Specifically, the communication control device 60 executes the following process. FIG. 42 is a flowchart illustrating an operation example of the communication control device 60 when the maximum interference level exceeds the predetermined threshold. Operation Example 5 will be described below with reference to FIG. 42.

When the maximum interference level exceeds the predetermined threshold (Step S302: No), the communication control device 60 adjust the maximum interference level by the hybrid system (hereinafter referred to as a hybrid adjustment) (Step S303).

More specifically, the communication control device 60 basically suppresses the interference by area size adjustment. In other words, the communication control device 60 repeats the process from Steps S301 to S303 based on the area size adjustment. In the area size adjustment, when the permitted laying area is reduced beyond the reduction limit indicated by the limit information described in <6-2>, an interference level that cannot be suppressed by the area reduction up to the reduction limit is suppressed by the parameter adjustment. In other words, after reaching the reduction limit, the communication control device 60 repeats the process from Steps S301 to S303 based on the parameter adjustment.

When the interference becomes equal to or less than the predetermined threshold (Step S302: Yes), the generation unit 644 of the communication control device 60 draws the local service area of the operator B as in Operation Example 1 (Step S304). The communication control device 60 notifies the operator B of information on the constructed local service area.

In addition, the generation unit 644 of the communication control device 60 generates "permitted laying area information", "position of virtual base station whose parameter has been adjusted", and "adjusted parameter information", as in Examples 3 and 4. Then, the notification unit 645 of the communication control device 60 notifies the operator B of these pieces of information.

6-5-6. Operation Example 6

Operation Example 6 is another case where the maximum interference level exceeds the predetermined threshold.

In Operation Example 6, the communication control device 60 adopts either area size adjustment or parameter adjustment. For example, when the maximum interference level exceeds the predetermined threshold, the communication control device 60 selects one of the area size adjustment and the communication parameter adjustment based on a predetermined rule, and generates the permitted area information according to the selected process. As a result, the communication control device 60 can generate more realistic permitted area information in consideration of the user's desire.

Specifically, the first acquisition unit 641 of the communication control device 60 acquires priority information indicating priority between the area size of the permitted laying area and the communication parameter of the secondary system (radio system used for service). The priority information may be the "construction priority information" as described in <6-2>.

In a case where priority is given to the area size of the permitted laying area, the generation unit 644 of the communication control device 60 generates the permitted area information based on the result of the communication parameter adjustment. On the other hand, when the communication parameter of the secondary system is given priority, the generation unit 644 of the communication control device 60 generates the permitted area information based on the area size adjustment.

The notification unit 645 of the communication control device 60 notifies the operator B of the permitted area information generated by the generation unit 644.

<6-6. Management of Communication Apparatus>

In this way, the communication control device 60 may manage the communication apparatus (e.g., base station device 40) based on the service area constructed For example, when the spectrum query procedure is performed by the communication apparatus (e.g., base station device 40 or intermediate device 50) installed in the local service area, the communication control device 60 may notify the communication apparatus of the frequency channel information with which the right of the license associated with the local service area can be exercised.

Furthermore, for example, when the spectrum grant procedure is performed by the communication apparatus (e.g., base station device 40 or intermediate device 50) installed in the local service area, the communication control device 60 may give the communication apparatus a permission to access the frequency channel on which the right of the license associated with the local service area can be exercised.

Furthermore, the communication control device 60 may handle the local service area as, for example, various protection zones or exclusion zones including the PPA.

However, the present invention is not limited thereto, and the communication control device 60 may handle the local service area information in the same manner as the conventionally used the PPA. In other words, the communication control device 60 may replace the local service area with the PPA.

7. MODIFICATION

The communication control device 60 of the present embodiment is not limited to the device described in the above embodiment. For example, the communication control device 60 may be a device having a function other than controlling the base station device 40 that secondarily uses a frequency band subjected to spectrum sharing. For example, the network manager may have the function of the communication control device 60 of the present embodiment. In this case, the network manager may be, for example, a centralized base band unit (C-BBU) having a network configuration called a centralized radio access network (C-RAN) or an apparatus including the C-BBU. Further, the base station (including access point) may have the function of the network manager. These devices (network manager, etc.) can also be regarded as the communication control devices.

Furthermore, in the above-described embodiment, the communication control device 60 is a device belonging to the communication system 2, but may not necessarily be a device belonging to the communication system 2. The communication control device 60 may be a device outside the communication system 2. The communication control device 60 may indirectly control the base station device 40 via a device configuring the communication system 2 without directly controlling the base station device 40. In addition, there may be a plurality of secondary systems (communication systems 2). In this case, the communication control device 60 may manage the plurality of secondary systems. In this case, each secondary system may be considered as the second radio system.

In general spectrum sharing, the existing system that uses a target band is referred to as the primary system, and the secondary user is referred to as the secondary system. However, the primary system and the secondary system may be replaced with different terms. A macro cell in a heterogeneous network (HetNET) may be the primary system, and a small cell or a relay station may be the secondary system. In addition, the base station may be the primary system, and the relay UE or the vehicle UE that implements vehicle-to-everything (D2D or V2X) existing in the coverage may be the secondary system. The base station is not limited to a fixed type, and may be a portable/mobile type.

Furthermore, the interface between the entities may be wired or wireless. For example, the interface between the entities (communication apparatus, communication control device, or terminal device) in the present embodiment may be a wireless interface that does not depend on spectrum sharing. Examples of the wireless interface that does not depend on spectrum sharing include a radio communication line provided by a mobile communication carrier via a licensed band, and wireless LAN communication using the existing license-exempt band.

The control device that controls the radio apparatus 10, the management apparatus 20, the terminal device 30, the base station device 40, the intermediate device 50, or the communication control device 60 according to the present embodiment may be implemented by a dedicated computer system or a general-purpose computer system.

For example, a program for executing the above-described operation is stored and distributed in a computer-readable recording medium such as an optical disk, a semiconductor memory, a magnetic tape, or a flexible disk. Then, for example, the program is installed in a computer, and the above-described processing is executed to configure the control device. In this case, the control device may be the radio apparatus 10, the management apparatus 20, the terminal device 30, the base station device 40, the intermediate device 50, or a device outside the communication control device 60 (e.g., personal computer). Furthermore, the control device may be a device (e.g., control unit 13, control unit 23, control unit 34, control unit 44, control unit 54, or control unit 64) inside the radio apparatus 10, the management apparatus 20, the terminal device 30, the base station device 40, the intermediate device 50, or the communication control device 60.

In addition, the communication program may be stored in a disk device included in a server device on a network such as the Internet so that the communication program can be downloaded to the computer. In addition, the above-described functions may be realized by cooperation of an operating system (OS) and application software. In this case, a portion other than the OS may be stored in a medium and distributed, or a portion other than the OS may be stored in a server device and downloaded to the computer.

Among the processes described in the above embodiments, all or a part of the processes described as being performed automatically can be performed manually, or all or a part of the processes described as being performed manually can be performed automatically by a known method. In addition, process procedures, specific names, and information including various data and parameters illustrated in the above documents and the drawings can be arbitrarily changed unless otherwise specified. For example, the various types of information illustrated in each figure are not limited to the illustrated information.

In addition, each component of each device illustrated in the drawings is functionally conceptual, and is not necessarily physically configured as illustrated in the drawings. In other words, a specific form of distribution and integration of each device is not limited to the illustrated form, and all or a part thereof can be functionally or physically distributed and integrated in an arbitrary unit according to various loads, use conditions, and the like.

In addition, the above-described embodiments and modifications can be appropriately combined within a range not contradicting the processes. In addition, the order of each step illustrated in the sequence diagram or the flowchart of the present embodiment can be changed as appropriate.

Furthermore, for example, the present embodiment can be implemented as any structure configuring the apparatus or the system, including a processor as a system large scale integration (LSI) or the like, a module using a plurality of processors or the like, a unit using a plurality of modules or the like, a set obtained by further adding other functions to the unit, or the like (e.g., partial structure of the device).

Note that, in the present embodiment, the system refers to a set of a plurality of components (devices, modules (parts), etc.), and it does not matter whether or not all the components are in the same housing. For example, the plurality of devices housed in separate housings and connected via a network or the like, and one device in which the plurality of modules is housed in one housing are both systems.

Furthermore, for example, the present embodiment can adopt a configuration of cloud computing in which one function is shared and processed by a plurality of devices in cooperation via a network.

8. CONCLUSION

As described above, according to the embodiment of the present disclosure, the communication control device 60 is configured to calculate inter-area interference from the desired area of the user who requests construction of the local service area to the area of another service, and generate the permitted area information based on a calculation result of inter-area interference. As a result, the user who desires to construct the local service area does not need to specially install a base station for pre-adjustment of inter-area interference. As a result, the user can design arrangement of the base stations based on the permitted area information without actually arranging the base stations.

Although the embodiments of the present disclosure have been described above, the technical scope of the present disclosure is not limited to the above-described embodiments as it is, and various modifications can be made without departing from the gist of the present disclosure. In addition, components of different embodiments and modifications may be appropriately combined.

Note that the effects of each embodiment described in the present specification are merely examples and not limited thereto, and other effects may be provided.

The present technology can also have the following configurations.

(1)

An information processor comprising:
a first acquisition unit configured to acquire desire information on an area setting of a predetermined service provided using a second radio system that shares a part or all of a frequency band used by a first radio system, the desire information including at least desired area information;
a second acquisition unit configured to acquire area information on another service that uses or is allocated to a predetermined frequency band used by the predetermined service;
a calculation unit configured to calculate inter-area interference from an area specified by the desired area information to an area of the another service; and
a generation unit configured to generate permitted area information on an area in which the predetermined service is permitted based on a calculation result of the inter-area interference.

(2)

The information processor according to (1), wherein
the desired area information is information on a desired laying area of the second radio system,
the calculation unit arranges a virtual base station in the desired laying area and calculates an interference level from the virtual base station to the area of the another service, and
the generation unit generates the permitted area information based on the interference level.

(3)

The information processor according to (2), wherein
the calculation unit arranges a plurality of the virtual base stations in the desired laying area, and calculates the interference level from the plurality of virtual base stations to the area of the another service, and the generation unit generates the permitted area information based on the interference level.

(4)

The information processor according to (3), wherein the calculation unit arranges the plurality of virtual base stations in the desired laying area, arranges a plurality of reference points in the another service area, and calculates the interference level from the plurality of virtual base stations to each of the plurality of reference points, and the generation unit generates the permitted area information based on the interference level to each of the plurality of reference points.

(5)

The information processor according to any one of (2) to (4), wherein the desire information includes capability information on transmission power of the second radio system, and the calculation unit calculates maximum transmission power assumed of the virtual base station based on the capability information, and calculates the interference level to the area of the another service based on the maximum transmission power.

(6)

The information processor according to any one of (2) to (5), wherein the permitted area information includes information on a permitted laying area of the second radio system, and the generation unit generates the permitted area information in which the desired laying area is set as the permitted laying area when the interference level is equal to or less than a predetermined threshold.

(7)

The information processor according to (6), further comprising:

a notification unit configured to notify a device transmitting the desire information of information on the area setting of the predetermined service, wherein the notification unit gives a notice of the permitted area information in which the desired laying area is set as the permitted laying area when the interference level is equal to or less than the predetermined threshold.

(8)

The information processor according to (7), wherein the notification unit notifies the device transmitting the desire information of rejection of a desire when the interference level exceeds the predetermined threshold.

(9)

The information processor according to (7), wherein when the interference level exceeds the predetermined threshold, the generation unit reduces the desired laying area until the interference level falls below the predetermined threshold, and generates the permitted area information in which the desired laying area after reduction is set as the permitted laying area, and the notification unit gives the notice of the permitted area information in which the desired laying area after the reduction is set as the permitted laying area when the interference level exceeds the predetermined threshold.

(10)

The information processor according to (7), wherein when the interference level exceeds the predetermined threshold, the generation unit adjusts a communication parameter of the virtual base station until the interference level falls below the predetermined threshold and generates information on adjusted communication parameter, and the notification unit gives the notice of the information on the adjusted communication parameter together with the permitted area information when the interference level exceeds the predetermined threshold.

(11)

The information processor according to (7), wherein when the interference level exceeds the predetermined threshold, the generation unit generates the permitted area information based on both an area size adjustment process of suppressing the interference level by adjusting a size of the permitted laying area and a parameter adjustment process of suppressing the interference level by adjusting a communication parameter of the virtual base station, and the notification unit gives the notice of the permitted area information generated based on the area size adjustment process and the parameter adjustment process when the interference level exceeds the predetermined threshold.

(12)

The information processor according to (11), wherein the desire information includes limit information indicating a reduction limit of the desired laying area, and when the permitted laying area requires reduction beyond the reduction limit in the area size adjustment process, the generation unit uses the parameter adjustment process to suppress a remaining interference level that cannot be suppressed by the area reduction to the reduction limit.

(13)

The information processor according to (7), wherein when the interference level exceeds the predetermined threshold, the generation unit selects one of an area size adjustment process of suppressing the interference level by adjusting a size of the permitted laying area and a parameter adjustment process of suppressing the interference level by adjusting a communication parameter of the virtual base station based on a predetermined rule, and generates the permitted area information based on the process selected.

(14)

The information processor according to (13), wherein the desire information includes priority information indicating a priority between the area size of the permitted laying area and the communication parameter of the second radio system, and the notification unit generates the permitted area information based on a result of the parameter adjustment process when the priority is given to the area size of the permitted laying area, and generates the permitted area information based on the area size adjustment process when the priority is given to the communication parameter of the second radio system.

(15)

An information processing method comprising:

acquiring desire information on an area setting of a predetermined service provided using a second radio system that shares a part or all of a frequency band used by a first radio system, the desire information including at least desired area information;

acquiring area information on another service that uses or is allocated to a predetermined frequency band used by the predetermined service;

calculating inter-area interference from an area specified by the desired area information to an area of the another service; and generating permitted area information on an area in which the predetermined service is permitted based on a calculation result of the inter-area interference.

(16) A communication apparatus comprising:

an acquisition unit configured to acquire a communication parameter generated based on permitted area information generated by an information processor, the information processor acquiring desire information on an area setting of a predetermined service provided using a second radio system that shares a part or all of a frequency band used by a first radio system, the desire information including at least desired area information, acquiring area information on another service that uses or is allocated to a predetermined frequency band used by the predetermined service, calculating inter-area interference from an area specified by the desired area information to an area of the another service, and generating the permitted area information on an area in which the predetermined service is permitted based on a calculation result of the inter-area interference; and a communication control unit configured to perform radio wave transmission using the predetermined frequency band based on the communication parameter.

(17) A communication method including:

acquiring desire information on an area setting of a predetermined service, including at least desired area information, provided using a second radio system that shares a part or all of a frequency band used by a first radio system;

acquiring area information on another service that uses or is allocated to a predetermined frequency band used by the predetermined service;

calculating inter-area interference from an area specified by the desired area information to the another service area;

acquiring a communication parameter that is generated based on permitted area information generated by an information processor that generates the permitted area information on an area in which the predetermined service is permitted based on a calculation result of the inter-area interference; and performing radio wave transmission using the predetermined frequency band based on the communication parameter.

(18) An information processing program causing a computer to function as:

a first acquisition unit configured to acquire desire information on an area setting of a predetermined service, including at least desired area information, provided using a second radio system that shares a part or all of a frequency band used by a first radio system;

a second acquisition unit configured to acquire area information on another service that uses or is allocated to a predetermined frequency band used by the predetermined service;

a calculation unit configured to calculate inter-area interference from an area specified by the desired area information to the another service area; and a generation unit configured to generate permitted area information on an area in which the predetermined service is permitted based on a calculation result of the inter-area interference.

(19) An information processing program causing a computer to function as:

an acquisition unit configured to acquire desire information on an area setting of a predetermined service, including at least desired area information, provided using a second radio system that shares a part or all of a frequency band used by a first radio system, acquire area information on another service that uses or is allocated to a predetermined frequency band used by the predetermined service, calculates inter-area interference from an area specified by the desired area information to the another service area, and acquire a communication parameter generated based on permitted area information generated by an information processor that generates the permitted area information on an area in which the predetermined service is permitted based on a calculation result of the inter-area interference; and a communication control unit configured to perform radio wave transmission using a predetermined frequency band based on the communication parameter.

REFERENCE SIGNS LIST 1, 2, 1000 COMMUNICATION SYSTEM
10 RADIO APPARATUS
20 MANAGEMENT APPARATUS
30 Terminal device
40 BASE STATION DEVICE
50 INTERMEDIATE DEVICE
60 COMMUNICATION CONTROL DEVICE
11 PROCESSING UNIT
12, 22, 32, 42, 52, 62 STORAGE UNIT
13, 23, 34, 44, 54, 64 CONTROL UNIT
21 COMMUNICATION UNIT
31, 41, 51, 61 RADIO COMMUNICATION UNIT
33 INPUT/OUTPUT UNIT
43, 53, 63 NETWORK COMMUNICATION UNIT
311, 411 RECEPTION PROCESSING UNIT
312, 412 TRANSMISSION PROCESSING UNIT
313, 413 ANTENNA
341, 441, 541 ACQUISITION UNIT
342, 442, 542 COMMUNICATION CONTROL UNIT
443, 543, 645 NOTIFICATION UNIT
641 FIRST ACQUISITION UNIT
642 SECOND ACQUISITION UNIT
643 CALCULATION UNIT
644 GENERATION UNIT

The invention claimed is:

1. An information processor comprising:

a first acquisition unit configured to acquire desire information on an area setting of a predetermined service provided using a second radio system that shares a part or all of a frequency band used by a first radio system, the desire information including at least desired area information;

a second acquisition unit configured to acquire area information on another service that uses or is allocated to a predetermined frequency band used by the predetermined service;

a calculation unit configured to calculate inter-area interference from an area specified by the desired area information to an area of the another service; and a generation unit configured to generate permitted area information on an area in which the predetermined service is permitted based on a calculation result of the inter-area interference.

2. The information processor according to claim 1, wherein the desired area information is information on a desired laying area of the second radio system, the calculation unit arranges a virtual base station in the desired laying area and calculates an interference level from the virtual base station to the area of the another service, and the generation unit generates the permitted area information based on the interference level.

3. The information processor according to claim 2, wherein the calculation unit arranges a plurality of virtual base stations in the desired laying area, and calculates the interference level from the plurality of virtual base stations to the area of the another service, and the generation unit generates the permitted area information based on the interference level.

4. The information processor according to claim 3, wherein the calculation unit arranges the plurality of virtual base stations in the desired laying area, arranges a plurality of reference points in the area of the another service, and calculates the interference level from the plurality of virtual base stations to each of the plurality of reference points, and the generation unit generates the permitted area information based on the interference level to each of the plurality of reference points.

5. The information processor according to claim 2, wherein the desire information includes capability information on transmission power of the second radio system, and the calculation unit calculates maximum transmission power assumed of the virtual base station based on the capability information, and calculates the interference level to the area of the another service based on the maximum transmission power.

6. The information processor according to claim 2, wherein the permitted area information includes information on a permitted laying area of the second radio system, and the generation unit generates the permitted area information in which the desired laying area is set as the permitted laying area when the interference level is equal to or less than a predetermined threshold.

7. The information processor according to claim 6, further comprising:

a notification unit configured to notify a device transmitting the desire information of information on the area setting of the predetermined service, wherein the notification unit gives a notice of the permitted area information in which the desired laying area is set as the permitted laying area when the interference level is equal to or less than the predetermined threshold.

8. The information processor according to claim 7, wherein the notification unit notifies the device transmitting the desire information of rejection of a desire when the interference level exceeds the predetermined threshold.

9. The information processor according to claim 7, wherein when the interference level exceeds the predetermined threshold, the generation unit reduces the desired laying area until the interference level falls below the predetermined threshold, and generates the permitted area information in which the desired laying area after reduction is set as the permitted laying area, and the notification unit gives the notice of the permitted area information in which the desired laying area after the reduction is set as the permitted laying area when the interference level exceeds the predetermined threshold.

10. The information processor according to claim 7, wherein when the interference level exceeds the predetermined threshold, the generation unit adjusts a communication parameter of the virtual base station until the interference level falls below the predetermined threshold and generates information on adjusted communication parameter, and the notification unit gives the notice of the information on the adjusted communication parameter together with the permitted area information when the interference level exceeds the predetermined threshold.

11. The information processor according to claim 7, wherein when the interference level exceeds the predetermined threshold, the generation unit generates the permitted area information based on both an area size adjustment process of suppressing the interference level by adjusting a size of the permitted laying area and a parameter adjustment process of suppressing the interference level by adjusting a communication parameter of the virtual base station, and the notification unit gives the notice of the permitted area information generated based on the area size adjustment process and the parameter adjustment process when the interference level exceeds the predetermined threshold.

12. The information processor according to claim 11, wherein the desire information includes limit information indicating a reduction limit of the desired laying area, and when the permitted laying area requires reduction beyond the reduction limit in the area size adjustment process, the generation unit uses the parameter adjustment process to suppress a remaining interference level that cannot be suppressed by an area reduction to the reduction limit.

13. The information processor according to claim 7, wherein when the interference level exceeds the predetermined threshold, the generation unit selects one of an area size adjustment process of suppressing the interference level by adjusting a size of the permitted laying area and a parameter adjustment process of suppressing the interference level by adjusting a communication parameter of the virtual base station based on a predetermined rule, and generates the permitted area information based on a selected process.

14. The information processor according to claim 13, wherein the desire information includes priority information indicating a priority between an area size of the permitted laying area and the communication parameter of the second radio system, and the notification unit
generates the permitted area information based on a result of the parameter adjustment process when the priority is given to the area size of the permitted laying area, and
generates the permitted area information based on the area size adjustment process when the priority is given to the communication parameter of the second radio system.

15. An information processing method comprising:
acquiring desire information on an area setting of a predetermined service provided using a second radio system that shares a part or all of a frequency band used by a first radio system, the desire information including at least desired area information;
acquiring area information on another service that uses or is allocated to a predetermined frequency band used by the predetermined service;
calculating inter-area interference from an area specified by the desired area information to an area of the another service; and
generating permitted area information on an area in which the predetermined service is permitted based on a calculation result of the inter-area interference.

16. A communication apparatus comprising:
an acquisition unit configured to acquire a communication parameter generated based on permitted area information generated by an information processor, the information processor acquiring desire information on an area setting of a predetermined service provided using a second radio system that shares a part or all of a frequency band used by a first radio system, the desire information including at least desired area information, acquiring area information on another service that uses or is allocated to a predetermined frequency band used by the predetermined service, calculating inter-area interference from an area specified by the desired area information to an area of the another service, and generating the permitted area information on an area in which the predetermined service is permitted based on a calculation result of the inter-area interference; and
a communication control unit configured to perform radio wave transmission using the predetermined frequency band based on the communication parameter.

* * * * *